US008787161B2

(12) United States Patent
Adamczyk et al.

(10) Patent No.: US 8,787,161 B2
(45) Date of Patent: *Jul. 22, 2014

(54) METHODS OF IMPLEMENTING DYNAMIC QUALITY OF SERVICE OR BANDWIDTH PROVISIONING

(75) Inventors: Maria Adamczyk, Alpharetta, GA (US); Thomas Arnold Anschutz, Conyers, GA (US); Alan Ryan Blackburn, Woodstock, GA (US); Jeffrey Patrick Cassanova, Villa Rica, GA (US); Sammie Walter Hill, Marietta, GA (US); Scott Crandall Holt, Decatur, GA (US); Nicholas Steven Huslak, Duluth, GA (US); Arnold Chester McQuaide, Jr., Berkeley Lake, GA (US); Edgar Vaughan Shrum, Jr., Smyrna, GA (US); Scott Traynham Stillman, Peachtree City, GA (US); Steven Allen Wright, Roswell, GA (US); Li Zhang, Alpharetta, GA (US)

(73) Assignee: AT&T Intellectual Property I, LP., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,278

(22) Filed: May 1, 2012

(65) Prior Publication Data

US 2012/0269195 A1   Oct. 25, 2012

Related U.S. Application Data

(63) Continuation of application No. 10/836,941, filed on Apr. 30, 2004, now Pat. No. 8,174,970, which is a continuation-in-part of application No. 10/722,194, filed on Nov. 25, 2003, now Pat. No. 7,684,432, which is a continuation-in-part of application No. 10/719,270, filed on Nov. 21, 2003, now Pat. No. 7,573,906, which is a continuation-in-part of application No. 10/716,967, filed on Nov. 19, 2003, now abandoned, which is a continuation-in-part of application No. 10/716,968, filed on Nov. 19, 2003, now Pat. No. 7,536,460, which is a continuation of application No. 10/716,051, filed on Nov. 18, 2003, now Pat. No. 7,512,683, which is a continuation-in-part of application No. 10/704,740, filed on Nov. 10, 2003, now abandoned.

(60) Provisional application No. 60/470,650, filed on May 15, 2003.

(51) Int. Cl.
H04L 12/26 (2006.01)
H04L 12/56 (2006.01)
H04L 29/06 (2006.01)
H04L 12/28 (2006.01)

(52) U.S. Cl.
CPC ......... *H04L 63/102* (2013.01); *H04L 47/2408* (2013.01); *H04L 47/2441* (2013.01); *H04L 47/2458* (2013.01); *H04L 63/083* (2013.01); *H04L 12/2859* (2013.01); *H04L 47/2416* (2013.01); *H04L 63/029* (2013.01)
USPC .......................................... 370/230; 370/235

(58) Field of Classification Search
None
See application file for complete search history.

(56) References Cited

U.S. PATENT DOCUMENTS 6,028,838 A   2/2000 Yamamura et al.
6,801,528 B2   10/2004 Nassar (Continued)

OTHER PUBLICATIONS

"DSL Forum, DSL Evolution—Architecture Requirements for the Support of QoS-Enabled IP Services", Working Text: WT-081, Revision 4, Dec. 2002.

(Continued)

*Primary Examiner* — Rhonda Murphy
(74) *Attorney, Agent, or Firm* — Guntin & Gust, PLC; Ed Guntin

(57) ABSTRACT

A method of operating a data network may include establishing a data path through the data network between a routing gateway and service provider equipment providing a data service. Moreover, the data service may be provided for use at the routing gateway over the data path during a data session. A request may be received from the service provider equipment where the request defines a data flow characteristic for the data path between the routing gateway and the service provider equipment providing the data service. The data flow characteristic may then be transmitted to a network element along the data path between the routing gateway and the service provider equipment. A request from service provider equipment can include an allowed bandwidth or prioritization. Related methods, data networks, data service providers, routing gateways, and computer program products are also discussed.

20 Claims, 35 Drawing Sheets

(56) References Cited

U.S. PATENT DOCUMENTS

| | | |
|---|---|---|
| 6,891,860 B2 * | 5/2005 | Gautney et al. ............... 370/493 |
| 6,931,018 B1 | 8/2005 | Fisher |
| 7,076,562 B2 | 7/2006 | Singhal et al. |
| 7,206,313 B2 | 4/2007 | Maher |
| 7,209,473 B1 | 4/2007 | Mohaban et al. |
| 7,231,450 B1 | 6/2007 | Clifford et al. |
| 7,257,634 B2 | 8/2007 | Colby et al. |
| 7,339,993 B1 | 3/2008 | Brooks et al. |
| 2002/0065932 A1 | 5/2002 | Kobayashi |
| 2002/0105965 A1 | 8/2002 | Dravida et al. |
| 2003/0191841 A1 | 10/2003 | DeFerranti et al. |
| 2003/0217129 A1 | 11/2003 | Knittel et al. |
| 2004/0010612 A1 | 1/2004 | Pandya |
| 2004/0034797 A1 | 2/2004 | Becker |
| 2004/0044789 A1 | 3/2004 | Angel et al. |
| 2004/0059820 A1 | 3/2004 | Holden et al. |
| 2004/0165592 A1 | 8/2004 | Chen et al. |
| 2006/0208074 A1 | 9/2006 | Eglen et al. |
| 2007/0005766 A1 | 1/2007 | Singhal et al. |

OTHER PUBLICATIONS

"DSL Forum, DSL Evolution—Architecture Requirements for the Support of QoS-Enabled IP Services", Working Text: WT-081, Revision 6, Mar. 2003.

"DSL Forum, DSL Evolution—Architecture Requirements for the Support ofQoS-Enabled IP Services", Working Text: WT-081, Revision 5, Feb. 2003.

"DSL Forum, DSL Evolution—Architecture Requirements for the Support ofQoS-Enabled IP Services", Working Text: WT-081, Letter Ballot Revision (9), Jun. 2003.

"DSL Forum, DSL Evolution—Architecture Requirements for the Support ofQoS-Enabled IP Services", Working Text: WT-081, Straw Ballot Revision (7), Mar. 2003.

"DSL Forum, DSL Evolution—Architecture Requirements for the Support ofQoS-Enabled IP Services", Working Text: WT-081, Straw Ballot Revision (8), Mar. 2003.

"DSL Forum, DSL Evolution—Architecture Requirements for the Support ofQoS-Enabled IP Services", Proposed Draft: PD-00X, Revision I, Aug. 2002.

Anschutz, et al., "DSL Evolution—Architecture Requirements for the Support ofQoS-Enabled IP Services", Technical Report: TR-059, Sep. 2003.

Blake, et al., "An Architecture for Differentiated Services", The Internet Society, Dec. 1998.

* cited by examiner

METHODS OF IMPLEMENTING DYNAMIC QUALITY OF SERVICE OR BANDWIDTH PROVISIONING

CROSS-REFERENCE TO RELATED APPLICATIONS

This application is a continuation of U.S. patent application Ser. No. 10/836,941, now U.S. Pat. No. 8,174,970, filed Apr. 30, 2004. U.S. patent application Ser. No. 10/836,941 claims priority to U.S. Provisional Patent Application No. 60/470,650, filed May 15, 2003. U.S. patent application Ser. No. 10/836,941 is also a continuation-in-part of the following applications: U.S. patent application Ser. No. 10/722,194, filed Nov. 25, 2003, now U.S. Pat. No. 7,684,432; U.S. patent application Ser. No. 10/719,270, filed Nov. 21, 2003, now U.S. Pat. No. 7,573,906; U.S. patent application Ser. No. 10/716,967, filed Nov. 19, 2003; U.S. patent application Ser. No. 10/716,968, filed Nov. 19, 2003, now U.S. Pat. No. 7,536,460; U.S. patent application Ser. No. 10/716,051, filed Nov. 18, 2003, now U.S. Pat. No. 7,512,683; and U.S. patent application Ser. No. 10/704,740, filed Nov. 10, 2003. The disclosures of all of the above referenced provisional and non-provisional applications and patents are hereby incorporated herein by reference as if set forth in their entirety.

FIELD OF THE DISCLOSURE

The present disclosure relates to communication networks, and, more particularly, to managing Quality of Service (QoS) in communication networks.

BACKGROUND

The Internet is a decentralized network of computers that can communicate with one another via the internet protocol (IP). Although the Internet has its origins in a network created by the Advanced Research Project Agency (ARPA) in the 1960's, it has only recently become a worldwide communication medium. To a large extent, the explosive growth in use and traffic over the Internet is due to the development in the early 1990's of the worldwide Web (WWW), which is one of several service facilities provided on the Internet. Other facilities include a variety of communication services such as electronic mail, telnet, usenet newsgroups, internet relay chat (IRC), a variety of information search services such as WAIS and Archie, and a variety of information retrieval services such as FTP (file transfer protocol) and Gopher.

The WWW is a client-server based facility that includes a number of servers (computers connected to the Internet) on which Web pages or files reside, as well as clients (Web browsers), which interface the users with the Web pages. Specifically, Web browsers and software applications send a request over the WWW to a server requesting a Web page identified by a Uniform Resource Locator (URL) which notes both the server where the Web page resides and the file or files on that server which make up the Web page. The server then sends a copy of the requested file(s) to the Web browser, which in turn displays the Web page to the user.

The topology of the WWW can be described as a network of networks, with providers of network service called Network Service Providers, or NSPs. Servers that provide application-layer services as previously described may be described as Application Service Providers (ASPs). Sometimes a single service provider does both functions within a single business. In recent years, broadband access technologies, such as digital subscriber line (DSL), cable modems, asynchronous transfer mode (ATM), and frame relay have facilitated the communication of voice, video, and data over the Internet and other public and private networks. Because broadband technologies are typically deployed by a single transport service provider, like a Regional Bell Operating Company (RBOC), their. Regional and Access Networks (RAN) are often shared by many NSPs and ASPs offering services that range from Internet access and VPN access to Voice over IP, Video on Demand, and Gaming. Up until recently, a given Customer Premises Network (CPN) would have been connected to a single service provider in a generic way, however a new standard for RAN service (DSL Forum TR-059) provides a RAN architecture that allows simultaneous access to multiple NSPs and ASPs and for differentiating the data transport service provided by a RAN to these service providers.

Moreover, broadband access technology has allowed service providers to expand their content and service offerings to both business and home users. For example, a user may subscribe to multiple services or applications, such as voice service, Internet access service, a video service, a gaming service, etc. from one or more service providers. These services and/or applications may be delivered over a single network connection, such as a DSL line. Unfortunately, with multiple new connectivity options and applications that require specific characteristics from the network, there is also a need to establish priorities and bandwidth allocation among multiple services and/or applications so as to customize the content delivery according to the users' and/or providers' preferences.

BRIEF DESCRIPTION OF THE DRAWINGS

Other features of the present disclosure will be more readily understood from the following detailed description of specific embodiments thereof when read in conjunction with the accompanying drawings, in which.

DETAILED DESCRIPTION OF EMBODIMENTS

Figure 1:
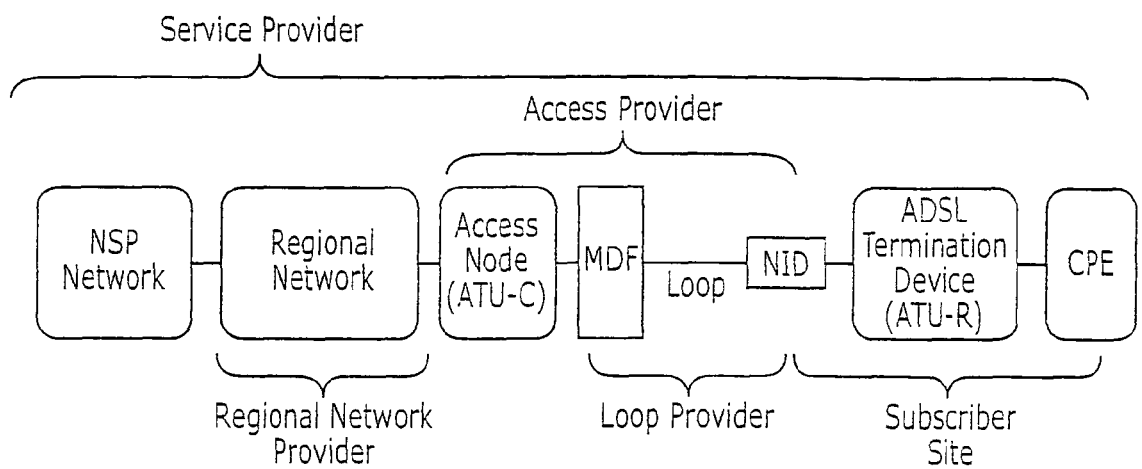
FIG. 1 is a block diagram that illustrates a conventional digital subscriber line (DSL) network.

According to embodiments of the present disclosure, methods of operating a data network may include establishing a data path, receiving a request from a service provider, and enforcing a data flow characteristic. The data path may be established through the data network between a routing gateway for a subscriber of the data network and a service provider providing a data service, and the data service may be provided for use at the routing gateway over the data path during a data session. The request received from the service provider may define a data flow characteristic for the data path between the routing gateway and the service provider providing the data service during the data session. The data flow characteristic may be transmitted to a node along the data path between the routing gateway and the service provider for enforcement of the data flow characteristic for the data path at the node.

Embodiments of the present disclosure may thus be implemented using an Application Framework Infrastructure discussed in greater detail in the Detailed Description Of Embodiments section of the present application, and the Application Framework Infrastructure may be implemented, for example, using middleware. The Application Framework Infrastructure may receive the request from the service provider over a signaling path distinct from the data path, and the Application Framework Infrastructure may transmit the data flow characteristic over a signaling path distinct from the data path. An Application Framework Infrastructure according to embodiments of the present disclosure may thus support implementation of dynamic QoS and bandwidth provisioning.

The data flow characteristic may also be transmitted to the routing gateway for the subscriber for enforcement of the data flow characteristic for the data path at the routing gateway. A policy may be created for enforcement of the data flow characteristic for the data path after receiving the request from the service provider. Moreover, transmitting the data flow characteristic may include transmitting the policy for enforcement of the data flow characteristic to the node. In addition, the request received from the service provider may be authenticated before transmitting the data flow characteristic for the data path.

Receiving a request from the service provider may also include receiving information identifying the data session, and transmitting the data flow characteristic to a node may include transmitting the data flow characteristic to one of a plurality of nodes based on the information identifying the data session. For example, the information identifying the data session may include at least one of a telephone number and/or an e-mail address for the subscriber. Accordingly, the data flow characteristic may be transmitted to the routing gateway based on the information identifying the data session.

In addition, a signaling path may be established between the service provider and the data network wherein the request from the service provider is received over the signaling path.

A second data path may also be established through the data network between the routing gateway and a second service provider providing a second data service, and the second data service may be provided for use at the routing gateway over the second data path during a second data session.

The data flow characteristic for the data path may be enforced at the node between the routing gateway and the service provider providing the data service during the data session. More particularly, the data flow characteristic may be enforced using a Broadband Remote Access Server (BRAS) at the node. Enforcing the data flow characteristic may include enforcing the data flow characteristic during a first interval of the data session. In addition, a second data flow characteristic maybe enforced for the data path between the routing gateway and the service provider providing the data service during a second interval of the data session, after establishing the data path. More particularly, the first and second data flow characteristics may be different, and the data path may be terminated after the first and second intervals, thereby terminating the data session.

In addition, the first data flow characteristic may be a first allowed bandwidth for the data path between the routing gateway and the service provider, the second data flow characteristic may be a second allowed bandwidth for the data path between the routing gateway and the service provider, and the first and second allowed bandwidths may be different. More particularly, the data service provider may provide a plurality of data services for use at the routing gateway through the data path during the data session. A first of the data services may be provided during the first interval of the data session, a second of the data services may be provided during the second interval, and the first of the data services may not be provided during the second interval of the data session. For example, both of the first and second of the data services may be provided during the first interval of the data session. In an alternative, the second of the data services may not be provided during the first interval of the data session.

According to additional embodiments of the present disclosure, methods may be provided for operating a data network providing a data path between a routing gateway for a subscriber of the data network and a service provider providing a data service, wherein the data service is provided for use at the routing gateway over the data path during a data session. A first data flow characteristic may be enforced for the data path between the routing gateway and the service provider providing the data service during a first interval of the data session. In addition, a second data flow characteristic may be enforced for the data path between the routing gateway and the service provider providing the data service during a second interval of the data session.

Moreover, the data session may be a point-to-point protocol data session. In addition, the data path and the data session may be established before enforcing the first and second data flow characteristics, and the data path and the data session may be terminated after enforcing the first and second data flow characteristics. The remote gate way may be coupled to the data network via a digital subscriber line, and the data path may be provided between the routing gateway and the data service provider, for example, over a regional/access network.

For example, the first data flow characteristic may be a first allowed bandwidth for the data path between the routing gateway and the service provider, and the second data flow characteristic may be a second allowed bandwidth for the data path between the routing gateway and the service provider, with the first and second allowed bandwidths being different.

More particularly, the data service provider may provide a plurality of data services for use at the routing gateway through the data path during the data session. A first of the data services may be provided over the data path during the first interval of the data session, a second of the data services may be provided over the data path during the second interval, and the first of the data services may not be provided over the data path during the second interval. Moreover, both of the first and second of the data services may be provided during the first interval of the data session, or the second of the data services may not be provided over the data path during the first interval of the data session.

In an alternative, the data service provider may provide a plurality of data services for use at the routing gateway through the data path during the data session. Moreover, the first data flow characteristic may include a first prioritization of the plurality of data services, the second dataflow characteristic may include a second prioritization of the plurality of data services, and the first and second prioritizations may be different. In addition, a same bandwidth may be provided for the data path during the first and second intervals of the data session. Data services provided by the service provider may include, for example, gaming, video on demand, video conferencing, and/or access to virtual private networks (VPNs) via IPsec and/or another Internet Protocol tunneling technique.

In addition, a second data path may be established through the data network between the routing gateway and a second service provider providing a second data service, and the second data service may be provide for use at the routing gateway over the second data path during a second data session. Enforcing the first data flow characteristic may also be preceded by receiving a request from the service provider. More particularly, the request may define the first data flow characteristic for the data path between the routing gateway and the service provider providing the data service during the data session. In addition, a signaling path may be established between the service provider and the data network, and the request from the service provider may be received over the signaling path.

According to yet additional embodiments of the present disclosure, methods of operating a service provider providing a data service may include establishing a data path through a data network between a routing gateway for a subscriber of the data network and the service provider providing the data service for use at the routing gateway over the data path during a data session. In addition, a request may be transmitted to the data network, and the request may define a data flow characteristic for the data path between the routing gateway and the service provider providing the data service during the data session.

More particularly, transmitting a request to the data network may include transmitting information identifying the data session. For example, the information identifying the data session may include at least one of a telephone number and/or an e-mail address for the subscriber. Moreover, the data session may be a point-to-point protocol data session. In addition, a signaling path may be established between the service provider and the data network, arid the request may be transmitted to the data network over the signaling path.

The data flow characteristic may include an allowed bandwidth for the data path and/or a prioritization of a plurality of data services provided by the service provider. Moreover, the request may define the data flow characteristic for a first interval of the data session. In addition, a second request may be transmitted to the data network, and the second request may define a second data flow characteristic for the data path between the routing gateway and the service provider during a second interval of the data session. Moreover, the first and second data flow characteristics may be different.

According to still additional embodiments of the present disclosure, methods of operating a routing gateway providing subscriber use of a data service provided by a service provider over a data network may include establishing a data path and enforcing first and second data flow characteristic for the data path during first and second intervals. The data path may be established through the data network between the routing gateway for the subscriber of the data network and the service provider providing the data service for use at the routing gateway over the data path during a data session. After establishing the data path, the first data flow characteristic may be established for the data path between the routing gateway and the service provider providing the data service during the first interval of the data session. The second data flow characteristic may be enforced after establishing the data path between the routing gateway and the service provider providing the data service during the second interval of the data session. Moreover, the first and second data flow characteristics may be different. The data path may be terminated after the first and second intervals thereby terminating the data session. More particularly, the data session may be a point-to-point protocol data session.

For example, the first data flow characteristic may include a first allowed bandwidth for the data path between the routing gateway and the service provider, and the second data flow characteristic may include a second allowed bandwidth for the data path between the routing gateway and the service provider. Moreover, the first and second allowed bandwidths may be different. In an alternative, the data service provider may provide a plurality of data services for use at the routing gateway through the data path during the data session. More particularly, the first data flow characteristic may include a first prioritization of the plurality of data services, the second dataflow characteristic may include a second prioritization of the plurality of data services, and the first and second prioritizations may be different.

According to more embodiments of the present disclosure, a data network may provide a data connection between a routing gateway for a subscriber of the data network and a data service provider providing a data service. The data network may include a data path through the data network between the routing gateway for the subscriber of the data network and the service provider providing the data service for use at the routing gateway over the data path during a data session. In addition, a concentrator may be configured to enforce a first data flow characteristic for the data path between the routing gateway and the service provider providing the data service during a first interval of the data session. The data path may be further configured to enforce a second data flow characteristic for the data path between the routing gateway and the service provider providing the data service during a second interval of the data session. In addition, the first and second data flow characteristics may be different, and the first and second data flow characteristics may be enforced for the data path during the first and second intervals before terminating the data path.

According to still more embodiments of the present disclosure, a data network may provide a data connection between a routing gateway for a subscriber of the data network and a data service provider providing a data service. The data network may include a data path and first and second signaling paths. The data path may be provided through the data network between the routing gateway for the subscriber of the data network and the service provider providing the data service for use at the routing gateway over the data path during a data session. The first signaling path may be configured to receive a request from the service provider, and the request may define a data flow characteristic for the data path between the routing gateway and the service provider providing the data service during the data session. The second signaling path may be configured to transmit the data flow characteristic to a node along the data path between the routing gateway and the service provider for enforcement of the data flow characteristic for the data path at the node.

According to yet more embodiments of the present disclosure, a data service provider may provide a data service over a data network, and the data service provider may include at data path and a signaling path. More particularly, the data path may be configured to provide the data service through the data network to a routing gateway for a subscriber of the data network, and the data service may be provided for use at the routing gateway over the data path during a data session. The signaling path may be configured to transmit a request to the data network, and the request may define a data flow characteristic for the data path between the routing gateway and the service provider providing the data service during the data session.

According to additional embodiments of the present disclosure, a routing gateway may provide subscriber use of a data service provided by a service provider over a data network. The routing gateway may include a data path configured to provide subscriber use of the data service from the data service provider through the data network during a data session. The routing gateway may also include a data flow controller configured to enforce a first data flow characteristic for the data path providing subscriber use of the data service during a first interval of the data session. The data flow controller may be further configured to enforce a second data flow characteristic for the data path providing subscriber use of the data service during a second interval of the data session. Moreover, the first and second data flow characteristics may be different, and the first and second data flow characteristics are enforced for the data path during the first and second intervals before terminating the data path.

According to yet additional embodiments of the present disclosure, a computer program product may be configured to operate a data network between a routing gateway for a subscriber and a data service provider providing a data service. The computer program product may include a computer useable storage medium having computer-readable program code embodied in the medium. The computer-readable program code may include computer-readable program code that is configured to establish a data path through the data network between a routing gateway for a subscriber of the data network and a service provider providing a data service for use at the routing gateway over the data path during a data session. The computer-readable program code may further include computer-readable program code that is configured to enforce a first data flow characteristic for the data path between the routing gateway and the service provider providing the data service during a first interval of the data session, after establishing the data path. The computer-readable program code may also include computer-readable program code that is configured to enforce a second data flow characteristic for the data path between the routing gateway and the service provider providing the data service during a second interval of the data session, wherein the first and second data flow characteristics are different. In addition, the computer-readable program code may include computer-readable program code that is configured to terminate the data path thereby terminating the data session, after the first and second intervals.

According to still additional embodiments of the present disclosure, a computer program product may be configured to operate a data network between a routing gateway for a subscriber and a data service provider providing a data service. The computer program product may include a computer useable storage medium having computer-readable program code embodied in the medium. The computer-readable program code may include computer-readable program code that is configured to establish a data path through the data network between a routing gateway for a subscriber of the data network and a service provider providing a data service for use at the routing gateway over the data path during a data session. The computer-readable program code may also include computer-readable program code that is configured to receive a request from the service provider, and the request may define a data flow characteristic for the data path between the routing gateway and the service provider providing the data service during the data session. In addition, the computer-readable program code may include computer-readable program code that is configured to transmit the data flow characteristic to a node along the data path between the routing gateway and the service provider for enforcement of the data flow characteristic for the data path at the node.

According to yet more additional embodiments of the present disclosure, a computer program product may be configured to operate a data service provider providing a data service over a data network. The computer program product may include a computer useable storage medium having computer-readable program code embodied in the medium. More particularly, the computer-readable program code may include computer-readable program code that is configured to establish a data path through a data network between a routing gateway for a subscriber of the data network and the service provider providing the data service for use at the routing gateway over the data path during a data session. The computer-readable program code may also include computer-readable program code that is configured to transmit a request to the data network, and the request may define a data flow characteristic for the data path between the routing gateway and the service provider providing the data service during the data session.

According to still more additional embodiments of the present disclosure, a computer program product may be configured to operate a routing gateway providing subscriber use of a data service provided by a data service provider over a data network. The computer program product may include a computer useable storage medium having computer-readable program code embodied in the medium. The computer-readable program code may include computer-readable program code that is configured to establish a data path through the data network between the routing gateway for the subscriber of the data network and the service provider providing the data service for use at the routing gateway over the data path during a data session. The computer-readable program code may also include computer-readable program code that is configured to enforce a first data flow characteristic for the data path between the routing gateway and the service provider providing the data service during a first interval of the data session, after establishing the data path. In addition, the computer-readable program code may include computer-readable program code that is configured to enforce a second data flow characteristic for the data path between the routing gateway and the service provider providing the data service during a second interval of the data session. The first and second data flow characteristics are different. The computer-readable program code may further include computer-readable program code that is configured to terminate the data path thereby terminating the data session after the first and second intervals.

While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like reference numbers signify like elements throughout the description of the figures.

The present disclosure may be embodied as systems, methods, and/or computer program products. Accordingly, the present disclosure may be embodied in hardware and/or in software (including firmware, resident software, micro-code, etc.). Furthermore, the present disclosure may take the form of a computer program product on a computer-usable or computer-readable storage medium having computer-usable or computer-readable program code embodied in the medium for use by or in connection With an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure are described herein in the context of digital subscriber line (DSL) technology for purposes of illustration. It will be understood that the present disclosure is not limited to DSL technology. Indeed, other communication technologies and/or network configurations, such as, but not limited to, asynchronous transfer mode (ATM), frame relay, hybrid fiber coax (HFC), wireless broadband, and/or Ethernet may also be used in other embodiments of the present disclosure. In general, the present disclosure is not limited to any communication technology and/or network configuration, but is intended to encompass any technology and/or network configuration capable of carrying out operations described herein. Embodiments of the present disclosure are also described herein in the context of managing quality of service (QoS). As used herein, QoS includes, but is not limited to, treatment applied to an access session, application flow, and/or packet with respect to scheduling a resource, bandwidth allocation, and/or delivery target in an individual element or across an end-to-end system.

The detailed description of embodiments of the present disclosure is organized as follows:
1. Overview
2. Introduction
  2.1 Purpose and Scope
  2.2 Key Terms
3. Review of TR-059 Concepts
  3.1 Network Service Provider Network
    3.1.1 Description
  3.2 Application Service Provider Network
    3.2.1 Description
    3.2.2 Capabilities
  3.3 Regional Access Network
    3.3.1 Broadband Remote Access Server
    3.3.2 Access Network
    3.3.3 Access Node
  3.4 Evolution of the DSL Network
    3.4.1 Access Session Types
4. QOS Capabilities of the Application Framework
  4.1 General Approach
  4.2 Classification
  4.3 Business Models for Supporting Concurrent NSP and ASP Access Sessions
    4.3.1 Simple Bandwidth Partitioning
    4.3.2 Priority and Dynamic Bandwidth Sharing Considerations Associated with this Approach
  4.4 Considerations Associated with this Approach
    4.4.1 Static Classifiers
    4.4.2 Queue Structure
5. Reference Data Model
  5.1 Subscriber Maintained Data
  5.2 Routing Gateway
  5.3 Regional/Access Network
  5.4 Application Service Provider
  5.5 Network Service Provider
6. Reference Interface Specification and Detailed Message Flow
  6.1 Interface Between RG and Regional/Access Network
  6.2 Interface Between Regional/Access Network and ASP
  6.3 Interface Between Regional/Access Network and NSP
  6.4 Application Framework Infrastructure
    6.4.1 Framework Infrastructure Element Functional Description
    6.4.2 DSL Service Messaging Flow
7. Future Capabilities of the Application Framework
8. Example Use Scenario—Turbo Button
9. Example Use Scenario—Video Conferencing
10. Example Use Scenario—Gaming
11. Dynamic Provisioning 1. Overview This document defines a common application framework built on top of the DSL Forum TR-059 reference architecture that can be used in a common way to enable service providers to leverage bandwidth and QoS capabilities in the Regional/Access Network. This framework comprises an interface specification and associated data model and mechanisms to control the QoS and bandwidth capabilities defined in TR-059. A common interface for Application Service Providers (ASPs) and Network Service Providers (NSPs) to leverage may reduce development costs and time to market. This interface defines a mechanism for applications to request IP QoS and bandwidth from the DSL Regional/Access network.

2. Introduction 2.1 Purpose and Scope

Recent work in the DSL Forum has documented a reference architecture, DSL Evolution—Architecture Requirements for the Support of QoS-Enabled IP Services (TR-059), with the purpose of defining a common way of supporting enhanced IP applications by enabling IP QoS and bandwidth management capabilities. TR-059 defines a common deployment architecture, set of interface specifications, and fundamental network element requirements. The architecture and requirements are largely "transport or network" layer focused. It may be useful to complement this work by defining a common higher-layer framework that leverages the capabilities of TR-059 and that can be used by application service providers (ASP) as they develop and deploy applications.

This document defines a common application framework built on top of the TR-059 reference architecture that can be used in a common way to enable service providers to leverage bandwidth and QoS capabilities in the Regional/Access Network. This framework comprises an interface specification and associated data model and mechanisms to control the QoS and bandwidth capabilities defined in TR-059. A common interface for ASPs and NSPs to leverage may reduce development costs and time to market. This interface defines a mechanism for applications to request IP QoS and bandwidth from the DSL Regional/Access network.

Specifically, the application framework is based on the capabilities defined in phase 2 of TR-059. Therefore, the framework defined here assumes that the capabilities of the access node in the Regional/Access network will remain largely unchanged, but does leverage a policy approach for provisioning the BRAS and Routing Gateway (RG) to manage IP flows appropriately. As real-time signaling capabilities become available this framework may be modified to support these capabilities. In defining the framework and providing details of its use, this document also intends to demonstrate that capabilities defined (here and in TR-059) are sufficient to support a reasonable set of applications.

Services that span Regional/Access networks and require inter-Regional/Access network communication are generally not described herein as part of this framework. Support of these services is possible if handled at the application layer where an ASP communicates to each Regional/Access network to establish bandwidth and QoS for a service.

2.2 Key Terms

The following definitions apply for the purposes of this document:

| | |
|---|---|
| Access Network | The Access Network encompasses the elements of the DSL network from the NID at the customer premises to the BRAS. This network typically includes one or more Access Node type and often an ATM switching function to aggregate them. |
| Access Node | The Access Node contains the A TU-C, which terminates the DSL signal, and physically can be a DSLAM, Next Generation DLC (NG-DLC), or a Remote Access Multiplexer (RAM). A DSLAM hub can be used in a central office to aggregate traffic from multiple remote physical devices, and is considered logically to be a part of the Access Node. When the term "DSLAM" is used in this document, it is intended to very specifically refer to a DSLAM, and not the more generic Access Node. The Access Node provides aggregation capabilities between the Access Network and the Regional Network. It is the first point in the network where traffic on multiple DSL lines will be aggregated onto a single network. |
| Application Flow | The set of packets associated with a particular application (e.g., video conferencing session, VoIP call, etc.). |
| Application Framework | A common reference data model and interface specification built on top of the TR-059 reference architecture that can be used in a common way to |

-continued

| Term | Definition |
| --- | --- |
| | enable service providers to leverage bandwidth and QoS capabilities in the Regional/Access Network. |
| Auto Configuration Server | A data repository that allows the Regional/Access network to provide configuration information to Routing Gateways (RG) in Customer Premises |
| Broadband Remote Access Server (BRAS) | The BRAS is the aggregation point for the subscriber traffic. It provides aggregation capabilities (e.g., IP, PPP, ATM) between the Regional/Access Network and the NSP or ASP. Beyond aggregation, it is also the injection point for policy management and IP QoS in the Regional/Access Networks. |
| Core Network | The center core of the Regional Network. The functions contained herein are primarily transport oriented with associated switching or routing capabilities enabling the proper distribution of the data traffic. |
| Downstream | The direction of transmission from the ATU-C (Access Node) to the ATU-R (modem). |
| Edge Network | The edge of the Regional Network. The Edge Network provides access to various layer 2 services and connects to the Regional Network core enabling the distribution of the data traffic between various edge devices. |
| Loop | A metallic pair of wires running from the customer's premises to the Access Node. |
| Many-to-Many Access Sessions | The ability for multiple individual users, or subscribers, within a single premises, to simultaneously connect to multiple NSPs and ASPs. |
| Regional Network | The Regional Network interconnects the Network Service Provider's network and the Access Network. A Regional Network for DSL connects to the BRAS, which is technically both in the Regional Network and in an Access Network. Typically, more than one Access Network is connected to a common Regional Network. The function of the Regional Network in this document goes beyond traditional transport, and may include aggregation, routing, and switching. |
| Regional/Access Network | The Regional and Access Networks -- grouped as and end-to-end. QoS domain and often managed by a single provider. The follow functional elements are contained in this network: Access Node, BRAS, and the ACS. |
| Routing Gateway | A customer premises functional element that provides IP routing and QoS capabilities. It may be integrated with or be separate from the A TU-R. |
| Rate Limit | A means to limit the throughput of a particular PPP session or application flow by either buffering (shaping) or dropping (policing) packets above a specified maximum data rate. The term bandwidth is used interchangeably with the concept of rate limiting. The bandwidth allocated to a PPP session or application is determined by the rate limit applied. |
| Session | Session is typically an overloaded term. In this document it is intended to reference a PPP access session rather than a particular application flow. |
| Subscriber | Used to refer to the person that is billed for a service, like NSP access service or ASP services. The subscriber is considered the primary user of the service (see the definition of "user" below) and is the main account contact. The subscriber to an NSP access is referred to as a Network Subscriber and the subscriber to an application is referred to as an Application Subscriber. |
| Upstream | The direction of transmission from the ATU-R (modem) to the ATU-C (Access Node). |
| User | The person or entity that receives the benefit of a given service. The user may or may not be the subscriber of the service. A subscribed service has one or more users associated with the subscriber. |

3. Review of TR-059 Concepts

To provide a common reference for the application framework, an architectural view of the DSL network is provided. The text in this section is taken from TR-059 and provides a high level overview. For a more complete description refer to TR 059. FIG. 1 illustrates the current state of deployed DSL networks. Boxes in the figures represent functional entities—networks and logical components rather than physical elements.

Figure 2:
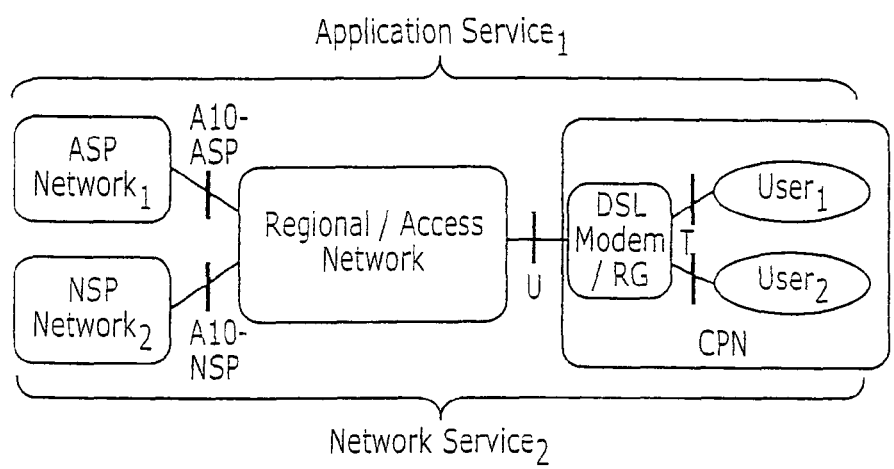
FIG. 2 is a block diagram that illustrates communication between end users and an application service provider (ASP) and a network service provider (NSP) via a regional/access network in accordance with some embodiments of the present disclosure.

This traditional architecture is centered on providing service to a line or a loop. It is desired, however, to be able to provide services that are user-specific. Additionally, more than one subscriber can be present at the same premises and share a single loop. TR-059 describes a slightly more complex situation, and hides the common complexity shared with FIG. 2. FIG. 2 illustrates the components of a DSL access-based broadband network. FIG. 2 indicates ownership of the components by different providing organizations. Boxes in the figures represent functional entities—networks and logical components rather than physical elements.

This model illustrates an architecture that provides services that are user-specific, i.e., more than one subscriber can be present at the same premises and share a single loop. Note that FIG. 2 shows many-to-many access through a common Regional/Access network. It is used to simultaneously provide an Application Service, between an ASP Network, and User, at the same time and over the same U interface as it supports a Network Service$_2$ between NSP Network$_2$ and User$_2$.

3.1 Network Service Provider Network 3.1.1. Description

The Network Service Provider (NSP) is defined as a Service Provider that requires extending a Service Provider-specific Internet Protocol (IP) address. This is the typical application of DSL service today. The NSP owns and procures addresses that they, in turn, allocate individually or in blocks to their subscribers. The subscribers are typically located in Customer Premises Networks (CPNs). The NSP service may be subscriber-specific, or communal when an address is shared using Network Address Port Translation (NAPT) throughout a CPN. This relationship among the NSP, AIO-NSP interface, and Regional/Access Network is shown in FIG. 2. NSPs typically provide access to the Internet, but may also provide access to a walled garden, VPN, or some other closed group or controlled access network. L2TP and IP VPNs are typical AIO-NSP interface arrangements. The capabilities of the NSP may include, but are not limited to, for example: authenticating network access between the CPN and the NSP network; assignment of network addresses and IP filters; assignment of traffic engineering parameters; and/or customer service and troubleshooting of network access problems.

3.2 Application Service Provider Network 3.2.1 Description

The Application Service Provider (ASP) is defined as a Service Provider that uses a common network infrastructure provided by the Regional/Access Network and an IP address assigned and managed by the Regional Network Provider. This is a new type of DSL service. The Regional Network Provider owns and procures addresses that they, in turn, allocate to the subscribers. ASPs then use this common infrastructure to provide application or network services to those subscribers. For example, an ASP may offer gaming, Video on Demand, or access to VPNs via IPsec or some other IP-tunneling method. The ASP service may be subscriber-specific, or communal when an address is shared using NAPT throughout a Customer Premises Network (CPN). It is envisioned that the ASP environment will have user-level rather than network-access-level identification, and that a common Lightweight Directory Access Protocol (LDAP) directory will assist in providing user identification and preferences.

Logical elements used by ASPs typically include routers, application servers, and directory servers. The relationship between the ASP Network, the A10-ASP interface, and the Regional Network is shown in FIG. 2.

3.2.2. Capabilities

The capabilities of the ASP may include, but are not limited to, for example: authenticating users at the CPN; assignment of QoS to service traffic; customer service and troubleshooting of network access and application-specific problems; and/or ability to determine traffic usage for accounting purposes and billing.

3.3. Regional Access Network

Figure 3:
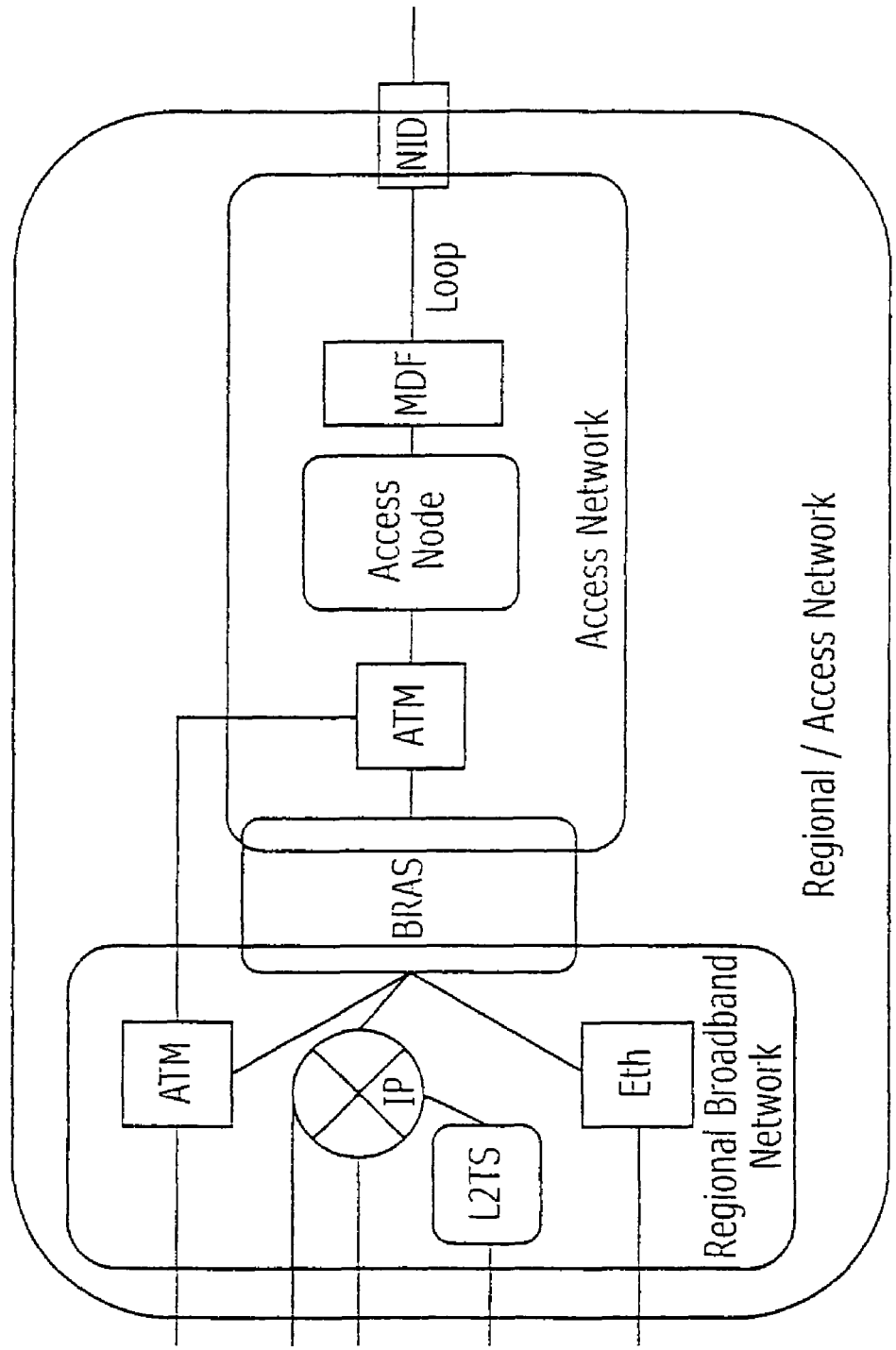
FIG. 3 is a block diagram that illustrates the regional/access network in accordance with some embodiments of the present disclosure.

The Regional/Access Network comprises the Regional Network, Broadband Remote Access Server, and the Access Network as shown in FIG. 3. Its primary function is to provide end-to-end data transport between the customer premises and the NSP or ASP. The Regional/Access Network may also provide higher layer functions, such as QoS and content distribution. QoS may be provided by tightly coupling traffic-engineering capabilities of the Regional Network with the capabilities of the BRAS.

3.3.1. Broadband Remote Access Server

The BRAS performs multiple functions in the network. Its most basic function is to provide aggregation capabilities between the Regional/Access Network and the NSP/ASP. For aggregating traffic, the BRAS serves as a L2TP Access Concentrator (LAC), tunneling multiple subscriber Point-to-Point Protocol (PPP) sessions directly to an NSP or switched through a L2TS. It also performs aggregation for terminated PPP sessions or routed IP session by placing them into IP VPNs. The BRAS also supports ATM termination and aggregation functions.

Beyond aggregation, the BRAS is also the injection point for providing policy management and IP QoS in the Regional and Access Networks. The BRAS supports the concept of many-to-many access sessions. Policy information can be applied to terminated and non-terminated sessions. For example, a bandwidth policy may be applied to a subscriber whose Point-to-Point (PPP) session is aggregated into an L2TP tunnel and is not terminated by the BRAS. Sessions that terminate on (or are routed through) the BRAS, however, can receive per flow treatment because the BRAS has IP level awareness of the session. In this model, both the aggregate bandwidth for a customer as well as the bandwidth and treatment of traffic per-application can be controlled.

3.3.2. Access Network

The Access Network refers to the network between the ATU-R and the BRAS including the access node and any intervening ATM switches.

3.3.3. Access Node

The Access Node provides aggregation capabilities between the Access Network and the Regional Network. It is the first point in the network where traffic on multiple DSL lines will be aggregated onto a single network. Traditionally the Access Node has been primarily an A TM concentrator, mapping PVCs from the ATU-R to PVCs in the ATM core. It has also shaped and policed traffic to the service access rates.

As described in TR-059, the responsibility of policing ATU-R to ATU-C PVCs to the subscribed line rate is moved from the Access Node to the BRAS to establish additional bandwidth on the DSL line for additional services. The Access Node sets the line rate for each PVC at the synch rate (or slightly less) of the ATU-R and A TU-C. This will make the maximum amount of subscriber bandwidth available for services. The BRAS polices individual sessions/flows as required to their required rates and also performs the dynamic changes when bandwidth-on-demand services are applied.

3.4 Evolution of the DSL Network

Phases I and 2 of TR-059 introduce the capability to change the Regional/Access network from an IP unaware layer 2 network to a network that leverages IP awareness in key elements to enable IP QoS and more efficient and effective use of bandwidth. These key IP aware elements are the BRAS and the RG as shown in FIG. 4.

Figure 4:
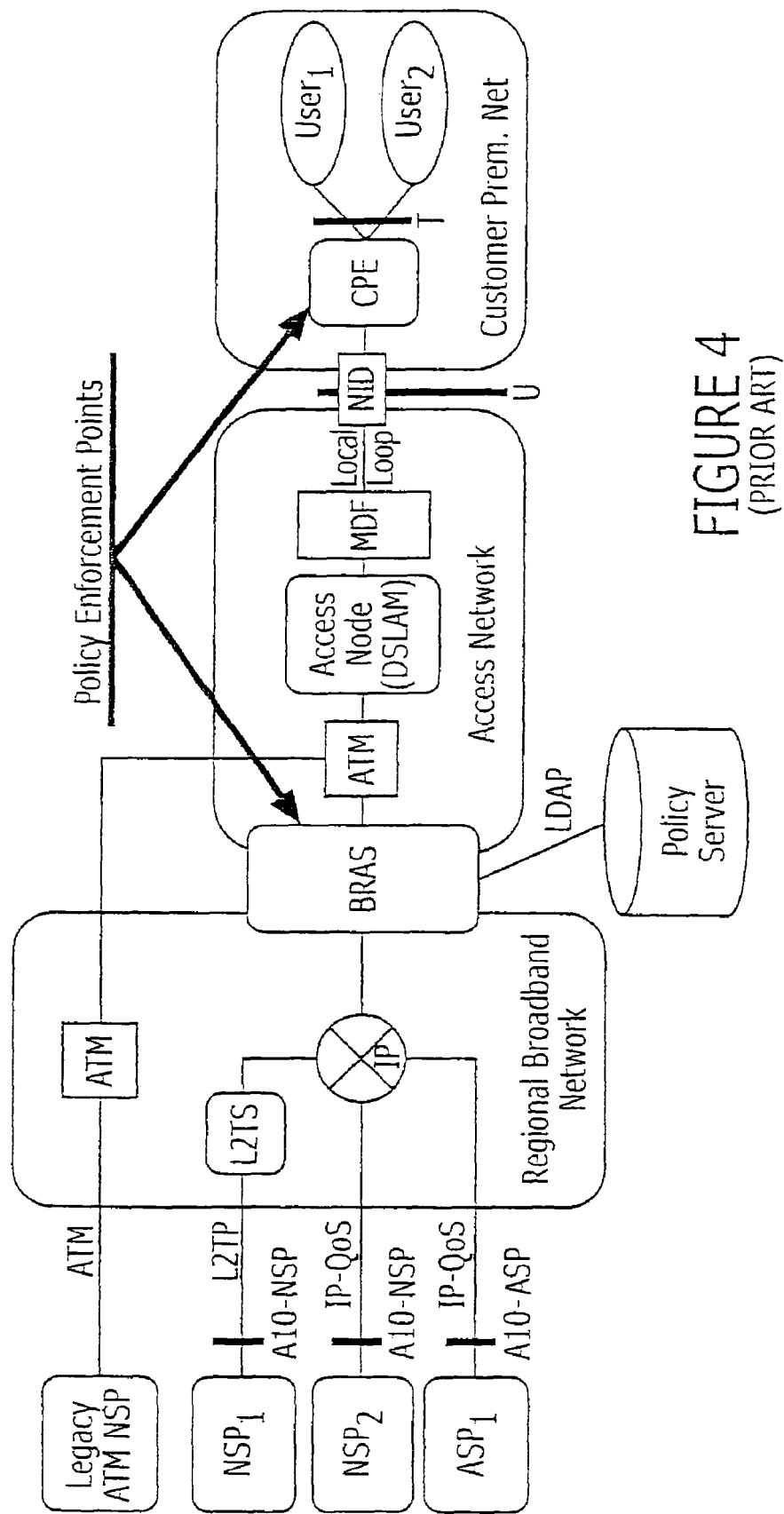
FIG. 4 is a block diagram that illustrates a broadband remote access server (BRAS) and a routing gateway (RG) in a network accordance with some embodiments of the present disclosure.

FIG. 4 represents a paradigm shift in that the BRAS and the RG are now responsible for managing the traffic flow through the network. By enabling these devices to accept policy rules at subscriber session and application levels, IP flows can be managed in a more flexible and "dynamic" manner than previously possible. The BRAS is responsible for managing IP traffic in the downstream direction such that traffic is scheduled according to priority and in a way that ensures that congestion in the downstream network is reduced (i.e., hierarchical scheduling). The RG similarly, manages the scheduling of traffic in the upstream direction based on the priority of the session and/or application. Given that the RG cannot be trusted, the BRAS performs a policing function to ensure the upstream bandwidth in the access network is utilized appropriately. Note that the priority and bandwidth policies can be applied at the PPP session and or application levels; therefore, there is flexibility in how traffic is treated in the network.

3.4.1. Access Session Types

Figure 5:
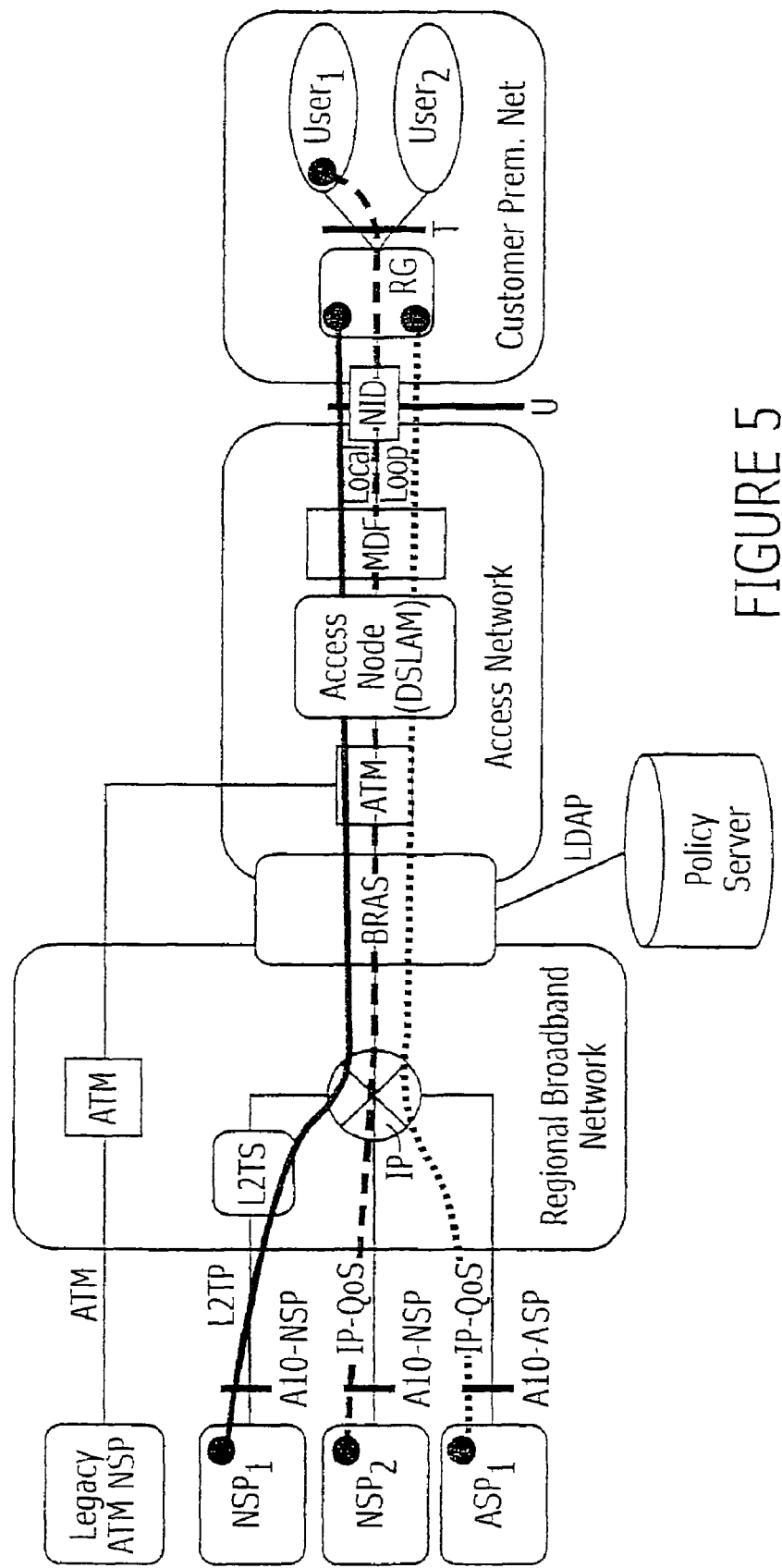
FIG. 5 is a block diagram that illustrates access session types in the network of FIG. 4 in accordance with some embodiments of the present disclosure.

The architecture also evolves the types and number of access sessions (specifically PPP sessions) that a subscriber would typically establish to a service provider. Where previously there had been just one access session to an ISP, there are now multiple access sessions with three basic types:

Community NSP—Shown in FIG. 5 as the solid line between the RG and $NSP_1$, this type of access session is established between an RG and an NSP. It is called the Community NSP connection because all the devices within the Customer Premises Network share the connection to the NSP using the Network Port Address Translation (NPAT) feature of the RG. Because the Community NSP connection is given the Default Route at the RG there can typically be only one. This connection is typically set up to an ISP to provide Internet access to all the devices in the Customer Premises Network. This PPP session may terminate on the BRAS or may pass through the BRAS intact and be placed into a L2TP tunnel to the NSP.

Personal NSP—Shown in FIG. 5 as the dashed line between $User_1$ and $NSP_2$, this type of access session is established between a device within the Customer Premises Network and an NSP. It passes through the RG at the Ethernet (PPPoE) level. It is called the Personal NSP connection because only the device within the Customer Premises Network from which the connection was established can access the NSP. This connection may avoid using the NPAT feature of the RG. This connection is typically set up to an ISP or a corporation to provide private or personalized access, or any access that cannot traverse the NP AT sharing mechanism at the RG. This PPP session may terminate on the BRAS or may pass through the BRAS intact and be placed into a L2TP tunnel to the NSP.

ASP—Shown in FIG. 5 as the dotted line between the RG and ASP1, this type of access session is established between an RG and the ASP network. It is typically a single connection that is shared by all the ASPs. Because the Community NSP connection is typically given the Default Route at the RG, the ASP connection must provide the RG with a list of routes to the ASP network. Also because there is not a default route to the ASP network, it may not be possible to provide typical Internet access through the ASP connection. This connection is typically set up to the ASP network to provide application-specific and QoS-enabled access among all the applications in the ASP network and all the devices in the Customer Premises Network. This PPP session type may terminate on the BRAS so that per application flow treatment can be applied.

4. QOS Capabilities of the Application Framework 4.1 General Approach

TR-059 describes a hierarchical scheduling approach leveraged by the BRAS to manage the downstream links between the BRAS and the RG. Similarly, it describes how the BRAS leverages policing techniques (including a random discard enhancement) to apply backpressure to the upstream source to minimize potential congestion in that direction. The application framework provides a mechanism for service providers to modify bandwidth and QoS. In particular embodiments of the present disclosure, to simplify the number of queues to be managed in the BRAS and RG, this framework assumes that only the ASP session has the ability to support per application flow treatment. In such embodiments, NSP access sessions can only be managed in terms of the aggregate bandwidth and priority with respect to other access sessions on the DSL line. Because many ASPs share the ASP access session, the bandwidth and priority of the session is set by the Regional/Access provider and typically cannot be modified by an ASP. The ASP can however modify the characteristics of specific applications within the ASP PPP session by assigning the application to a particular queue and treatment type. The BRAS and RG may schedule or police packets based on one or more of the following parameters: the priority of the access session; the current packet's relation to the rate limit of the access session; the priority of the application within the access session (only supported for the ASP PPP Session); and/or the current packet's relation to the rate limit of the application or queue, for example, an EF rate limit supported for the ASP PPP session.

Network resources are typically not reserved in this model. Instead, traffic engineering policies and intelligent scheduling and policing of packets is leveraged to achieve aggregate QoS characteristics. Similarly, the Differentiated Services (Diffserv) model is leveraged as a way to classify, mark, and schedule packets. The QoS approach that has been applied to the application framework assumes that these capabilities are in place and that QoS relationships can be viewed within a single subscribers DSL "connection" (ATM VC) between the BRAS and the RG.

Further, if a pragmatic approach to providing QoS is taken, some additional simplifying assumptions can be made. It is expected that initially there will only be a small number of applications requiring QoS. The expected applications include VoIP, video conferencing, video on demand, and gaming. It is unlikely that the majority of DSL customers will subscribe to all of these services and expect to use them simultaneously. Rather, it is expected that only a small number of applications (e.g., 2 or 3) will need to be managed concurrently on a DSL line basis. The expected applications also imply a certain priority relationship among themselves. If while playing an Internet game a VoIP call comes in, it may be generally agreed that the VoIP session should take precedence over the gaming session (if finishing the game is more important, then the user can choose not to answer the call). As long as these assumptions hold true, then a small number of applications can be managed effectively with a small number of queues and a simple priority arrangement among them. As the number of applications requiring QoS increases, however, these assumptions may have to change and the QoS approach may need to evolve to support a finer granularity.

The number of queues available for applications within the ASP PPP session is five, in accordance with some embodiments of the present disclosure. This may change over time, in accordance with other embodiments of the present disclosure, but initially the number of queues is likely to be small. Diffserv like treatment is assumed when describing the queue behaviors and can be classified as one expedited forwarding (EF) queue, up to 3 assured forwarding (AF) queues or one best effort (BE) queue. The EF queue typically receives the highest priority and is typically served first. This queue type is defined for constant bit rate type servers. A rate limit associated with this queue is put in place so it should not be able to consume all the DSL line resources. This queue will likely be reserved for voice applications. AF queues are defined for traffic that is more variable in nature and would be inefficient to associate with a fixed amount of network resources (EF). Queues in this category could receive different levels of priority or could simply be used as an aggregate priority but each queue may have a different rate limit applied depending on the requirements of the application using that queue. To simplify the approach, the framework initially assumes the later case where AF queue receive a "medium" priority treatment and the different queues are used to provide different bandwidth needs (i.e. rate limits). A BE queue is the default queue and has resources available to it only after packets that are in profile for the EF and AF queue are served.

The approach to establishing QoS and bandwidth requirements in the network is one of provisioning rather than signaling. The BRAS and RG will be provisioned with the classifiers to identify flows and queue them appropriately. As a result the services that this model supports are services that fit more into a subscription model rather than an instantaneous establishment of service and QoS. This potential disadvantage, however, does not have to be apparent to the end users. Many services may require that the customer establish an account and perhaps even require the shipment of special hardware or software, for example, VoIP Phone, PC camera, and the like. During the time frame that the customer is establishing service with the ASP, the DSL network can be provisioned to support the service. It is important to note that the provisioning time lines are not expected to be in terms of days, but could be as small as a few minutes depending on how the application framework is implemented.

Figure 6:
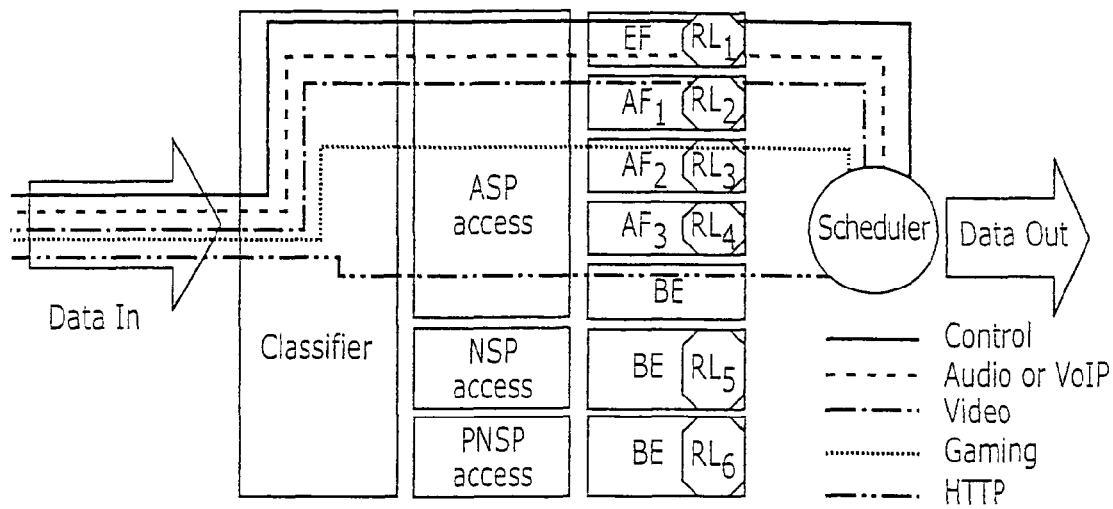
FIG. 6 is a block diagram that illustrates traffic classification and queuing treatments in accordance with some embodiments of the present disclosure.

Given that a signaled approach to QoS is not included in the framework of certain embodiments of the present disclosure, real-time admission control cannot be accomplished at the network layer in such embodiments. While it could be possible to block the subscription of a new service based on the current, subscribed services, such a model may be too restrictive because it does not allow the user to subscribe to two applications that they would not intend on using simultaneously. Instead, a strict priority relationship among the applications flows is used to manage simultaneous application interactions. Rate limits are also applied at the RG and BRAS so that no single application can consume all the subscriber's DSL resources and to provide some level of fairness. An example application relationship, in accordance with some embodiments of the present disclosure, is shown in FIG. 6 and Table 1. In this example, it is assumed that the NSP and PNSP sessions receive best effort treatment with respect to traffic that is in profile for the EF and AF queues in the ASP session. Other business models are possible as described in Section 4.3.

TABLE 1

Example Application Priority Relationship within the ASP Session

| Application | Queue | Rate Limit of the Queue | Classification Parameters |
|---|---|---|---|
| VoIP | | | |
| Signaling | High Priority | 100 Kbps | SIP Proxy IP Address & SIP |
| Bearer | High Priority | 100 Kbps | Gateway IP Address & RTP |
| Video Conf | | | |
| Control Stream | High Priority | 100 Kbps | SIP Proxy IP Address & SIP |
| Audio/Voice | High Priority | 100 Kbps | DSCP & MCU IP Address & RTP |
| Video | Medium Priority | 384 Kbps | DSCP & MCU IP Address & RTP |
| Gaming | Medium Priority | 100k | Gaming Server IP Address |
| HTTP | Low Priority | None | Default |

FIG. 6 illustrates a queuing arrangement where there are five queues (EF, $AF_1$, $AF_2$, $AF_3$, and BE) within the ASP session for per application treatment. In this arrangement, these queues can be characterized as high (EF), medium (AFs), and low priority (BE) treatment. Table 1 illustrates that voice will receive strict priority over other applications. Rate limits can be applied to each of the applications to ensure that a single application cannot starve out all other applications, but this requires dedicating a queue to each rate-limited application. Priority alone may not resolve all of the possible application interactions. In the example above, both the gaming and video conferencing video stream have the same priority. In the case that both applications are active they would compete over the first 100k of bandwidth available to the medium priority class. The rate limit associated with the $AF_2$ queue allows the video conferencing application to take precedence over the remaining resources up to its queue's rate limit. If the user experience for either the video stream or the game is unacceptable, the user will have to make their own admission control decision and pause or shut down the one they wish to have lower priority.

4.2 Classification

There are two basic levels of classification that need to be applied in the framework: The first level is at the PPP session level. Classification at this layer is accomplished through inspection of the Fully Qualified Domain Name (FQDN) used when the PPP session is initiated. The second level is at the application layer—according to flows. To provide an application flow with the proper scheduling treatment, it is desirable to easily classify the flow. Classification of application flow may be accomplished using the header fields of the IP or Ethernet Packet (e.g., IP 5 tuple, DSCP, 802.1p). Using the interface specified in Section 6, ASPs may communicate the classification information that is used in the BRAS and RG. This same interface may be used to communicate the priority and desired bandwidth (rate limit) to be associated with the classifier. In certain embodiments of the present disclosure, this information is communicated at subscription time, and is not intended to be established dynamically on a per-flow basis. As a result in such embodiments, the classification information is expected to be static. The ASP may provide a well known IP address, protocol, and/or Port to be used for classification purposes. In particular embodiments of the present disclosure, within the customer premises network (CPN), the CPE will be assigned private IP addresses from the RG. When traffic leaves the CPN, the RG will perform NPAT enabling public routing of the packets. The use of private addresses presents two issues: Given that the CPE behind the RG will be using dynamic private addresses, they cannot be used as part of the classification parameters. Secondly, many applications require signaling messages to convey dynamic IP addresses and port numbers of media receivers in their payloads. Existing static IF/transport layer policies may not be adequate in supporting session endpoints separated by NAT and firewall entities. Therefore, Application Layer Gateway (ALG) capabilities may be required at the RG for opening and closing pinholes in the firewalls and maintaining the proper address translations for dynamically created ports associated with flows created by session endpoints. Some considerations with regard to ALG capabilities are discussed in the next sections.

The BRAS can associate the IP address or ATM PVC of the RG with a subscriber and then use the ASP's address to match the source or destination address of the packets to properly classify the flow. At the customer premises, the RG can match the ASP's address as the means of classifying the flow. Therefore, only the ASPs IP address (and possibly port and protocol identifier) may be required for the bidirectional flow to be classified correctly.

Certain types of applications may require additional information to capture the flow. For these types of applications, the endpoints may need to provide additional classification information in the IP packet header by marking the diffserv code point. The use of diffserv code points (DSCP) may be standardized which may allow the application to intelligently mark packets based on the expected treatment in the network. DSCPs assigned by an untrusted entity can only be used after some edge device has performed a check on the classification of the packet to ensure that it was marked correctly. The RG may not be considered a trusted element and, therefore, the BRAS may need to police any classification performed by the RG—rather than simply accepting the DSCP that was provided. Depending on the relationship to the ASP, the Regional/Access network may be able to trust packets marked by the ASP. If the ASP is not trusted, either the BRAS or some other edge device may need to police the DSCPs.

4.3 Business Models for Supporting Concurrent NSP and ASP Access Sessions

Figure 7:
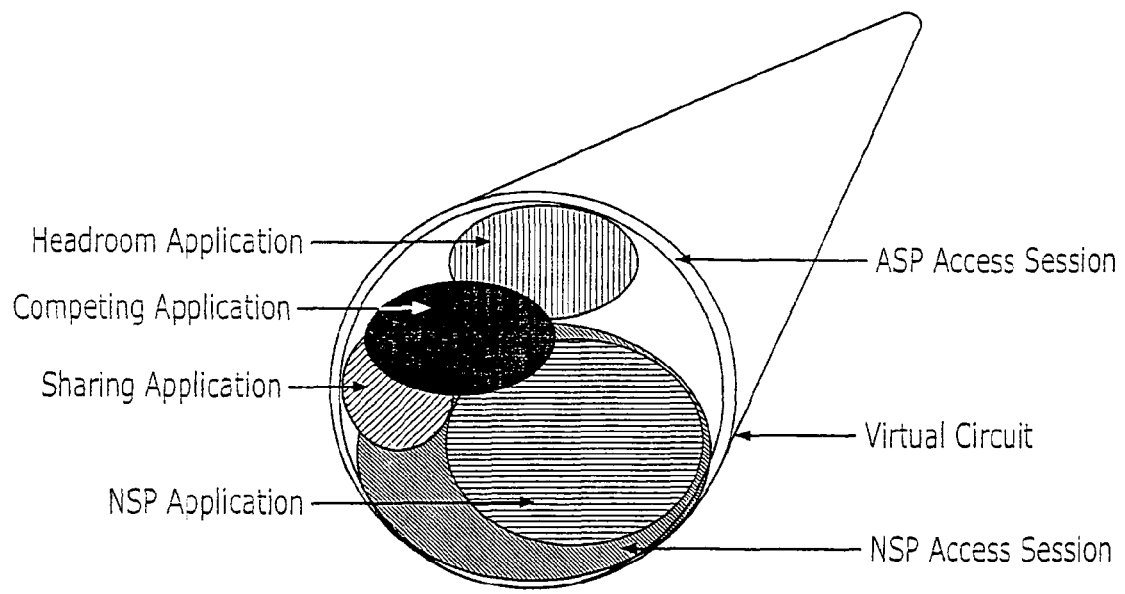
FIG. 7 illustrates business model options for using bandwidth on a communication medium in accordance with some embodiments of the present disclosure.

FIG. 7 illustrates several bandwidth relationships that can exist on an ADSL access loop. In FIG. 7, the outer circle represents the total bandwidth that is available within a virtual circuit on an ADSL line after the modems have been allowed to sync to a higher rate than is conventional. Within this total bandwidth there are two access sessions shown: an ASP Access Session and a NSP Access Session. The NSP Access Session, shown in light horizontal stripes, occupies a smaller space than the whole Virtual Circuit. This indicates that the NSP access session is not allowed to access the total bandwidth on the Virtual Circuit. Conventionally, the NSP Session and the Virtual Circuit would have been the same bandwidth. By increasing the sync rate on the DSL modems, additional bandwidth is created that exceeds that which the NSP has purchased.

The ASP access session has essentially the same set of bandwidth as the Virtual Circuit. This would indicate that some set of conditions exist where the ASP session could occupy all the bandwidth on the ADSL line. Several Applications are shown overlaid on the sessions and within the bandwidth limits assigned to the NSP and ASP. The NSP application (dark horizontal stripes) is a strict sub-set of the NSP Session and is using a large fraction of the NSPs allowed bandwidth. The three other applications, however, show three salient relationships and business models that can exist between applications in the ASP network and both applications as well as the access session for the NSP. These relationships will be described in the sections that follow.

4.3.1 Simple Bandwidth Partitioning

The first example is the Headroom Application and is shown in vertical stripes. This application is allowed to make use of only that bandwidth that the NSP could never access. In this type of model, a NSP is provided a dedicated amount of bandwidth on the access loop—even if there is not dedicated bandwidth through the access network. In such an arrangement, ASP applications (or additional NSP access sessions) would only receive bandwidth to which the modems could sync that was over and above the rate sold to the NSP. In this arrangement, if the sync rate were at or below the rate sold to the NSP, no additional applications or access sessions could be provided. This arrangement may be unnecessarily restrictive and may be difficult to implement.

The second example is the Sharing Application (shown checkered). This application has access to all the bandwidth described by the headroom application, but also has access to additional bandwidth sold to the NSP, but not currently in use by applications in the NSP Session. A Sharing application can make use of all the bandwidth on the VC, but can only use the "NSP" bandwidth when the NSP session is not using it. Unlike the previous model, this application can receive bandwidth even when the sync rate is at or below the rate sold to the NSP. If the NSP applications are making use of all their bandwidth, however, then the result is similar to the arrangement described in the Headroom application. This arrangement could be described as work conserving, and may be used for simple bandwidth partitioning.

4.3.2 Priority and Dynamic Bandwidth Sharing

The third example is the Competing Application (shown in transparent gray). In this example, the application may have access to some or all of the bandwidth used by the NSP and it may have access to that bandwidth with greater, equal, or lesser precedence than the NSP applications. Similarly, this application may also be able to pre-empt bandwidth that other ASP applications are attempting to use. This is the most complex arrangement, and the most flexible.

A competing application can compete for the bandwidth that NSP applications are attempting to use. Several cases of competing applications exist:

1. The first case is when a competing application has the same precedence as that of the NSP application(s). In this case, bandwidth is shared fairly according to a typical algorithm, like round-robin, or Weighted Fair Queuing (WFQ). Also, inter-application congestion avoidance mechanisms, like those that are part of TCP can decide how applications would share bandwidth in this case.
2. A second case is when a competing application has greater precedence than that of the NSP application(s). In this case, bandwidth is given to the competing application in strict priority—only "left-over" bandwidth is provided to the other applications. This is the highest QoS level, and may be provided with an upper bound on the bandwidth that the application can obtain, i.e., a rate limit. If the application exceeds the upper bound, its traffic will be dropped. This case is the most applicable to a VoIP application because it provides very low latency and because VoIP is not bursty to the point that the rate limit would be exceeded.
3. A third case is when a competing application has a combination of higher precedence and equal precedence. A rate, such as a committed information rate (CIR), is set and the application gets the same treatment as described in case 2 up to that rate. If the application bursts above CIR, then that traffic which bursts is treated differently; it must compete with the other applications as described in case 1.
4. A fourth case is when a competing application has a combination of higher precedence and lower precedence. A rate, such as a CIR, is set and the application gets the same treatment as described in case 2 up to that rate. If the application bursts above CIR, then that traffic which bursts is treated differently; it is treated like a sharing application—only receiving the leftover bandwidth that the NSP application does not use.
5. A fifth case is when a competing application has a combination of higher precedence, equal precedence and a strict rate limit. A rate, such as a CIR, and a second, higher rate, Peak information Rate (FIR), is set. The application gets the same treatment as described in case 3 up to the PIR rate. If the application bursts above PIR, then that traffic will be dropped.
6. Finally, there is a case when a competing application has a combination of higher precedence, equal precedence and lower precedence. As in case 5, a rate, such as a CIR, and a second, higher rate, such as a PIR, is set. The application gets the same treatment as described in case 3 up to the PIR rate. However, if the application exceeds the PIR, then that traffic is treated like a sharing application—only receiving the bandwidth that the NSP does not use.

These treatments can also be provided among ASP applications and with finer granularity among multiple applications.

4.4 Considerations Associated with this Approach

4.4.1 Static Classifiers

The following issues may be considered when using static classifiers:

1. There can only be one class of treatment per application. There is no sense of individual users within the residence using the same service, but desiring different levels of service.
2. Dynamic, commutative peer-to-peer applications cannot be easily captured.
3. Applications with multiple flows between the same destinations cannot be easily differentiated.

For applications like VoIP and video conferencing where the end points of a call may not be known a-priori, it is difficult to use a static classification scheme.

Below are several approaches to resolve these issues:

a. Force the application to some well-known IP address that can be used for classification purposes. This is true of a multipoint videoconference service that leverages a centralized (ASP provided) MCU or a VoIP call that is destined for a PS1N gateway or conference bridge. In both these cases, a static classifier can be used. This same approach could be leveraged for on-net or point-to-point video calls. These calls could be routed to utilize an MCU, conference bridge, or PSTN gateway even though they are not required for any other reason other than classification. There are vendors in the marketplace that have developed proxy devices for this purpose. This may be less resource efficient, however, than allowing the calls to flow point-to-point.

b. Classify based on protocol used. For example, classification based on the use of R TP could be used. Basing the classification on protocol alone, however, would enable other applications that use that same protocol to take advantage of QoS in the network without having to pay for it. Additionally, differentiation between application flows that use the same protocol may not be achieved (e.g., voice and video using RTP).

c. Rely on the CPE to mark packets. In this case the IP phone or video conference application emits packets marked with the proper diffserv code point so that the RG and BRAS can classify based on that marking. Any application choosing to mark their traffic, however, would be able to take advantage of QoS in the network without having to pay for it.

d. QoS aware Application Layer Gateway (ALG). Similar to the way ALGs have been developed for allowing signals to traverse NPAT and firewalls by inspecting signaling messages, a QoS ALG may be created to inspect the signaling packets for SDP messages and to dynamically create classifiers during call setup. Given that initial signaling may be destined for a well known address, (SIP proxy) the ALG can be statically configured to treat all RTP flows set up using a given SIP proxy regardless of the actual communicating peers. As the ALG inspects the packets to modify the RG's firewall rules, it can also be used to modify the RG's classification rules. This type of approach could be leveraged at the RG, where the number of sessions is small, but may present scaling issues if implemented in the BRAS.

e. Establish the classification information at call set up. This may require complex real time signaling mechanisms to be in place in the network to modify classifiers at call establishment and teardown.

Until a signaling approach is available, using an approach similar to that described in (a) appears to be the most reasonable from a technology and service offering perspective. A video conferencing ASP that does not provide centralized Media Control Unit (MCU) capabilities may only add limited value above that which is already available in the market. In the near term, most VoIP calls will likely be destined for PS1N gateways, and this arrangement provides a simple way to classify.

Differentiating applications with multiple flows between the same destinations, is typically seen within (but is not limited to) commutative services, like video conferencing. These applications typically have multiple flows (control/signaling, audio, and video) associated with a single application, and there may be a desire to treat them differently. As long as they use different well-known IP addresses or protocol types, then a static classifier can be used. Unfortunately, when the same protocol type is used (e.g., RTP for both audio and video) then there may not be a way to differentiate those streams if they are both destined for the same IP interface (e.g., MCU). Below are three approaches to resolve this issue:

a. Require applications to use separate IP interfaces that expect differentiated treatment. An MCU, for example, could define one IP interface for video and another for audio. This would enable separate classification in the upstream and downstream direction in the RG and BRAS. Depending on the direction of the flow, either the source or destination can be used to match to the ASPs IP interfaces.

b. Rely on the application to mark packets. In this case, the videoconference application emits packets marked to the proper diffserv code point so that the RG and BRAS could classify based on that marking. As long as the packets are being transmitted to a well-known address, the classifier can use the combination of the DSCP and the destination IP. Given that there is a fixed IP address, no other applications would be able to utilize the QoS intended for this application.

c. Rely on knowledge of the actual RTP ports used by each of the flows to enable different treatments. This can be accomplished by statically assigning ports using a QoS ALG function as described above, or through the use of a signaling protocol.

4.4.2 Queue Structure

As the number of applications requiring QoS increases, so does the complexity of managing them in the access network. Over time, as more and more ASPs deploy applications requiring QoS and bandwidth management, the likelihood that multiple applications will be running simultaneously within the CPN may increase. The complexity of managing these applications in a small number of queues with only three levels of precedence may become increasingly difficult given that there may no longer be a well-defined priority relationship among them. One approach would be to increase the number of queue types and behaviors. Diffserv defines four assured forwarding (AF) classes each with three levels of drop precedence. The addition of multiple AF classes to a strict priority class (EF) and a low priority class (BE) already defined in the application framework can provide more granularity in queue and application behavior. It is unlikely, however, that the number of queues can be scaled with the number of applications available.

While a limited number of additional queues may be available, their expected behavior may become increasingly complex to describe. Unfortunately, to make use of these additional behaviors, applications must be able to define their requirements in a way that fits into this model. Ibis becomes a challenge for two reasons: First, many applications do not understand that level of granularity and particularly will not understand what other applications will be vying for the DSL line resources. Secondly, describing the inter-queue or inter-application behavior to ASPs so they can make use of these capabilities becomes more difficult as the number of queues increases without strictly defining the amount of resources reserved per queue. Ibis difficulty is in part the result of how diffserv was designed. Diffserv was not defined with the intent of managing per application flow behavior. Rather, it was defined to manage aggregate flow behaviors in the core of the network. As the number or simultaneous applications increases in the CPN and access network, the use of diffserv without resource reservation breaks down.

Leveraging a resource reservation approach can provide a mechanism for managing increasing numbers of applications. The reservation scheme need not necessarily require signaling. At subscription, time applications could reserve specific queues and could provide an intermediate solution. Longer term, as the number of applications continues to grow, a more dynamic reservation of resources will be required. In the dynamic case, applications may be able to reserve specific queues for the duration of the application flow, which will be released when they are done. In doing so, admission control to the DSL resources can be provided in a way that the applications behavior can be more clearly described. Use of Resource Reservation Protocol (RSVP) would provide an example of the former case. While having been defined for some time, actual RSVP implementations are elusive due to its general complexity and scaling limitations. Admission control provides one way to provide an application dedicated resources or to provide an indication when resources are not available. While conceptually attractive, it remains unclear if the complexity of such an approach is feasible.

5. Reference Data Model

Figure 8:
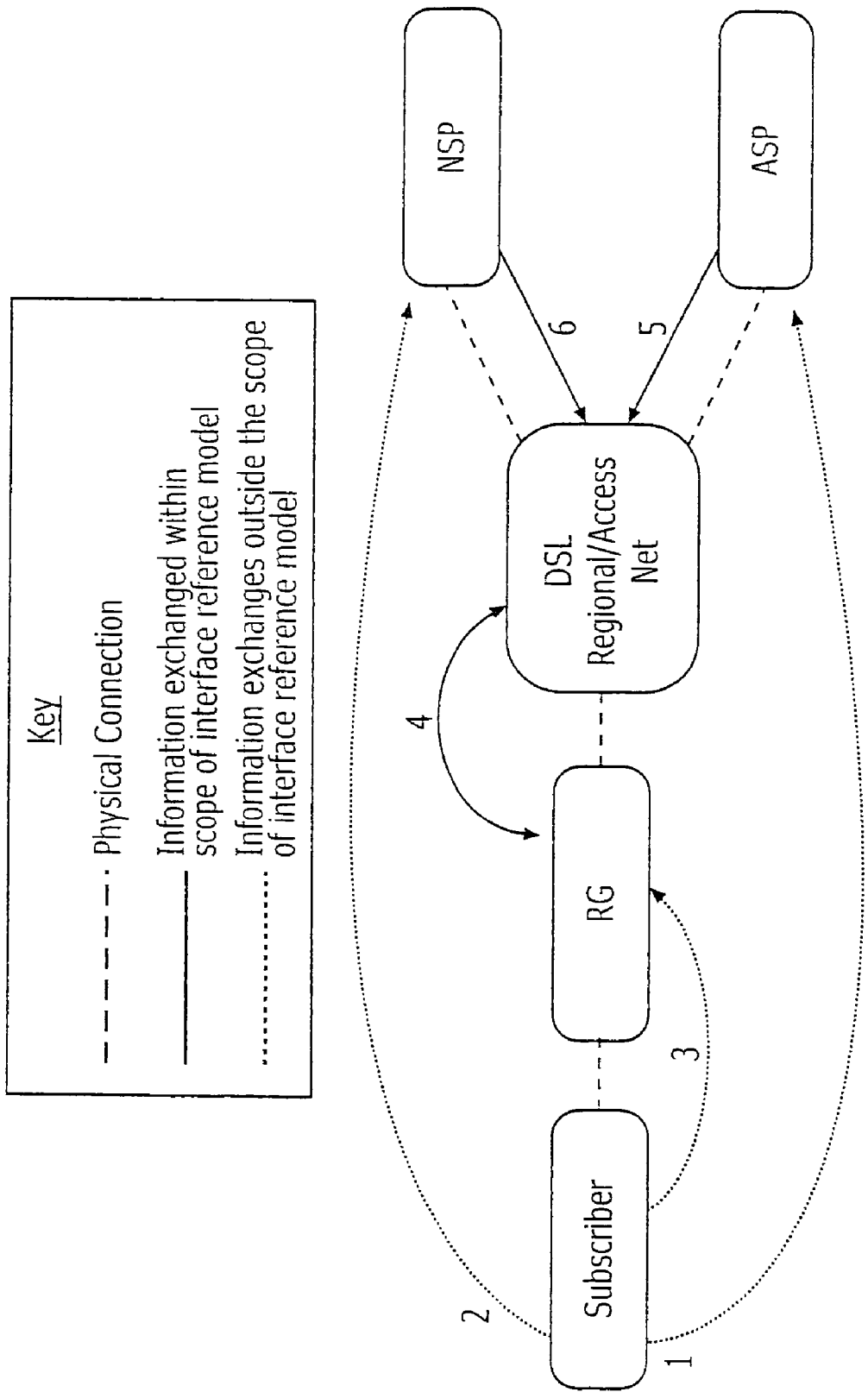
FIG. 8 is a block diagram that illustrates relationships between a subscriber, the RG, the regional/access network, an ASP, and an NSP.

In this section a description of the data required in each of the functional domains of the architecture (Regional/Access Network, RG, ASP, NSP, and subscriber) is presented. FIG. 8 illustrates a high level representation of the relationships between the different domains in accordance with some embodiments of the present disclosure. Based on this abstract view of the domains involved in providing an end-to-end service, a data model can be constructed.

Dotted lines 1 and 2 illustrated in FIG. 8 indicate that information is exchanged between the modules not specifically discussed with respect to the interface reference model. The dashed lines illustrated in FIG. 8 indicate a physical connection and the solid lines illustrated in FIG. 8 indicate that information is exchanged within the scope of the interface reference model. In particular, lines 1 and 2 illustrate exchanges between the subscriber and the NSP and ASP, respectively, when the subscriber, for example, signs up for service. Line 3 illustrates the configuration of the RG by the Regional/Access Network. It will be understood that this may only be for the initial install. The ACS located within the Regional/Access Network may handle all subsequent configuration changes. Line 4 illustrates the initiation of access sessions that are terminated in the DSL network. The ACS located within the Regional/Access Network may communicate with the RG for configuration updates. Finally, lines 5 and 6 of FIG. 8 illustrate communication between the NSP/ASP and the DSL network that establishes a DSL connection. The ASP and NSP may also communicate bandwidth and QoS changes per session or application.

Figure 9:
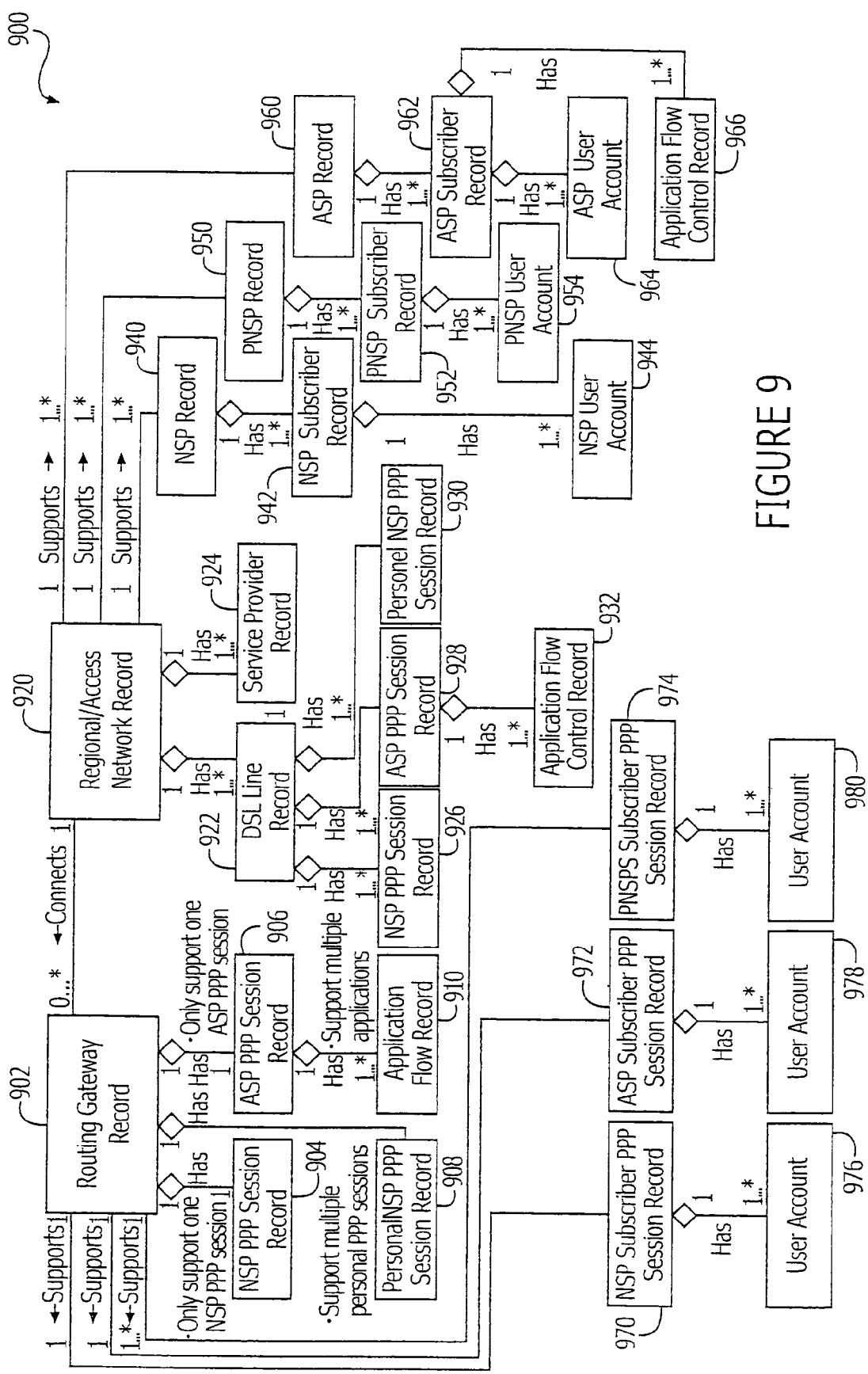
FIGS. 9-12 are block diagrams that illustrates a data architecture (model) for managing quality of service (QoS) in a network in accordance with some embodiments of the present disclosure.
Figure 10:
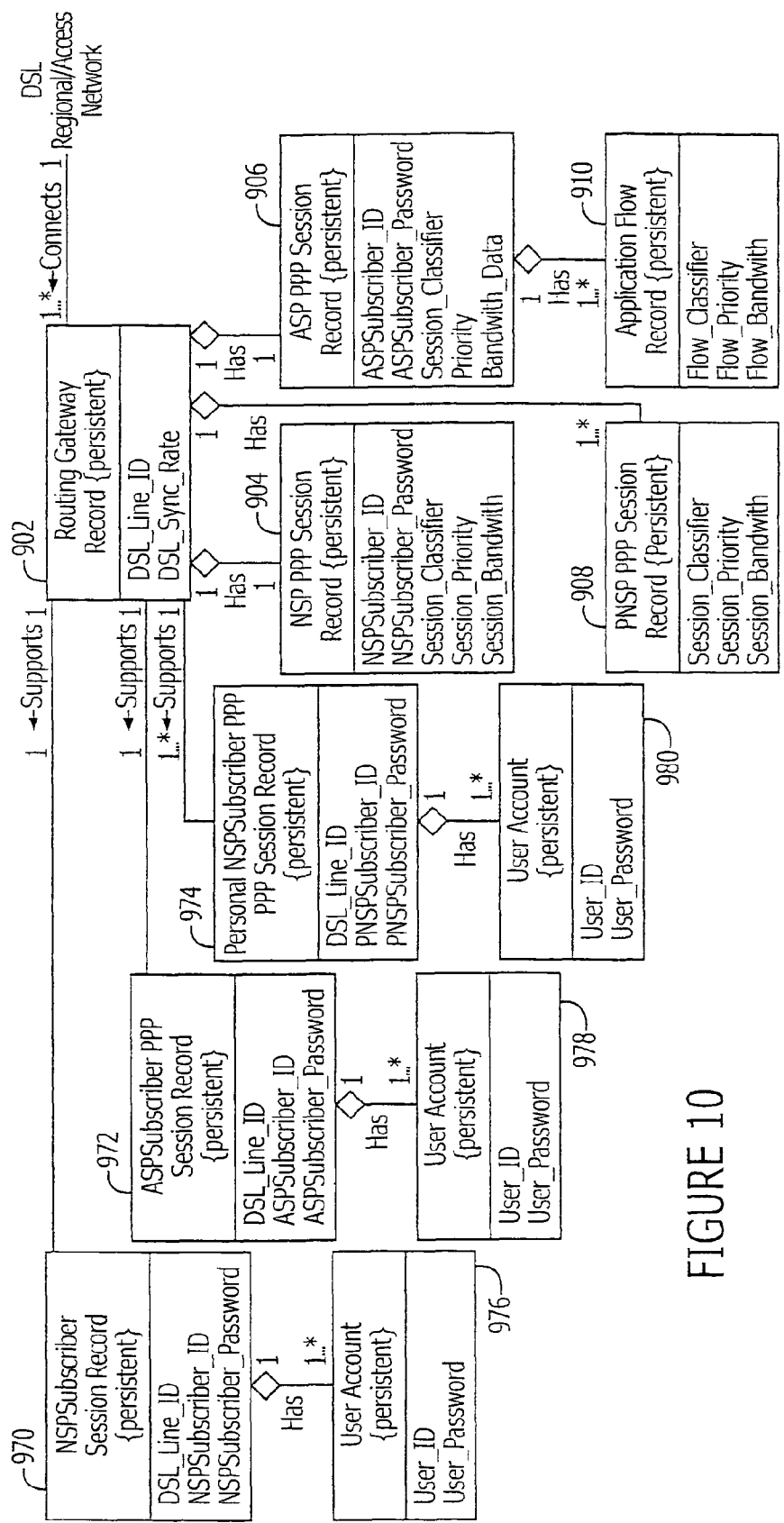
Figure 11:
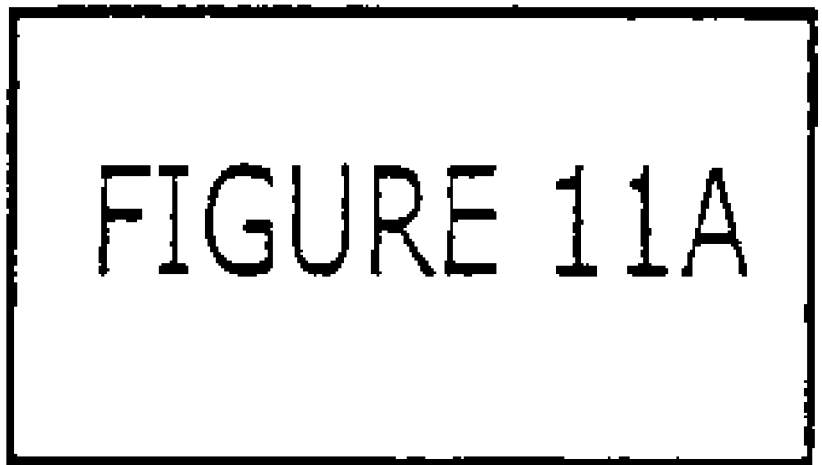
Figure 11:
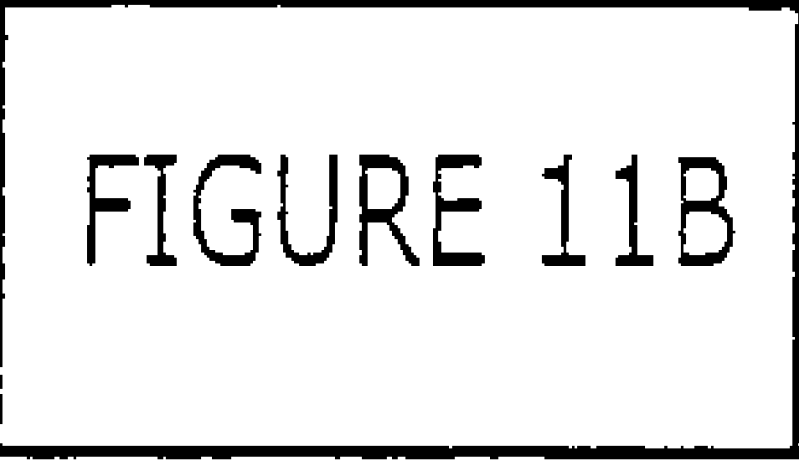
Figure 11A:
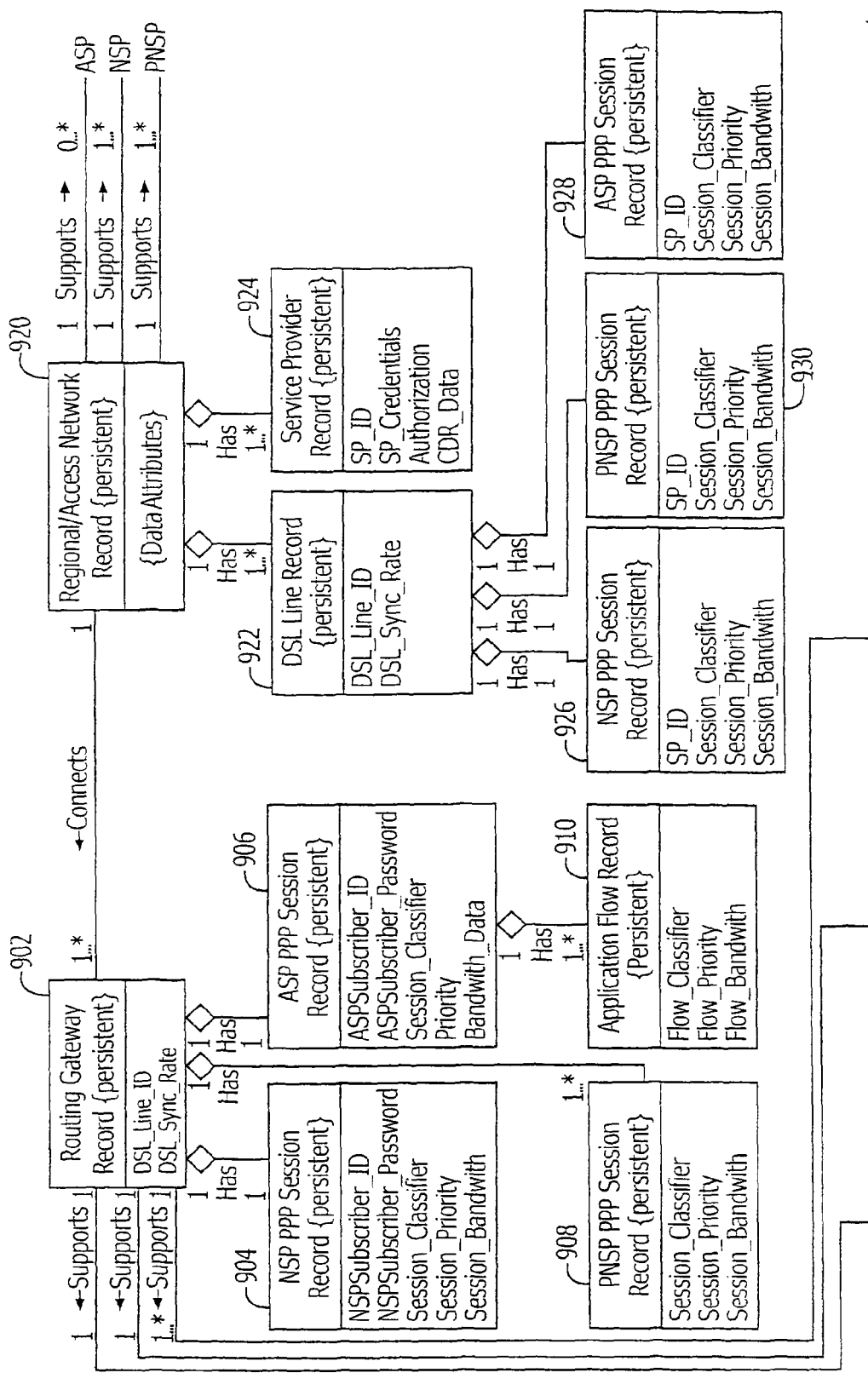
Figures 11A, 11B:
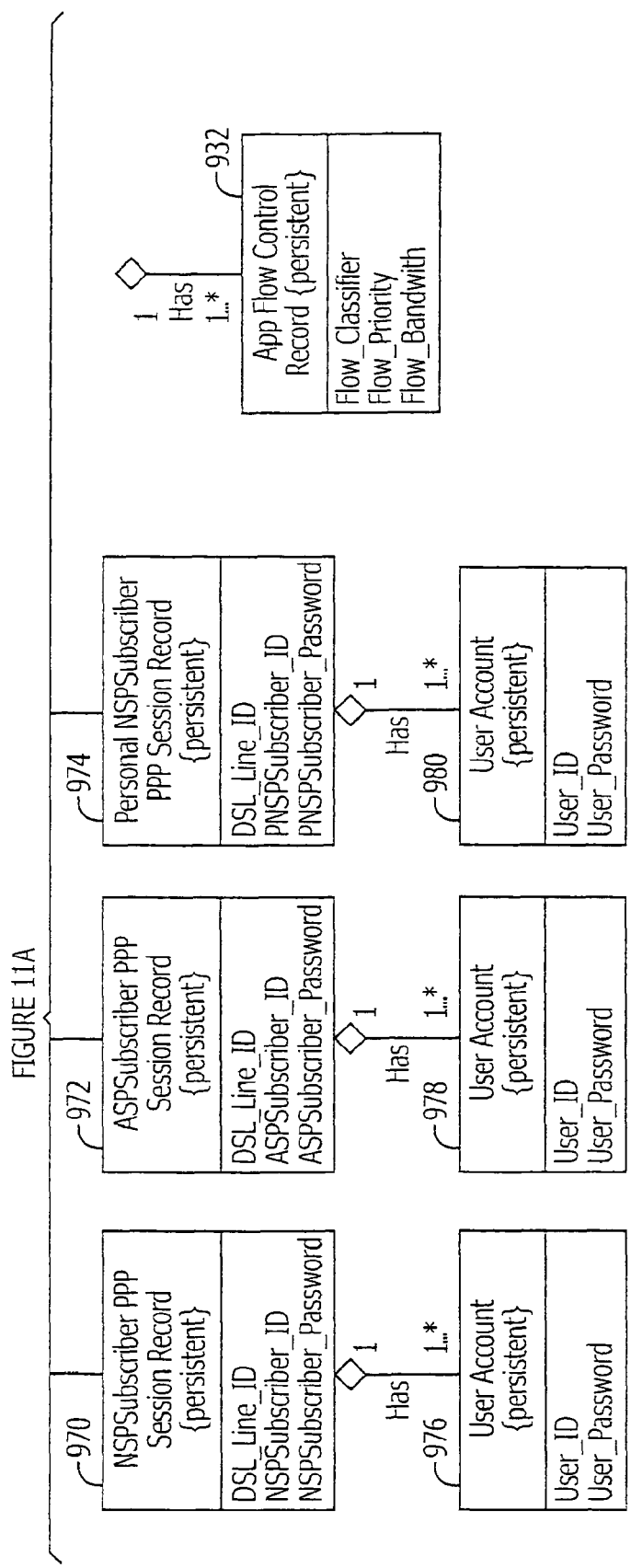
Figure 12:
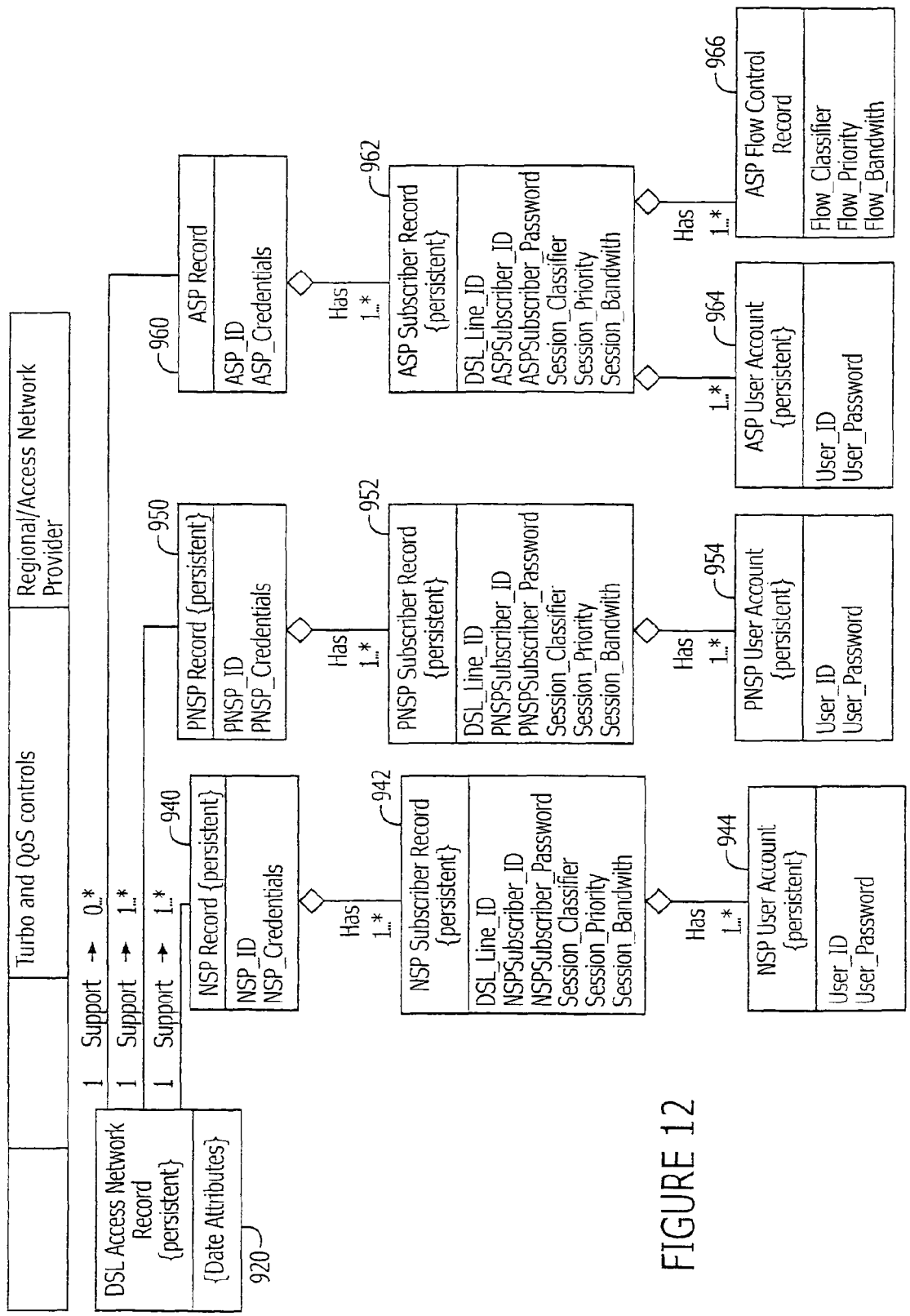

FIG. 9 depicts a UML model capturing the type of data used to support bandwidth and QoS management in accordance with some embodiments of the present disclosure. This model is provided for illustration purposes only and is not intended to represent a complete deployment implementation, which may use a wider scope of information beyond bandwidth and QoS. FIGS. 10 through 12 provide additional details within the main domains, in accordance with some embodiments of the present disclosure, and are described below. The remainder of this section provides a detailed description of the data records and attributes captured in the presented UML model.

5.1 Subscriber Maintained Data

The following data elements are maintained at Subscriber Premises (this record is maintained by the subscriber—it could be stored on a PC or any other storage device/media) in accordance with some embodiments of the present disclosure:

| Record Type | Elements | Description | Source |
|---|---|---|---|
| NSPSubscriber PPP Session Record 970 | | The subscribers need to know their DSL_line_ID, NSPSubscriber_ID and NSPSubscriber_Password for accessing their NSP networks. Only a single NSP PPP session record can exist. | |
| | DSL_Line_ID | DSL_Line_ID is a unique identifier for the DSL line. Currently the TN is used as such an identifier. | DSL_Line_ID is provided by the Regional/Access Network Provider at subscription time. |
| | NSPSubscriber_ID | This ID is used for accessing the NSP networks. | Assigned by the NSP at the time of subscription |
| | NSPSubscriber_Password | Subscriber_Password is initially set by the NSP, later it can be changed by the Subscriber. It is used together with the NSPSubscriber_ID to access the NSP networks. | Initially assigned by the NSP at subscription time. Can be changed by the subscriber. |
| Personal NSPSubscriber PPP Session Record 974 | | The subscribers need to know their DSL_line_ID, PersonalNSPSubscriber_ID and Personal NSPSubscriber_Password for accessing their Personal NSP network. Multiple records can exist. | |
| | DSL_Line_ID | As defined above | As defined above |
| | PersonalNSPSubscriber_ID | This ID is used for accessing the Personal NSP networks. | Assigned by the Personal NSP at the time of subscription. |
| | PersonalNSPSubscriber_Password | It is used together with the PersonalNSPSubscriber_ID to access the PNSP networks. | Initially assigned by the PNSP at the time of subscription. Can be changed by the subscriber. |
| ASPSubscriber PPP Session Record 972 | | The subscribers need to know their DSL_line_ID, ASPSubscriber_ID and ASPSubscriber_Password for accessing their ASP services. For each application they subscribe to, they need to maintain their User_ID and Password. Only one ASP PPP session record can exist. | |
| | DSL_Line_ID | As defined above | As defined above |
| | ASPSubscriber_ID | This ID is used for accessing the ASP networks. | Provided by ASP at the time of subscription |
| | ASPSubscriber_Password | It is used together with the ASPSubscriber_ID to access the ASP networks. | Initially assigned by ASP at the time of subscription. Can be changed by the subscriber. |
| User Account Record 976, 978, 980 | | This record is maintained by user/users of services provided over the Regional/Access Network. A user account is tied to a subscriber account. Multiple user accounts can be associated with a single subscriber account.<br>Note:<br>There is one or multiple User Account Record under each of the NSPSubscriber PPP Session | Created at the time of subscription to ASP services |

-continued

| Record Type | Elements | Description | Source |
|---|---|---|---|
| | User_ID | Record. Personal NSPSubscriber PPP Session Record, and ASPSubscriber PPP Session Record. This ID is used for accessing the given service. | Assigned by a given ASP to a particular user at the time subscription |
| | User_Password | It is used together with the User ID to access a given service | Initially assigned by a given ASP to a particular user at the time of subscription. Can be changed by the subscriber. |

5.2 Routing Gateway

Routing Gateway is a customer premises functional element that provides IP routing and QoS capabilities. The main functions of the RG may include one or more of: IP routing between the CPN and the Access Network; multi-user, multi-destination support (Multiple simultaneous PPPoE sessions (started from the RG or from devices inside the CPN) in conjunction with non-PPP encapsulated IP (bridged) sessions); network Address Port Translation (NAPT); PPPoE pass though; multiple queues with scheduling mechanism; and/or IP QoS.

The following data elements are maintained at the RG in accordance with some embodiments of the present disclosure:

| Record Type | Elements | Description | Source |
|---|---|---|---|
| Routing Gateway Record 902 | | Routing Gateway Record is maintained by RG. | It is initialized with the initial configuration by the manufacturer or configured by the user during the install process. The ACS can also update this record during and after the initial install. |
| | DSL_Line_ID | As defined above | As defined above |
| | DSL_Sync_Rate | DSL_Sync_Rate is the current physical layer synch rate of the DSL line. This record includes both upstream and downstream metrics. It also includes what is the maximum obtainable synch rate | It is populated by RG during modem training. |
| NSP PPP Session Record 904 | | NSP PPP Session Record is maintained by the RG to store information specific to the community NSP access session. This session is launched by the RG and provides the CPN with a default route. Only one community NSP record can exist. | |
| | NSPSubscriber_ID | This ID is used for accessing the DSL and NSP networks. | Assigned by NSP at subscription time. |
| | NSPSubscriber_Password | It is used together with the Subscriber_ID to access the DSL and NSP networks. | NSPSubscriber_Password is initially set by the NSP, later it can be changed by the Subscriber. |
| | Session_Classifier | This parameter contains classification parameters to identify the NSP PPP session (i.e. Ethertype and FQDN). | This value is populated based on configuration data received from the ACS. |
| | Session_Priority | Optional—Indicates the priority level of the NSP PPP connection relative to the other PPP sessions present—only required if DSL bandwidth is shared across PPP sessions and need to establish a priority relationship across the PPP sessions | This value is populated based on configuration data received from the ACS. |
| | Session_Bandwidth | The Session_Bandwidth contains information about the maximum bandwidth assigned to this NSP PPP access session. | This value is initialized based on a default value or on the Profile Data received from the ACS. |
| ASP PPP Session Record 906 | | ASP PPP Session Record is maintained by the RG to store information specific to the ASP access session. This PPP session is launched by the RG and receives routes, via RIP, to the ASP network. Only one ASP record can exist. | |
| | ASPSubscriber_ID | This ID is used for accessing the ASP network (and potentially ASP applications although the RG would not be involved). | Assigned by ASP at subscription time |
| | ASPSubscriber_Password | It is used together with the ASPSubscriber_ID to access the Regional/Access Network. (and potentially ASP applications although the RG would not be involved) | Initially set by the ASP, later it can be changed by the Subscriber |
| | Session_Classifier | This parameter contains classification parameters to identify the ASP PPP session (i.e. Ethertype and FQDN). | This value is populated based on configuration data received from the ACS. |

| Record Type | Elements | Description | Source |
|---|---|---|---|
| | Session_Priority | Optional—Indicates the priority level of the ASP PPP connection relative to the other PPP sessions present—only required if DSL bandwidth is shared across PPP sessions and need to establish a priority relationship across the PPP sessions | This value is populated based on configuration data received from the ACS. |
| | Session_Bandwidth | The Session_Bandwidth contains information about the maximum bandwidth (upstream and downstream) assigned to this ASP PPP access session. | This value is populated based on configuration data received from the ACS. |
| Application Flow Record 910 | | The Application Flow Record is maintained by the RG for each application service that subscriber or users of the DSL line subscribe to. It is used to store application specific data. Multiple application records can exist. | |
| | Flow_Classifier | Flow_Classifier contains classification parameters to identify the application flow (IP 5 tuple). | This value is populated based on configuration data received from the ACS. |
| | Flow_Priority | Indicates the priority level of the application within the ASP PPP connection. This parameter indicates the treatment of the application flow (what queue it should be placed in) as well as any marking requirements (DSCP). | This value is populated based on configuration data received from the ACS. |
| | Flow_Bandwidth | Flow_Bandwidth parameter is assigned to the given application based on the negotiated value between the ASP and the Regional/Access Network. It indicates the maximum upstream and downstream bandwidth. It is used by the RG to shape and police the application flow. | This value is populated based on configuration data received from the ACS. |
| Personal NSP PPP Session Record 908 | | Personal NSP PPP Session Record is maintained by the RG to store information specific to the Personal NSP access session. Multiple records can exist. | |
| | Session_Classifier | This parameter contains classification parameters to identify the PNSP PPP session (i.e. Ethertype and FQDN). | This value is populated based on configuration data received from the ACS. |
| | Session_Priority | Optional—Indicates the priority level of the PNSP PPP connection relative to the other PPP sessions present—only required if DSL bandwidth is shared across PPP sessions and need to establish a priority relationship across the PPP sessions. | This value is populated based on configuration data received from the ACS. |
| | Session_Bandwidth | The Session_Bandwidth contains information about the maximum bandwidth assigned to the PNSP access service. | This value is populated based on configuration data received from the ACS. |

5.3 Regional/Access Network

The primary function of the Regional/Access Network is to provide end-to-end data transport between the customer premises and the NSP or ASP. The Regional/Access Network may also provide higher layer functions, such as QoS and bandwidth management. QoS may be provided by tightly coupling traffic engineering capabilities of the Regional Network with the capabilities of the BRAS.

The following data elements are maintained at the Regional/Access Network in, for example, a Regional/Access Network Record 920 in accordance with some embodiments of the present disclosure:

| Record Type | Elements | Description | Source |
|---|---|---|---|
| DSL Line Record 922 | | The DSL line record is maintained in the Regional/Access Network and is unique to each DSL line. It maintains data specific to a DSL line and the sessions that traverse it. | |
| | DSL_Line_ID | As defined above | As defined above |
| | DSL_Sync_Rate | DSL_Sync_Rate is the current physical layer synch rate of the DSL line. This record includes both upstream and downstream metrics. It also includes what are the maximum obtainable data rates in either direction. | This data is obtained from the DSLAM EMS and the RG |

| Record Type | Elements | Description | Source |
| --- | --- | --- | --- |
| NSP PPP Session Record 926 | | NSP PPP Session Record is maintained by the Regional/Access Network to store information specific to the community NSP PPP access sessions. The NSP access record is tied to the DSL Line Record. Only one can exist. | |
| | SP_ID | Uniquely identifies the NSP that the subscriber has a relationship with. Used to cross reference users to NSPs who make turbo/QoS requests. | Assigned by the Regional/Access Network Provider when a wholesale relationship is established with the NSP |
| | Session_Classifier | This parameter contains classification parameters to identify the NSP PPP session (i.e. Ethertype and FQDN). | Provided by the NSP at subscription time. |
| | Session_Priority | Optional—Indicates the priority level of the NSP PPP connection relative to the other PPP sessions present—only required if DSL bandwidth is shared across PPP sessions and need to establish a priority relationship across the PPP sessions | The Regional/Access Network Provider initializes this value at subscription time based on the business model and type of wholesale access that is being sold to the NSP and its relationship to the ASP or the PNSP sessions. |
| | Session_Bandwidth | The Session_Bandwidth contains information about the maximum bandwidth (upstream and downstream) assigned to this NSP PPP session. | This value is set by the NSP. |
| PersonalNSP PPP Session Record 930 | | PersonalNSP PPP Session Record is maintained by the Regional/Access Network to store information specific to the Personal NSP PPP access sessions. Multiple records can exist. | |
| | SP_ID | As defined above | As defined above |
| | Session_Classifier | This parameter contains classification parameters to identify the PNSP PPP session (i.e. Ethertype and FQDN). | Provided by the NSP at subscription time. |
| | Session_Priority | Optional—Indicates the priority level of the PNSP PPP connection relative to the other PPP sessions present—only required if DSL bandwidth is shared across PPP sessions and need to establish a priority relationship across the PPP sessions | The Regional/Access Network Provider initializes this value at subscription time based on the business model and type of wholesale access that is being sold to the NSP and its relationship to the ASP or the PNSP sessions. Assigned by PNSP and passed to Regional/Access network via NNI message interface. |
| | Session_Bandwidth | The Session_Bandwidth contains information about the maximum bandwidth (upstream and downstream) assigned to this PNSP PPP session. | This value is initially set by the PNSP, |
| ASP PPP Session Record 928 | | ASP PPP Session Record is maintained by the Regional/Access Network to store information specific to the ASP PPP session. The ASP PPP Record is tied to the DSL Line Record. Only one ASP record can exist. | |
| | SP_ID | As defined above | As defined above |
| | Session_Classifier | This parameter contains classification parameters to identify the ASP PPP session (i.e. Ethertype and FQDN). | Provided by the ASP at subscription time |
| | Session_Priority | Optional—Indicates the priority level of the ASP PPP connection relative to the other PPP sessions present—only required if DSL bandwidth is shared across PPP sessions and need to establish a priority relationship across the PPP sessions | The Regional/Access Network Provider initializes this value at subscription time based on the business model and type of wholesale access that is being sold to the NSP and its relationship to the ASP or the PNSP sessions. Assigned by ASP and passed to Regional/Access network via NNI message interface. |
| | Session_Bandwidth | The Session_Bandwidth contains information about the maximum bandwidth (upstream and downstream) assigned to this ASP PPP session. | This value is initially set by the Regional/Access Network Provider, but could be modified by individual ASPs that request more bandwidth for their application. An alternative |

| Record Type | Elements | Description | Source |
| --- | --- | --- | --- |
| | | model is that this value is set to the max value initially and ASPs only affect their allotment of bandwidth within the PPP session. | |
| Application Flow Record 932 | | The Application Flow Record contains specific details about an application within the ASP session. This record is tied to the ASP account record. Many application records can be associated with an ASP account record. | |
| | Flow_Classifier | Flow_Classifier contains classification parameters to identify the application flow (IP 5 tuple). It is used by the BRAS & the RG. | Values provided by the ASP |
| | Flow_Priority | Indicates the priority level of the application within the ASP PPP connection. This parameter indicates the treatment of the application flow (what queue it should be placed in) as well as any marking requirements (DSCP). It is used by the BRAS and the RG | Provided by the ASP. Regional/Access Network Provider provides available options to select. |
| | Flow_Bandwidth | Flow_Bandwidth parameter is assigned to the given application based on the negotiated value between the ASP and the Regional/Access Network. It indicates the maximum upstream and downstream bandwidth. It is used by the BRAS & the RG to shape and police the application flow. | These values are provided by the ASP to meet the needs of the application. |
| Service Provider Record 924 | | The service Provider Record is used to authenticate service providers (NSPs, ASPs) who wish to query the Regional/Access Network for information and make bandwidth and or QoS requests. | |
| | SP_ID | As defined above | As defined above |
| | SP_Credentials | Used to authenticate this service provider together with SP_ID when connecting to the Regional/Access Network. | Assigned by the Regional/Access Network Provider |
| | Authorization | Represents what records the SP has access to (DSL line records can it make queries/modifications to) | Assigned by the Regional/Access Network Provider |
| | CDR_Data | Stores billing data for wholesale access to Turbo and QoS controls | This data is generated by the Regional/Access Network Provider |

5.4 Application Service Provider

The Application Service Provider (ASP) is defined as a Service Provider that shares a common infrastructure provided by the Regional/Access Network and an IP address assigned and managed by the Regional Network Provider. In particular embodiments of the present disclosure, the ASP provides one or more of: application services to the subscriber (gaming, video, content on demand, IP Telephony, etc.); service assurance relating to this application service; additional software or CPE; and/or a contact point for all subscriber problems related to the provision of specific service applications and any related subscriber software. However, the ASP may not provide or manage the assignment of IP address to the subscribers.

The following data elements may be maintained at the ASP in accordance with some embodiments of the present disclosure:

| Record Type | Elements | Description | Source |
| --- | --- | --- | --- |
| ASP Record 960 | | ASP Record is maintained by each service provider. This record contains the service provider's name, password, and other related information that identifies this unique ASP and is used to communicate with Regional/Access Network Provider. | |
| | ASP_ID | Used to uniquely identify an ASP that has a business relationship with Regional/Access Network Provider. | Assigned by Regional/Access Network Provider at the time of connecting the ASP to the ASP network. |
| | ASP_Credentials | Used to authenticate an ASP together with ASP_ID when a service session is established with a Regional/Access Network Provider. | Assigned by Regional/Access Network Provider at the time of connecting the ASP to the ASP network. |

-continued

| Record Type | Elements | Description | Source |
|---|---|---|---|
| ASP Subscriber Record 962 | | ASP Subscriber Record is maintained by ASP that provides the application service. This record uniquely identifies the subscriber and service related data. | |
| | DSL_Line_ID | As defined above | As defined above |
| | ASPSubscriber_ID | This ID is used for accessing the DSL and ASP networks. | Assigned by the ASP at the time of subscription. |
| | ASPSubscriber_Password | It is used together with the ASPSubscriber_ID to access the ASP application. Note: The ASP Subscriber ID and Password are only used by ASP for its own purpose and will not be used or referenced by Regional/Access Network for authentication purpose. It is just for maintaining ASP data integrity. | Assigned by the ASP at the time of subscription. |
| | Session_Classifier | Local copy of Regional/Access Network ASP PPP Session Classification info. | Acquired from the Regional/Access Network through the ANI interface. |
| | Session_Priority | Local copy of Regional/Access Network ASP PPP Session Priority info. | Acquired from the Regional/Access Network through the ANI interface. |
| | Session_Bandwidth | Local copy of the Regional/Access Network ASP PPP Session Bandwidth Info. | Acquired from the Regional/Access Network through the ANI interface. |
| Application Flow Control Record 966 | | This record is maintained by the ASP and used to store application specific information such as bandwidth arrangement and QoS settings. This record is tied to the ASP bandwidth Record. Multiple Application Record can be associated with one single ASP bandwidth record. | |
| | Flow_Classifier | Flow_Classifier contains classification parameters to identify the application flow (IP 5 tuple). It is used by the BRAS & the RG. | Values provided by the ASP. |
| | Flow_Priority | Indicates the priority level of the application within the ASP PPP connection. This parameter indicates the treatment of the application flow (what queue it should be placed in) as well as any marking requirements (DSCP). It is used by the BRAS and the RG | Provided by the ASP. The Regional/Access Network Provider specifies available options to select. |
| | Flow_Bandwidth | Flow_Bandwidth parameter is assigned to the given application based on the negotiated value between the ASP and the Regional/Access Network Provider. It indicates the maximum upstream and downstream bandwidth. It is used by the BRAS & the RG to shape and police the application flow. | These values are provided by the ASP to meet the needs of the application. |
| ASP User Account 964 | | This record is maintained by the ASP. An ASP user account is tied to an ASP subscriber account. Multiple user accounts can be associated with a single subscriber account. | |
| | User_ID | This ID is used for accessing the given service. | Assigned by a given ASP to a particular user. |
| | User_Password | It is used together with the User_ID to access a given service. | User_Password is initially assigned by an ASP. Can be changed by the user. |

5.5 Network Service Provider

The Network Service Provider (NSP) is defined as a Service Provider that requires extending a Service Provider-specific Internet Protocol (IP) address. This is the typical application of conventional DSL service. The NSP owns and procures addresses that they, in turn, allocate individually or in blocks to their subscribers. The subscribers are typically located in Customer Premises Networks (CPNs). The NSP service may be subscriber-specific, or communal when an address is shared using NAPT throughout a CPN. The NSP may include Internet Service Providers (ISPs) a given service; may provide the customer contact point for any and all customer related problems related to the provision of this service; and/or may authenticate access and provides and manages the assignment of IP address to the subscribers.

The following data elements are maintained at the NSP in accordance with some embodiments of the present disclosure:

| Record Type | Elements | Description | Source |
|---|---|---|---|
| NSP Record 940, 950 | | NSP Record is maintained by each NSP. This record contains the service provider's name, password, and other related information that identifies this unique service provider and is used communicate with access NSP. | |

-continued

| Record Type | Elements | Description | Source |
|---|---|---|---|
| | NSP_ID | Uniquely identifies the NSP that the subscriber has a relationship with. Used to cross reference users to NSPs who make turbo/QoS requests | Assigned by Regional/Access Network Provider at the time of connecting the NSP. |
| | NSP_Credentials | Used to authenticate this NSP together with NSP_ID when a service session is established with a DSL access network for requesting a network service. | Assigned by Regional/Access Network Provider at the time of connecting the NSP. |
| NSP Subscriber Record 942, 952 | | NSP Subscriber Record is maintained by NSP that provides the network service. This record uniquely identifies the subscriber and service related data. | |
| | DSL_Line_ID | As defined above | As defined above |
| | NSPSubscriber_ID | This ID is used for accessing the DSL and NSP networks. | Assigned to a DSL subscriber by the NSP. |
| | NSPSubscriber_Password | It is used together with the NSPSubscriber_ID to access the NSP application. Note: The NSP Subscriber ID and Password are only used by NSP for its own purpose and will not be used or referenced by Regional/Access Network for authentication purpose. It is just for maintaining the NSP data integrity. | Assigned by the ASP at the time of subscription. |
| | Session_Classifier | Local copy of Regional/Access Network NSP PPP Session Classification info | Acquired from the Regional/Access Network through the NNI interface. |
| | Session_Priority | Local copy of Regional/Access Network NSP PPP Session Priority info. | Acquired from the Regional/Access Network through the NNI interface. |
| | Session_Bandwidth | Local copy of the Regional/Access Network ASP PPP Session Bandwidth Info. | Acquired from the Regional/Access Network through the NNI interface. |
| NSP User Account 944, 954 | | This record is maintained by the NSP. A NSP user account is tied to an NSP subscriber account. Multiple user accounts can be associated with a single subscriber account. | |
| | User_ID | This ID is used for accessing the given service. | Assigned by a given NSP to a particular user. |
| | User_Password | | User_Password is initially assigned by a NSP. Can be changed by the user. |

6. Reference Interface Specification and Detailed Message Flow

This interface reference specification defines an interface between the Regional/Access Network and a Network Service Provider (NSP). a Personal NSP (PNSP), and an Application Service Provider (ASP) as well as an interface between the Regional/Access Network and Routing Gateway (RG) for enabling the NSP/PNSP/ASP to utilize the bandwidth and QoS management capabilities provided by the Regional/Access Network in their NSP/PNSP/ASP applications, in accordance with some embodiments of the present disclosure.

6.1 Interface Between RG and Regional/Access Network

This section defines the messaging interface between the Regional! Access Network and the Routing Gateway, in accordance with some embodiments of the present disclosure. This interface does not define any message for RG or ACS authentication assuming both of them are part of the DSL Network infrastructure.

1. UpdateSessionBandwidthInfo(DSL_Line_ID, SP_ID, Session_Classifier, Session_Priority, Session_Bandwidth)

This message is sent from the Regional/Access Network to a specified RG (via ACS) as a notification when new bandwidth and QoS information for a PPP session becomes available. The bandwidth and QoS related parameters include Session_Classifier, Session_Priority, and Session_Bandwidth. These parameters will be stored in the NSP PPP Session Record, PNSP PPP Session Record, or ASP PPP Session Record depending on the SP_ID. These session records are defined in the DSL Data Reference Model.

DSL-Line-ID: Subscriber's line identification.
SP_ID: The identifier of service provider requesting for service. The service provider can only be NSP, PNSP, or ASP.
Session_Classifier: PPP session classifier.
Session_Priority: Session priority indicator.
Session_Bandwidth: Bandwidth data including upstream bandwidth and downstream bandwidth.

2. UpdateSessionBandwidthAck(DSL_Line_ID,SP_ID)

This message is sent from the RG to the Regional/Access Network (via ACS) as an acknowledgement of receiving the update session bandwidth information notification.

DSL_Line_ID: Subscriber's line identification.
SP_ID: The identifier of service provider requesting for service. The service provider can only be NSP, PNSP, or ASP.

3. UpdateAppFiowControlInfo(DSL_Line_ID, SP_ID, Flow_Classifier, Flow_Priority, Flow_Bandwidth)

This message is sent from the Regional/Access Network to a specified RG (via ACS) as a notification of new bandwidth and QoS info for application flow becoming available. The parameters including Flow_Classifier, Flow_Priority, and Flow_Bandwidth will replace the existing data stored in the Application Flow Control Record defined in the Regional/Access Data Reference Model.

DSL-Line-ID: Subscriber's line identification.
SP JD: The identifier of service provider requesting for service. The service provider can only be NSP, PNSP, or ASP.

Flow_Classifier: Application flow classifier.
Flow_Priority: Priority queue indicator.
Flow_Bandwidth: Flow bandwidth information for shaping and policing.
4. UpdateAppFlowControlAck(DSL_Line_ID, SP_ID)
This message is sent from the RG to the Regional/Access Network (via ACS) as an acknowledgement of receiving the update application flow control info notification.
DSL-Line-ID: Subscriber's line identification.
SP_ID: The identifier of service provider requesting for service. The service provider can only be NSP, PNSP, or ASP.
5. UpdateSessionBandwidthRequest(DSL_Line_ID, SP_ID)
This message is sent from the RG to the Regional/Access Network (via ACS) as a request for obtaining the PPP session level of the bandwidth and QoS settings stored at the Regional/Access Network for the specified subscriber line.
DSL-Line-ID: Subscriber's line identification.
SP_ID: The identifier of service provider requesting for service. The service provider can only be NSP, PNSP, or ASP.
6. UpdateSessionBandwidthResponse(DSL_Line_ID, SP_ID, Session_Classifier, Session_Priority, Session_Bandwidth, Return_Code)
This message is sent from the Regional/Access Network to the RG (via ACS) as a response for getting the PPP session level of the bandwidth and QoS settings request.
DSL Line_ID: Subscriber's line identification.
SP_ID: The identifier of service provider requesting for service. The service provider can only be NSP, PNSP, or ASP.
Session Classifier: PPP session classifier.
Session_Priority: Session priority indicator.
Session_Bandwidth: Session bandwidth information including upstream bandwidth and downstream bandwidth.
Return_Code: Return code from the Regional/Access Network, indicating if the request is accomplished successfully.
7. UpdateAppFiowControlRequest(DSL_Line_ID, SP_ID)
This message is sent from the RG to the Regional/Access Network (via ACS) as a request for obtaining the application flow level of the bandwidth and QoS settings stored at the Regional/Access Network for the specified subscriber line.
DSL_Line_ID: Subscriber's line identification.
SP_ID: The identifier of service provider requesting for service. The service provider can only be NSP, PNSP, or ASP.
8. UpdateAppFiowControlResponse(DSL_Line_ID, SP_ID, Flow_Classifier, Flow_Priority, Flow_Bandwidth, Return_Code)
This message is sent from the Regional/Access Network to the RG (via ACS) as a response for getting the application flow level of the bandwidth and QoS settings request.
DSL Line_ID: Subscriber's line identification.
SP_ID: The identifier of service provider requesting for service. The service provider can only be NSP, PNSP, or ASP.
Flow_Classifier: Application flow classifier.
Flow_Priority: Priority queue indicator.
Flow_Bandwidth: Flow bandwidth information for shaping and policing.
Return_Code: Return code from the DSL Network, indicating if the request is accomplished successfully.

6.2 Interface Between Regional/Access Network and ASP
This section defines the messaging interface between the Regional/Access Network and the Application Service Providers, in accordance with some embodiments of the present disclosure.
1. EstablishServiceSessionRequest (SP ID, SP_Credentials)
This message is sent from an ASP to the Regional/Access Network as a request for establishing a communication session. All the ASPs need to be authenticated by the Regional/Access Network before the network bandwidth and QoS service capabilities can be accessed. With this request, the ASP can specify a life span of this session by providing a life span parameter that could be imbedded in the SP_Credentials. When the specified life span expires, the ASP must resend this request to establish a new service session.
SP_ID: Service Provider Identification. SP_Credentials: Service Provider Credentials.
2. EstablishServiceSessionResponse (Authorization, Return_ Code)
This message is sent from the Regional/Access Network to the service provider as a response for the communication session establishment request. The Regional/Access Network returns an authorization code indicating what services and resources are authorized for the service provider to access.
Authorization: Authorization code indicating what Regional/Access Network resources is authorized for the service provider to access.
Return_Code: Return code from the Regional/Access Network, indicating if the request is accomplished successfully.
3. CreateAppFlowControiRecordRequest (Authorization, DSL_Line_ID, SP_ID, Flow_Classifier, Flow_Priority, Flow_Bandwidth)
This message is sent from an ASP to the Regional/Access Network as a request for creating an application specific flow control record defined as Application Flow Control Record in DSL Data Model. The initial settings are provided with Flow_Clasifier, SP_ID, Flow_Priority, and Flow_Bandwidth.
Authorization: Authorization code obtained when the service session is established.
DSL_Line:._ID: Subscriber's line identification.
SP_ID: The identifier of service provider requesting for service. The service provider can only be ASP.
Flow_Classifier: 5-tuple (source IP address, source port, destination IP address, destination port, protocol type) identifying a unique application flow.
Flow_Priority: Priority queue setting
Flow_Bandwidth: Flow bandwidth information for shaping and policing.
4. CreateAppFlowControlRecordResponse (DSL_Line_ID, Return_Code)
This message is sent from the Regional/Access Network to the ASP as a response for the creation of the application flow control record request.
DSL_Line_ID: Subscriber's line identification.
Return_Code: Return code from the Regional/Access Network, indicating if the request is accomplished successfully.
5. DeleteAppFlowControlRecordRequest (Authorization, DSL_Line_ID, SP_ID, Flow Classifier)
This message is sent from an ASP to the Regional/Access Network as a request for deleting an Application Flow Control Record defined in DSL Data Model.
Authorization: Authorization code obtained when the service session is established.
DSL-Line-ID: Subscriber's line identification.
SP_ID: The identifier of service provider requesting for service. The service provider can only be ASP.
Flow_Classifier: Identifier of an application flow.
6. DeleteAppFlowControlRecordResponse (DSL_Line_ID, Return_Code)
This message is sent from the Regional/Access Network to the ASP as a response for the deletion of the application flow control record request.

DSL Line ID: Subscriber's line identification.
Return_Code: Return code from the Regional/Access Network, indicating if the request is accomplished successfully.

7. ChangeAppFlowControlRequest (Authorization, DSL_Line_ID, SP_ID, Flow_Classifier, Flow_Priority, Flow_Bandwidth)

An ASP can send this message to the Regional/Access Network as a request for changing the Priority and Shaping Data defined in the Application Flow Control Record of the DSL Data Model.

Authorization: Authorization code obtained when the service session is established.
DSL_Line_ID: Subscriber's line identification.
SP_ID: The identifier of service provider requesting for service. The service provider should be an ASP.
Flow_Classifier: Application traffic flow identifier.
Flow_Priority: The application priority queue indicator for replacing the existing settings.
Flow_Bandwidth: Flow bandwidth information for replacing the existing settings.

8. ChangeAppFlowControlResponse (DSL_Line_ID, Return_Code)

This message is sent from the Regional/Access Network to the service provider as a response for the bandwidth change request. A Return_Code is sent back indicating whether the change is successful.

DSL_Line_ID: Subscriber's line identification.
Return_Code: Return code from the Regional/Access Network, indicating if the request is accomplished successfully.

9. QueryAppFlowControlRequest (Authorization, DSL_Line_ID, SP_ID, Flow_Classifier)

An ASP can send this message to the Regional/Access Network as a request for querying the application specific priority and shaping information contained in the Application Flow Control Record.

Authorization: Authorization code obtained when the service session is established.
DSL_Line_ID: Subscriber's line ID.
SP_ID: Identifier of the service provider requesting for bandwidth and priority information.
Flow_Classifier: Identifier of an application flow.

10. QueryAppFlowControlResponse (DSL_Line_ID, Flow_Classifier, Flow_Priority, Flow_Bandwidth, Return_Code)

This message is sent from the Regional/Access Network to the service provider as a response for the bandwidth info request. The bandwidth data record is returned.

DSL Line ID: Subscriber's line identification.
Flow_Classifier: Identifier of an application flow.
Flow Priority: Current priority queue setting.
Flow_Bandwidth: Current bandwidth setting for shaping and policing.
Return_Code: Return code from the Regional/Access Network, indicating if the request is accomplished successfully.

11. QuerySessionBandwidthRequest (Authorization, DSL_Line_ID, SP_ID)

An ASP, can send this message to the Regional/Access Network as a request for querying the PPP session bandwidth and priority information associated with the specified DSL_Line_ID. The data is stored in ASP PPP Session record defined in the DSL Data Model.

Authorization: Authorization code obtained when the service session is established.
DSL-Line-ID: Subscriber's line ID.
SP_ID: Identifier of the service provider requesting for bandwidth and priority information.

12. QuerySessionBandwidthResponse (DSL Line_ID, Session_Classifier, Session_Priority, Session_Bandwidth)

This message is sent from the Regional/Access Network to the service provider as a response for the bandwidth info request. The bandwidth data record is returned.

DSL Line_ID: Subscriber's line identification.
Session_Classifier: PPP session classifier used to identify PPP session traffic flow.
Session_Priority: Current Priority queue setting.
Session_Bandwidth: Current session bandwidth setting.

13. TerminateServiceSessionRequest (SP_ID, Authorization)

This message is sent from an ASP to the Regional/Access Network as a request for terminating a communication session.

SP_ID: Service Provider Identification.
Authorization: Authorization code indicating what Regional/Access Network resources is authorized for the service provider to access.

14. TerminateServiceSessionResponse (SP_ID, Return_Code)

This message is sent from the Regional/Access Network to the service provider as a response for the communication session termination request.

SP ID: Service Provider Identification.
Return_Code: Return code from the Regional/Access Network, indicating if the request is accomplished successfully.

6.3 Interface Between Regional/Access Network and NSP

This section defines the messaging interface between the Regional/Access Network and Network Service Provider, in accordance with some embodiments of the present disclosure.

1. EstablishServiceSessionRequest (SP_ID, SP Credentials)

This message is sent from a NSP to the Regional/Access Network as a request for establishing a communication session. The NSPs need to be authenticated by the Regional/Access Network before the network bandwidth and QoS service capabilities can be accessed. With this request, the NSP can specify a life cycle of this session by providing a life span parameter imbedded in the SP_Credentials. When the specified life span expires, the NSP must resend this request to establish a new service session.

SP_ID: Service Provider Identification.
SP Credentials: Service Provider Credentials.

2. EstablishServiceSessionResponse (Authorization, Return_ Code)

This message is sent from the Regional/Access Network to the service provider as a response for the communication session establishment request. The Regional/Access Network returns an authorization code indicating what services and resources are authorized for the service provider to access.

Authorization: Authorization code indicating what Regional/Access Network resources is authorized for the service provider to access.
Return_Code: Return code from the Regional/Access Network, indicating if the request is accomplished successfully.

3. ChangeSessionBandwidthRequest (Authorization, DSL Line_ID, SP_ID, Session_Classifier, Session_Priority, Session_Bandwidth)

A NSP can send this message to the Regional/Access Network as a request for changing the PPP session bandwidth and priority information associated with the specified DSL_Line_ID. The data is stored in the NSP PPP Session Record defined in the DSL Data Model.

Authorization: Authorization code obtained when the service session is established.

DSL_Line_ID: Subscriber's line identification.

SP_ID: Identifier of service provider requesting for service.

Session_Classifier: PPP session classifier used to identify PPP session traffic flow.

Session_Priority: Session priority indicator setting to replace the current one.

Session_Bandwidth: Session bandwidth information for replacing the existing one.

4. ChangeSessionBandwidthResponse (DSL_Line_ID, Return_Code)

This message is sent from the Regional/Access Network to the service provider as a response for the bandwidth change request. A Return Code is sent back indicating whether the change is successful.

DSL_Line_ID: Subscriber's line identification.

Return_Code: Return code from the Regional/Access Network, indicating if the request is accomplished successfully.

5. QuerySessionBandwidthRequest (Authorization, DSL_Line_ID, SP_ID)

A NSP can send this message to the Regional/Access Network as a request for querying the PPP session bandwidth and priority information associated with the specified DSL_Line_ID. The data is stored in the NSP PPP Session Record defined in the DSL Data Model.

Authorization: Authorization code obtained when the service session is established.

DSL_Line_ID: Subscriber's line ID.

SP_ID: Identifier of the service provider requesting for bandwidth and priority information.

6. QuerySessionBandwidthResponse (DSL_Line_ID, Session_Classifier, Session_Priority, Session_Bandwidth)

This message is sent from the Regional/Access Network to the service provider as a response for the bandwidth info request. The bandwidth data record is returned.

DSL_Line_ID: Subscriber's line identification.

Session_Classifier: PPP session classifier used to identify PPP session traffic flow.

Session Priority: Current Priority queue setting.

Session_Bandwidth: Current session bandwidth setting.

7. TerminateServiceSessionRequest (SP ID, Authorization)

This message is sent from an NSP to the Regional/Access Network as a request for terminating a communication session.

SP_ID: Service Provider Identification.

Authorization: Authorization code indicating what Regional/Access Network resources is authorized for the service provider to access.

8. TerminateServiceSessionResponse (SP_ID, Return_Code)

This message is sent from the Regional/Access Network to the service provider as a response for the communication session termination request.

SP_ID: Service Provider Identification.

Return_Code: Return code from the Regional/Access Network, indicating if the request is accomplished successfully.

6.4 Application Framework Infrastructure

Figure 13:
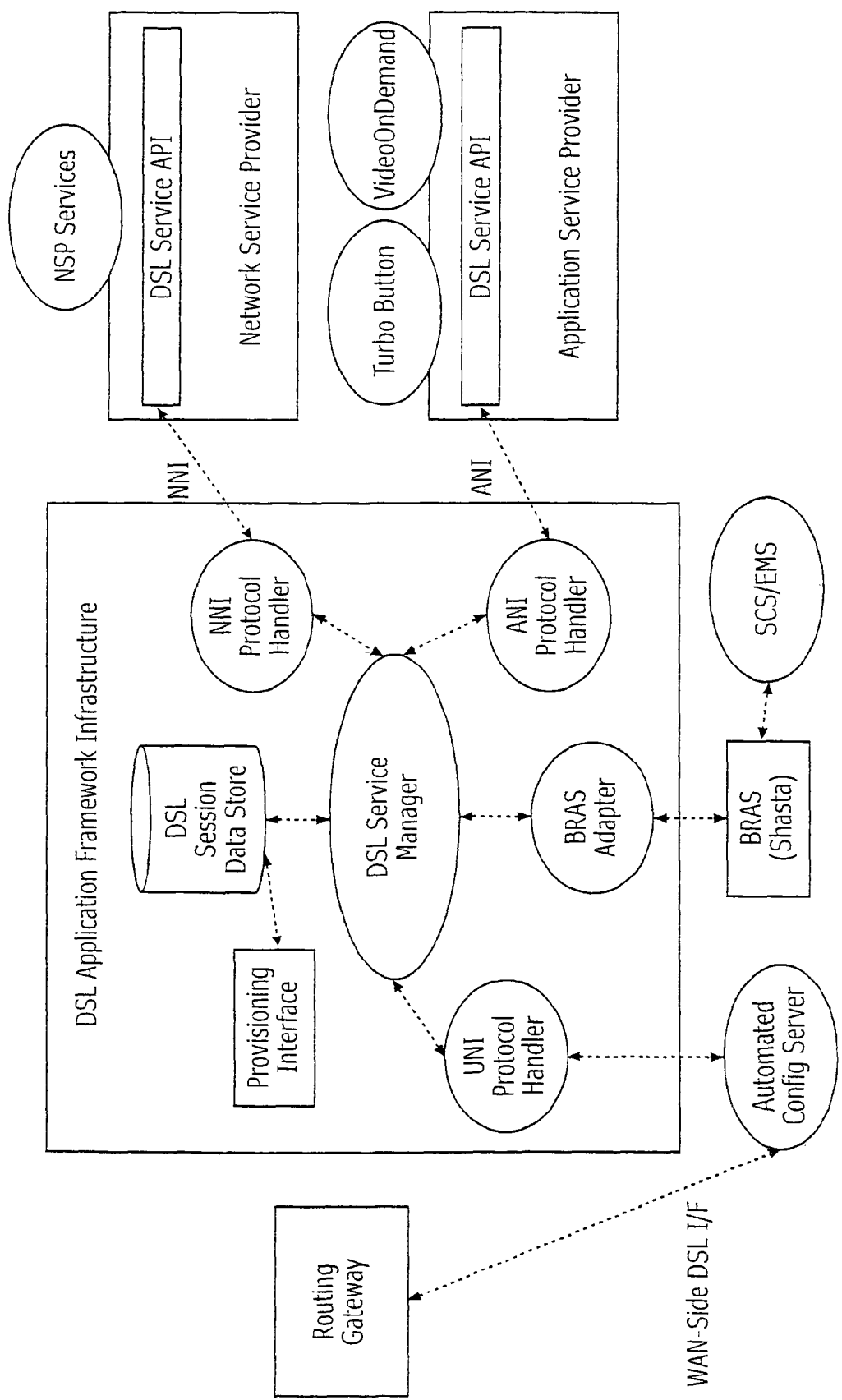
FIG. 13 is a block diagram that illustrates an application framework infrastructure for managing QoS in a network in accordance with some embodiments of the present disclosure.

An Application Framework Infrastructure, in accordance with some embodiments of the present disclosure, is illustrated in FIG. 13 and is a reference implementation model for enabling the ASP, NSP, and/or Personal NSP to utilize the bandwidth and QoS management capabilities. This framework infrastructure is supported by seven functional elements, including ANI Protocol Handler, NNI Protocol Handler, UNI Protocol Handler, DSL Service Manager, DSL Session Data Store, Provision Interface, and BRAS Adapter, in accordance with some embodiments of the present disclosure. For realizing the DSL network bandwidth and QoS management capabilities, this infrastructure may interact with the Routing Gateway via an Automated Configuration Server (ACS) and the BRAS to set appropriate policies upon receiving a request from the ASP, NSP, or PNSP, as depicted in FIG. 13.

The communication interface between the Regional/Access Network and an ASP is defined as the Application-to-Network Interface (ANI). The communication interface between the Regional/Access Network and a NSP or PNSP is defined as the Network-to-Network Interface (NNI) as discussed above with respect to the Regional/Access Interface. Through this framework infrastructure, the ASP, NSP, and/or PNSP can use the DSL Network bandwidth and QoS management capabilities to create their bandwidth and QoS "aware" applications. To enable the communication and service creation, a DSL Service API may be defined as a part of the Regional/Access Application Framework Infrastructure. This API may be a reference procedural implementation of the ANI and NNI.

Any suitable communication interface between the application framework and the BRAS and ACS may be utilized and, therefore, will not be discussed in detail herein. An interface may be used at these points and may be defined as part of the network element requirements. The use of Common Open Policy Service (COPS) is an example standard interface that may be implemented at these points to push changes into the ACS and BRAS.

6.4.1 Framework Infrastructure Element Functional Description

This section describes the main functions of each element of the Application Framework Infrastructure as illustrated in FIG. 13, in accordance with some embodiments of the present disclosure.

ANI Protocol Handler

The ANI Protocol Handler takes a request message from the ASP application, passes the request to the DSL Service Manager, waits for the response from the DSL Service Manager, and sends the response message back to the ASP that requests the service. The protocol used in this prototype is the Application-to-Network Interface defined in this proposal.

NNI Protocol Handler

The NNI Protocol Handler takes a request message from the NSP/PNSP application, passes the request to the DSL Service Manager, waits for the response from the DSL Service Manager, and sends the response message back to the NSP/PNSP that requests the service. The protocol used in this prototype is the Network-to-Network Interface defined in this proposal.

UNI Protocol Handler

The UNI Protocol Handler passes the bandwidth and QoS related parameters via the ACS to a Routing Gateway associated with a subscriber. Because the Routing Gateway obtains its provisioning parameters from the ACS with a soon to be industry standard interface (WAN-Side DSL Configuration specification), this same interface may be used to communicate bandwidth and QoS information to the RG.

DSL Service Manager

The DSL Service Manager behaves as a service broker that provides one or more of the following functions: allows ASP/NSP/PNSP to set and query bandwidth and QoS data associated with a PPP session, and to create, change, and delete application flow control record associated with each individual application; interacts with BRAS to pass bandwidth and QoS related data and policies for prioritizing, shaping, and policing subscriber's traffic flow either associated with a PPP session or an individual application flow; and/or communicates with ACS to pass bandwidth and QoS related data and polices to a specified Routing gateway working together with BRAS for prioritizing, shaping, and policing the subscriber's traffic flow at the access network.

DSL Session Data Store

This is the Master Database maintaining the DSL data model described in section 4.3. It stores all the bandwidth and QoS related data and policies that can be queried, modified, created, and deleted by the ASP/NSP/PNSP through the ANI-INNI interface. The following records are maintained in the DSL Session Data Store in accordance with some embodiments of the present disclosure: a DSL Line Record; an NSP PPP Session Record; a Personal NSP PPP Session Record; an ASP PPP Session Record; and/or an application Flow Control Record.

This master copy is replicated in the BRAS and ACS network elements with appropriate data records. The BRAS copy of the data may include the following records in accordance with some embodiments of the present disclosure: an NSP PPP Session Record; a personal NSP PPP Session Record; an ASP PPP Session Record; and/or an Application Flow Control Record.

The ACS network element may include a replica of the following records in accordance with some embodiments of the present disclosure: an NSP PPP Session Record; a personal NSP PPP Session Record; an ASP PPP Session Record; and/or an Application Flow Control Record.

DSL Service API

This service creation API is used by the ASP/NSP for creating their bandwidth and QoS "aware" applications. This API directly maps the ANIINNI protocol defined in this proposal into procedures, methods, and/or other software embodiments, for example, to facilitate application programming.

Provisioning Interface

This is a GUI based interface to allow the DSL Service Provider to provision the bandwidth and QoS settings for each individual subscriber based on subscriber telephone number, and provision the ASP/NSP that have a business arrangement with the DSL service provider. The data model for support of the provisioning has been defined herein.

6.4.2 DSL Service Messaging Flow

This section provides several service scenarios to demonstrate how the messaging interface may be used by an ASP application in accordance with some embodiments of the present disclosure.

Service Provider Authentication Scenario Messaging Flow

Figure 14:
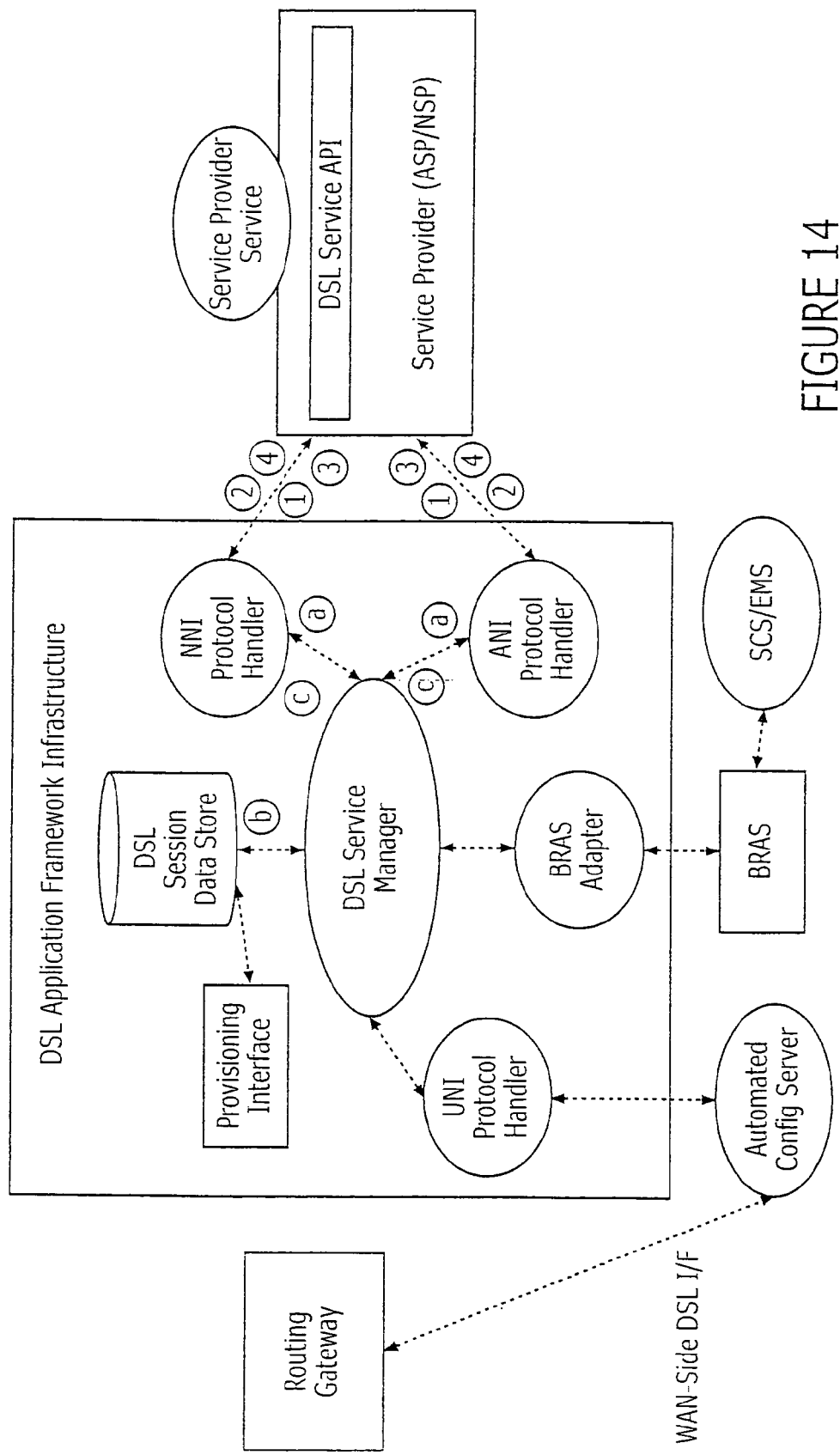
FIG. 14 illustrates a messaging flow for an application authentication scenario using the application framework infrastructure of FIG. 13 in accordance with some embodiments of the present disclosure.

FIG. 14 illustrates the messaging flow for the application authentication scenario in accordance with some embodiments of the present disclosure.

(1) EstablishServiceSessionRequest (SP ID, SP Credentials)

This message is sent from the ASP/NSP to the DSL Network as a request for establishing a communication session. The ASP/NSP needs to be authenticated by the Regional/Access Network before any network service can be provided. Processing Steps:
 a) ANI/NNI Protocol Handler receives the request message and passes the request to DSL Service Manager
 b) DSL Service Manager finds the corresponding Service Provider Record by querying DSL Session Data Store based on the SP ID
 c) DSL Service Manager validates the SP_Credentials. A result of authentication is sent back to the ASP/NSP via ANI/NNI Protocol Handler.

If the authentication is passed, a valid Authorization code is sent back. Otherwise, an invalid Authorization code is returned.

(2) EstablishServiceSessionResponse (Authorization, Return_Code)

This message is sent from Regional/Access Network to ASP/NSP as a response for the service session establishment request.

(3) TerminateServiceSessionRequest (SP_ID, Authorization)

This message is sent from the ASP/NSP to the DSL Network as a request for terminating the communication session.
 a) ANIINNI Protocol Handler receives the request message and passes the request to DSL Service Manager.
 b) DSL Service Manager finds the corresponding communication session, terminates the session, and release all the session related resources.
 c) DSL Service manager sends a result back to the ASP/NSP via ANIINNI Protocol Handler.

(4) TerminateServiceSessionResponse (SP ID, Return_Code)

This message is sent from Regional/Access Network to ASP/NSP as a response for the service session termination request.

Application Level Bandwidth and QoS Query Scenario Messaging Flow

Figure 15:
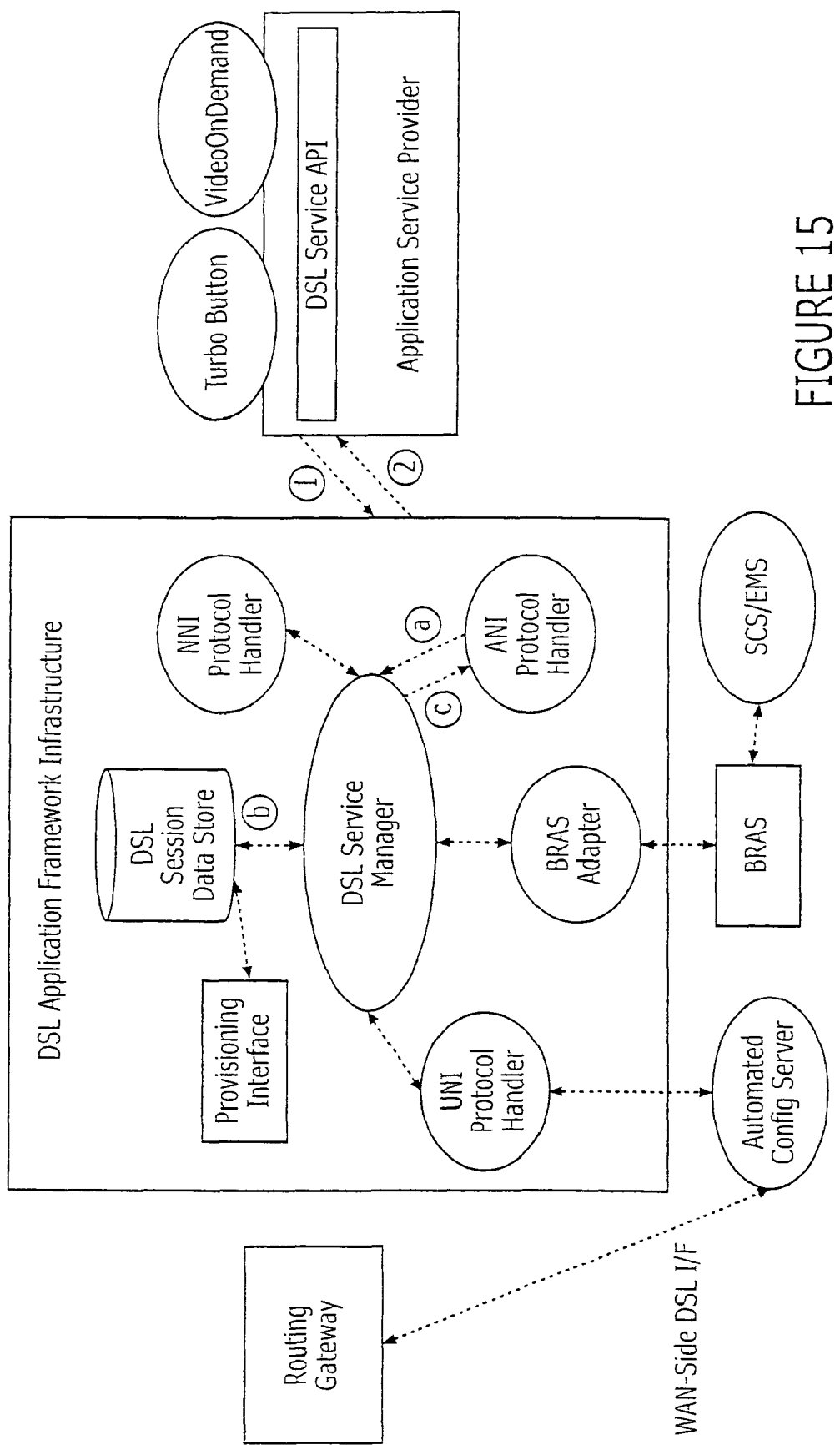
FIG. 15 illustrates a messaging flow for an application level bandwidth and QoS query scenario using the application framework infrastructure of FIG. 13 in accordance with some embodiments of the present disclosure.

FIG. 15 illustrates the messaging flow for the application level bandwidth and QoS query scenario in accordance with some embodiments of the present disclosure.

(1) QueryAppFlowControlRequest (Authorization, DSL_Line_ID, SP_ID, Flow_Classifier)

This message is sent from the ASP to the DSL Network as a request for inquiring the bandwidth and QoS information associated with the specified DSL line. Processing Steps:
 a) ANI Protocol Handler receives the request message and passes the request to DSL Service Manager
 b) DSL Service Manager finds the corresponding DSL Line Record, ASP PPP Session Record, and Application Flow Record(s) to collect the requested information.
 c) DSL Service Manager sends the collected bandwidth and QoS info back to the ASP via ANI Protocol Handler.

(2) QueryAppFlowControlResponse (DSL_Line_ID, Flow_Classifier, Flow_Priority, Flow_Bandwidth, Return_Code)

This message is sent from Regional/Access Network to ASP as a response for inquiring the bandwidth and QoS info request.

Application Level Bandwidth and QoS Modification Scenario Messaging Flow

Figure 16:
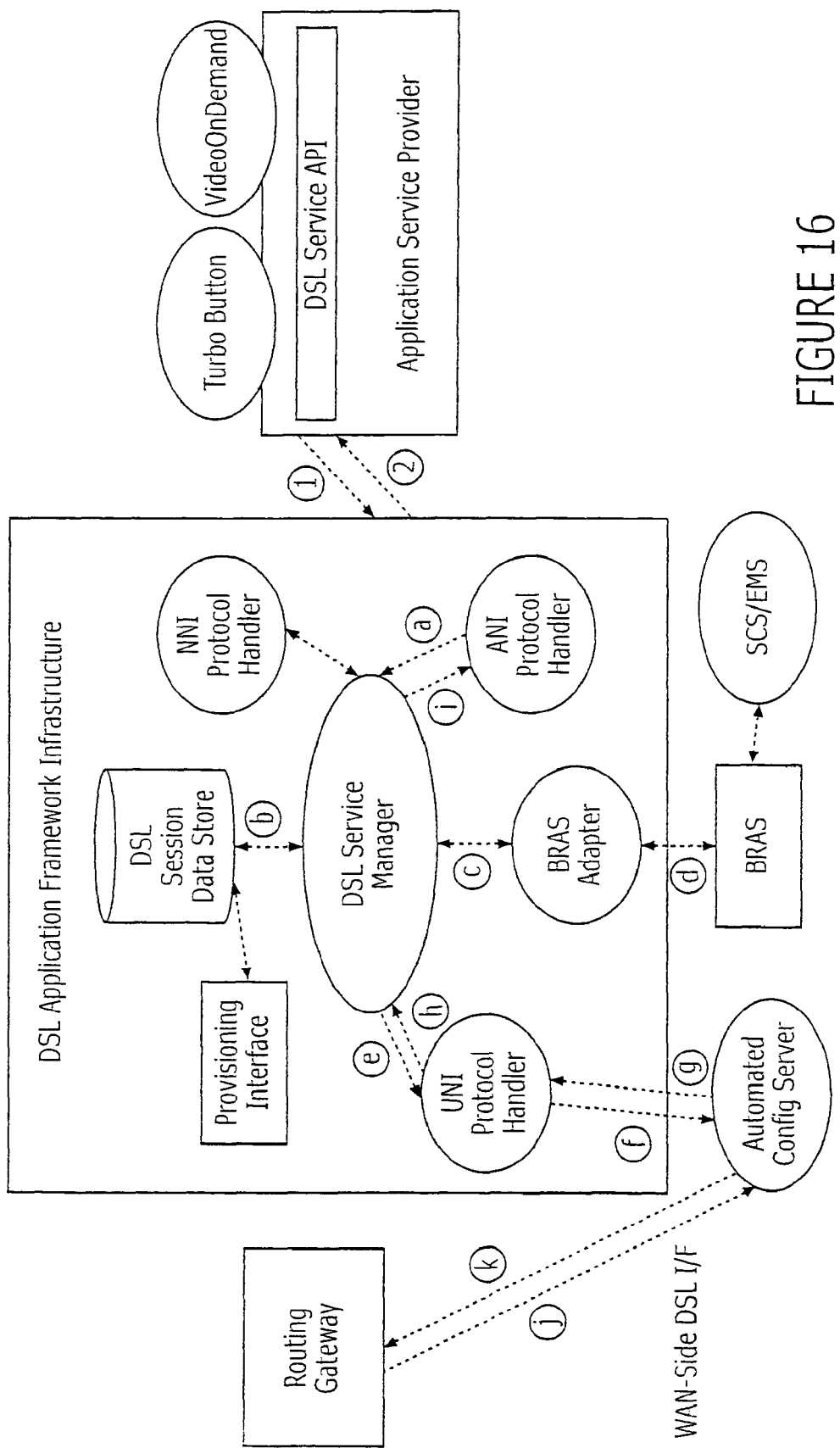
FIG. 16 illustrates a messaging flow for an application level bandwidth and QoS modification scenario using the application framework infrastructure of FIG. 13 in accordance with some embodiments of the present disclosure.

FIG. 16 illustrates the messaging flow for the application level bandwidth and QoS query modification scenario in accordance with some embodiments of the present disclosure.

(1) ChangeAppFlowControlRequest (Authorization, DSL_Line_ID, SP_ID, Flow_Classifier, Flow_Priority, Flow_Bandwidth)

This message is sent from the ASP to the Regional/Access Network as a request for changing the bandwidth and QoS data associated with the specified DSL line.

Processing Steps:
a) ANI Protocol Handler receives the request message and passes the request to DSL Service Manager
b) DSL Service Manager validates the authorization code based on corresponding Service Provider record, finds the corresponding DSL Line Record, ASP PPP Session Record, and Application Flow Record(s) to set the bandwidth and QoS data as requested by the ASP.
c) DSL Service Manager communicates with BRAS Adapter for passing related bandwidth and QoS data to BRAS.
d) BRAS Adapter communicates with BRAS for setting the data in BRAS own data repository.
e) DSL Service Manager notifies RG (via ACS) of new bandwidth and QoS info becoming available by sending the message of
UpdateAppFlowControlInfo(DSL_Line_ID, SP_ID, Flow_ Classifier, Flow_Priority, Flow_Bandwidth) through UNI Protocol Handler.
f) UNI Protocol Handler passes the new bandwidth and QoS data to a specified RG via ACS.
g) ACS sends a response message back to UNI Protocol Handler to confirm the data is received.
h) UNI Protocol Handler sends the message UpdateAppFlowControlAck(DSL_Line_ID, SP_ID) back to DSL Service Manager as a response.
i) DSL Service Manager sends the response message back to ASP via ANI Protocol Handler.
j) ACS notifies the specified RG of the availability of new bandwidth/QoS data via WAN-Side
DSL Config Interface.
k) The specified RG receives notification and downloads the new data from ACS.
(2) ChangeAppFlowControlResponse (DSL_Line_ID, Return_Code)

This message is sent from Regional/Access Network to ASP as a response for setting the bandwidth and QoS request.

Application Flow Control Record Creation Scenario Messaging Flow

Figure 17:
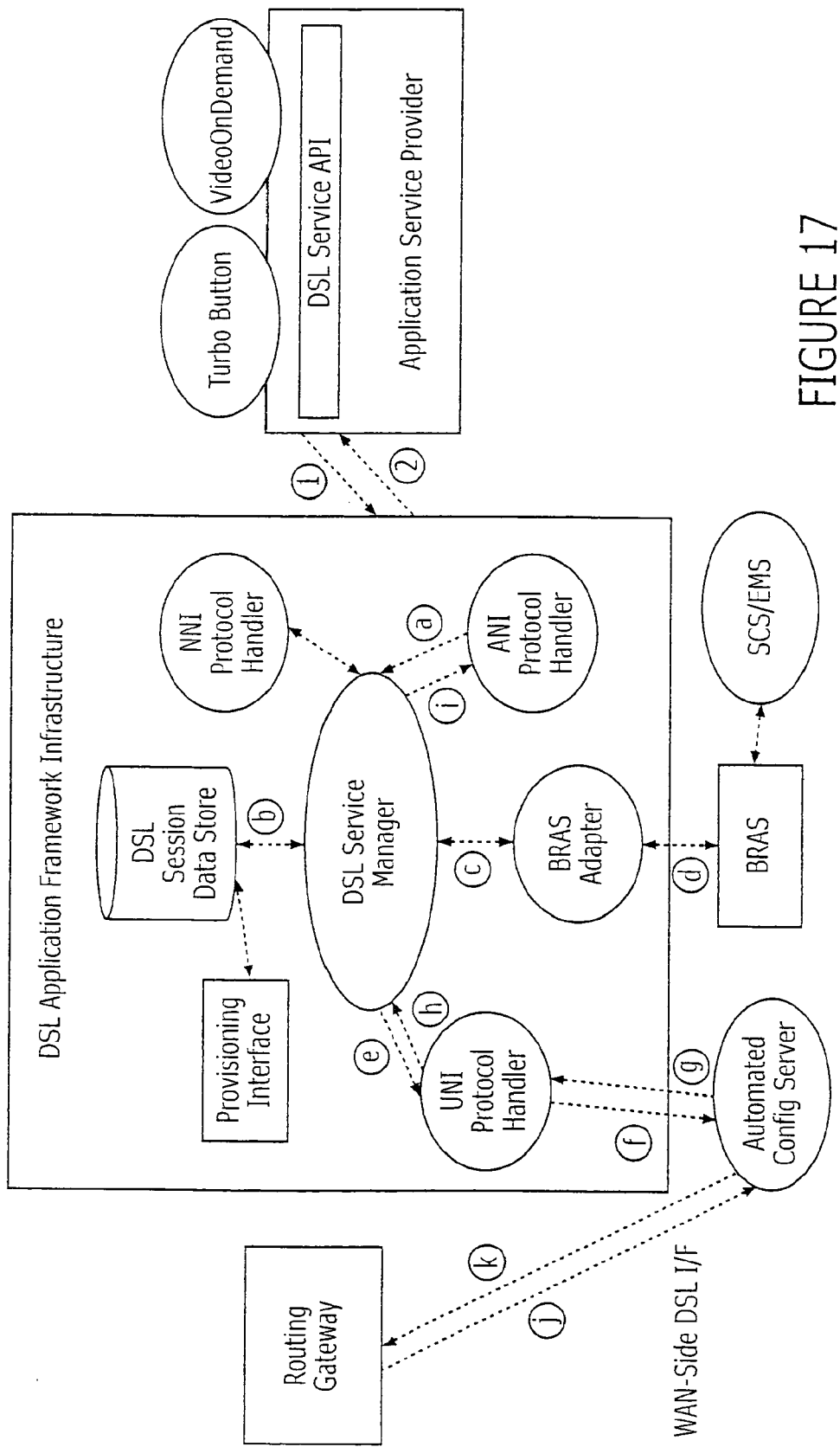
FIG. 17 illustrates a messaging flow for an application flow control record creation scenario using the application framework infrastructure of FIG. 13 in accordance with some embodiments of the present disclosure.

FIG. 17 illustrates the messaging flow for the application flow control record creation scenario in accordance with some embodiments of the present disclosure.

(1) CreateAppFlowControlRequest (Authorization, DSL_Line_ID, SP_ID, Flow_Classifier, Flow Priority, Flow_Bandwidth)

This message is sent from the ASP to the Regional/Access Network as a request for creating an Application Flow Control Record for a specified subscriber.

Processing Steps:
a) ANI Protocol Handler receives the request message and passes the request to DSL Service Manager
b) DSL Service Manager validates the authorization code based on corresponding Service Provider record, finds the corresponding DSL Line Record, ASP PPP Session Record, and then creates and sets an Application Flow Control Record as requested by the ASP.
c) DSL Service Manager communicates with BRAS Adapter for passing related bandwidth and QoS data to BRAS.
d) BRAS Adapter communicates with BRAS for setting the data in BRAS own data repository.
e) DSL Service Manager notifies RG of new bandwidth and QoS becoming available by sending the message of
UpdateAppFlowControlInfo(DSL_Line_ID, SP_ID, Flow_Classifier, Flow_Priority, Flow_Bandwidth) via UNI Protocol Handler.
f) UNI Protocol Handler passes the new bandwidth and QoS data to a specified RG via ACS.
g) ACS sends a response message back to UNI Protocol Handler to confirm the data is received.
h) UNI Protocol Handler sends the message UpdateAppFlowControlAck(DSL_Line_ID, SP_ID) back to DSL Service Manager as a response.
i) DSL Service Manager sends the response message back to ASP via ANI Protocol Handler.
j) ACS notifies the specified RG of the availability of new bandwidth/QoS data via WAN-Side DSL Config Interface.
k) The specified RG receives notification and downloads the new data from ACS.
(2) CreateAppFlowControlResponse (DSL_Line_ID, Return_Code)

This message is sent from DSL Network to ASP as a response for creating the application flow control record request.

Application Flow Control Record Deletion Scenario Messaging Flow

Figure 18:
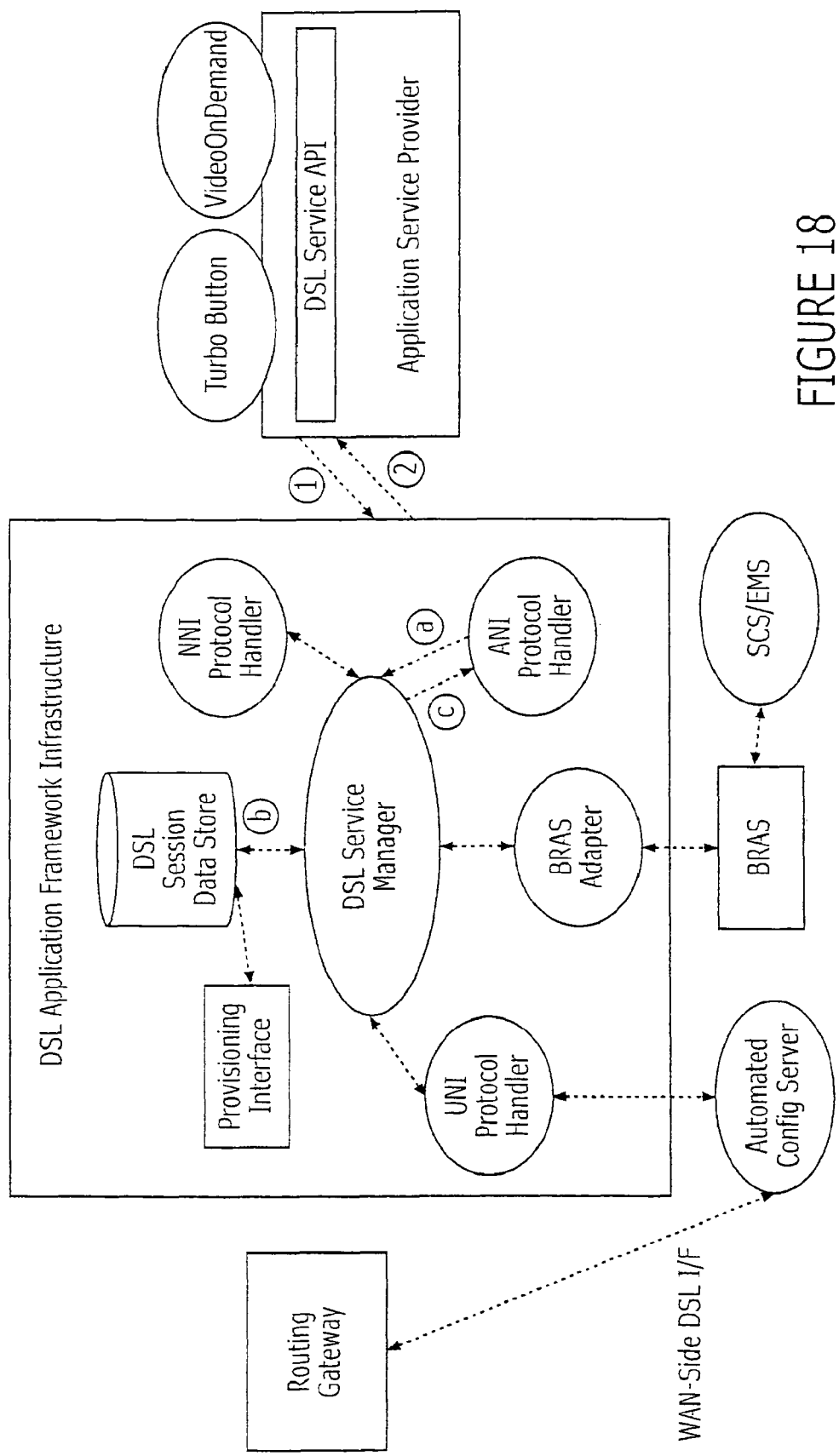
FIG. 18 illustrates a messaging flow for an application flow control record deletion scenario using the application framework infrastructure of FIG. 13 in accordance with some embodiments of the present disclosure.

FIG. 18 illustrates the messaging flow for the application flow control record deletion scenario in accordance with some embodiments of the present disclosure.

(1) DeleteAppFlowControlRecordRequest (Authorization, DSL_Line_ID, SP_ID, Flow_Classifier)

This message is sent from the ASP to the DSL Network as a request for deleting an Application Flow Control Record for a specified application.

Processing Steps:
a) ANI Protocol Handler receives the request message and passes the request to DSL Service Manager
b) DSL Service Manager finds the corresponding DSL Line Record and associated the ASP PPP Session Record. Delete the App Flow Control Record based on the Flow_Classifier.
c) DSL Service Manager sends a response back to ASP as a confirmation.
(2) DeleteAppFlowControlRecordResponse (DSL Line_ID, Return_Code)

This message is sent from Regional/Access Network to ASP as a response for deletion of App Flow Control Record request.

NSP PPP Session Level Bandwidth and QoS Modification Scenario Messaging Flow

Figure 19:
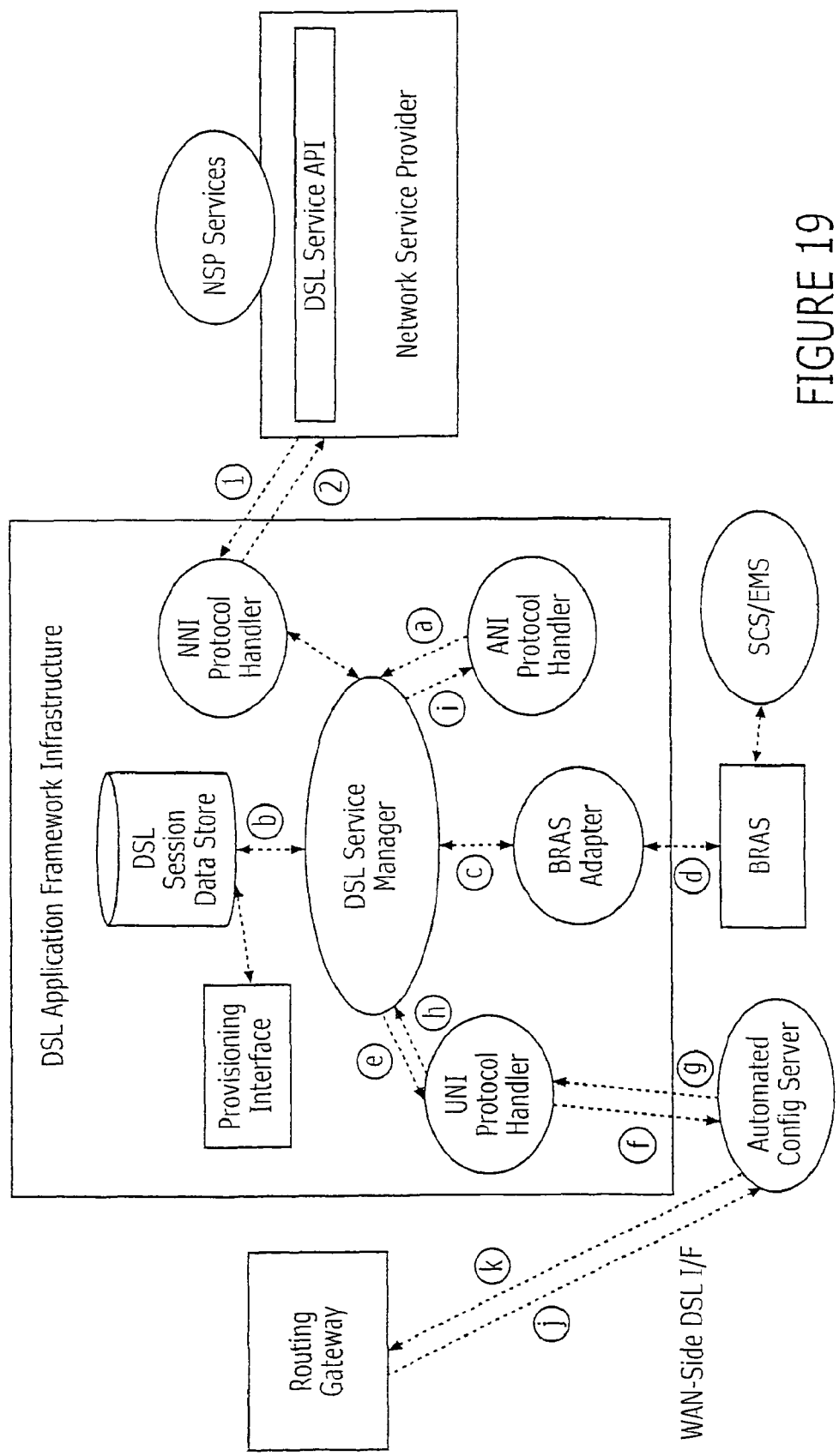
FIG. 19 illustrates a messaging flow for a Point-to-Point Protocol (PPP) session level bandwidth and QoS modification scenario using the application framework infrastructure of FIG. 13 in accordance with some embodiments of the present disclosure.

FIG. 19 illustrates the messaging flow for the PPP session level bandwidth and QoS modification scenario in accordance with some embodiments of the present disclosure.

(1) ChangeSessionBandwidthRequest (Authorization, DSL_Line_ID, SP_ID, Session_Classifier, Session_Priority, Session_Bandwidth)

This message is sent from the NSP to the Regional/Access Network as a request for changing the PPP session level of bandwidth and QoS data associated with the specified DSL line.

Processing Steps:
a) NNI Protocol Handler receives the request message and passes the request to DSL Service Manager
b) DSL Service Manager validates the authorization code based on the corresponding Service Provider record, finds the corresponding DSL Line Record, and the NSP/PNSP PPP Session Record to set the bandwidth and QoS data as requested by the NSP.
c) DSL Service Manager communicates with BRAS Adapter for passing the bandwidth and QoS data to BRAS.

d) BRAS Adapter communicates_with BRAS for setting the data in BRAS own data repository.
e) DSL Service Manager notifies RG of new bandwidth and QoS being available by sending a notification to NNI Protocol Handler.
f) NNI Protocol Handler passes the new bandwidth and QoS data associated with a specified RG to ACS by sending the following message to ACS.
UpdateSessionBandwidthinfo(DSL_Line_ID, SP ID, Session_Classifier, Session_Priority, Session_Bandwidth).
g) ACS sends a response message back to NNI Protocol Handler to confirm the data is received by sending the following message. UpdateSessionBandwidthAck (DSL_Line_ID, SP_ID)
h) UNI Protocol Handler passes the acknowledgement back to DSL Service Manager as a response.
i) DSL Service Manager sends the following response message back to NSP via NNI Protocol Handler. ChangeSessionBandwidthResponse(DSL_Line_ID, Return_Code)
j) ACS notifies the specified RG of the availability of new bandwidth/QoS data via WAN-Side DSL Config Interface.
k) The specified RG receives notification and downloads the new bandwidth and QoS data from ACS.

(2) ChangeSessionBandwidthResponse (DSL_Line_ID, Return_Code)

This message is sent from Regional/Access Network to NSP as a response for changing the PPP level of the bandwidth and QoS request.

ASP/PPP Session Level Bandwidth and QoS Query Scenario Messaging Flow

Figure 20:
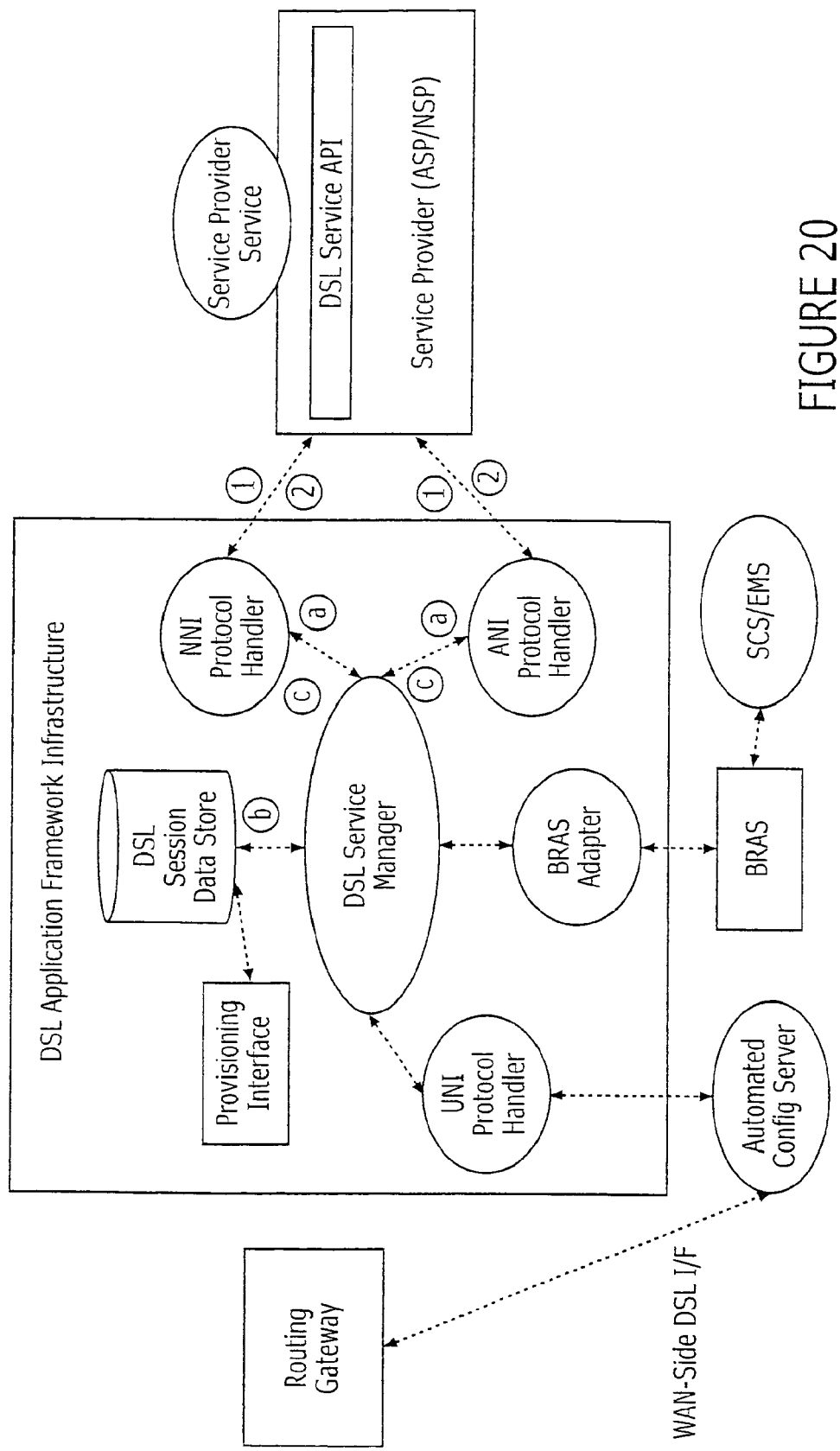
FIG. 20 illustrates a messaging flow for a PPP session level bandwidth and QoS query scenario using the application framework infrastructure of FIG. 13 in accordance with some embodiments of the present disclosure.

FIG. 20 illustrates the messaging flow for the PPP session level bandwidth and QoS query scenario in accordance with some embodiments of the present disclosure.

(1) QuerySessionBandwidthRequest (Authorization, DSL_Line_ID, SP_ID)

This message is sent from the ASP/NSP to the Regional/Access Network as a request for inquiring the bandwidth and QoS information associated with the specified DSL line.

Processing Steps:
a) ANI/NNI Protocol Handler receives the request message and passes the request to DSL Service Manager
b) DSL Service Manager finds the corresponding DSL Line Record and the ASP/NSP PPP Session Record to collect the requested information.
c) DSL Service Manager sends the collected bandwidth and QoS info at PPP session level back to the ASP/NSP via ANI/NNI Protocol Handler.

(2) QuerySessionBandwidthResponse (DSL_Line_ID, Session_Classifier, Session_Priority, Session_Bandwidth, Return_Code)

This message is sent from Regional/Access Network to ASP/NSP as a response for inquiring the bandwidth and QoS info request.

7. Future Capabilities of the Application Framework

Exemplary embodiments of the disclosure have been described above with respect to an Application Framework comprising a reference data model and an interface specification defined for specific transport flows related to QoS and bandwidth capabilities. This Application Framework may be expanded, in accordance with some embodiments of the present disclosure to support other services that link network services, telecommunications information technology, and customers including, for example: registration—enables the ASP to register services/applications with the Regional/Access Network; discovery—enables the Subscriber to discover services/applications within the Regional/Access Network; subscription—enables the ASP to manage and maintain subscriber accounts; management—for validation of subscribers and related services/applications; session—enables the ASP to manage and maintain session establishment, Management: session control, and session teardown for subscriber access to services/applications; authentication—enables the ASP to validate the user/subscriber for network access and services/applications access—who are you?; authorization—enables the ASP to validate the user/subscriber for network access and services/applications access—what permissions do you have?; profile—enables the ASP to manage and maintain user/subscriber profile data; identify—enables the ASP to manage and maintain user preferences, profiles, identity data; presence—enables the ASP to know and maintain awareness of the current existence of the subscriber; notification—enables the ASP to notify the subscriber of related services/applications information; and/or billing—enables the ASP to capture subscriber/user billing data for network usage and services/applications usage for mediating a common billing record. These other capabilities may provide a host of centralized software services supporting a distributed network computing environment linking users/subscribers to their desired services and applications.

8. Example Use Scenario—Turbo Button

Figure 21:
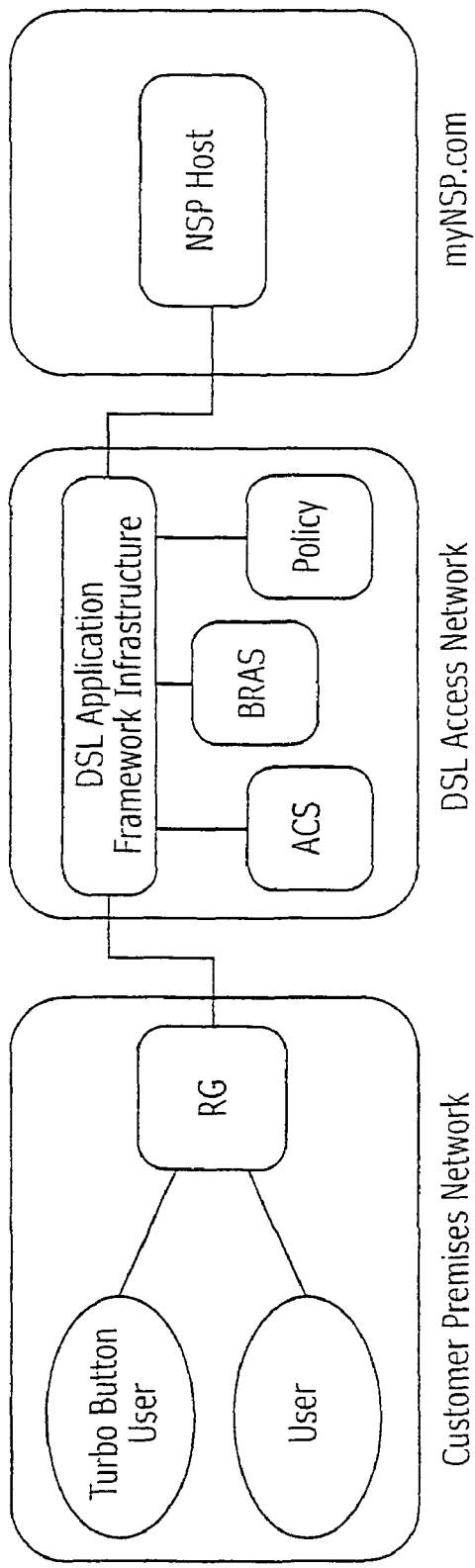
FIG. 21 is a block diagram that illustrates a turbo button architecture using the application framework infrastructure of FIG. 13 in accordance with some embodiments of the present disclosure.

A source of potential frustration for users of data services is that data rates supported by the network (e.g., 1.5 Mb/s downstream and 256 Kb/s upstream) are often not properly matched with application requirements. Even with the higher speeds afforded with DSL access, users of many applications (e.g., content download such as large MS Office service packs or movie trailers, and on-line gaming) may be interested in using a service that would provide an even higher access speed at the times they need it most by invoking a "Turbo Button" service. The higher access speed limit is achieved via a service profile change that eliminates or lessens artificially imposed limits on the achievable speed in the user's PPP session. This section shows how the DSL Application Framework can support such a service, in accordance with some embodiments of the present disclosure, starting with the reference model shown in FIG. 21.

Many implementations of a Turbo Button service are possible in accordance with various embodiments of the present disclosure. For the purposes of this section, we will work with a fairly simple implementation in which the service is provisioned by an NSP called myNSP.com. The user requests the turbo button service at the community NSP's website during a browsing session at normal speed. Note that other ordering mechanisms are possible including mechanisms that are separate from the DSL session, e.g., using a telephone or a mass-distributed CD.

As mentioned above in certain embodiments of the present disclosure, the service is implemented via provisioning rather than by using real-time signaling. Under this assumption, a provisioning cycle is initiated after the user invokes the service and the provisioning completes before the effect is seen. Another result of this assumption is that the effect of the user's service invocation is permanent, i.e., once turbo speed in place, it lasts until the user cancels the service and another provisioning cycle occurs to reinstate the default service parameters. Real-time signaling may be needed to support a service that supports on-demand, brief turbo sessions on an as needed basis.

Once the user requests the turbo service, the NSP queries the Regional/Access network to find out what turbo options can be presented to the user. The NSP may map the available upgrades to marketing categories (e.g., fast, faster, wickedly fast). The user selects one of the options, and the NSP requests the profile from the Regional/Access network that supports the requested speed. The Regional/Access network in turn pushes new policy (e.g., classifiers, rate limiters, priority) into the user's RG that will support the higher speed. It is important to note that the service is still "Best Effort," i.e., there is no assumption of a QoS guarantee at this time. A version of turbo button service with QoS support may be implemented in accordance with other embodiments of the present disclosure.

We will assume that the NSP authenticates its own users for services such as Turbo Button. A centralized authentication service (as well as other ancillary services such as billing and presence functionality) could be implemented in the Regional/Access network on behalf of NSPs and ASPs in accordance with additional embodiments of the present disclosure. In a typical business model, the NSP might bill the user for usage of the turbo button service. In turn, the DSL network provider would bill the NSP for carrying traffic across the Regional/Access network at turbo speeds.

Turbo Button Scenario Description

Figure 22:
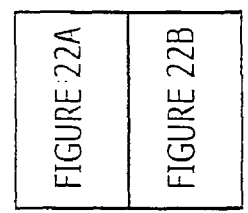
FIG. 22 is an event diagram that illustrates operations of the turbo button architecture of FIG. 21 in accordance with some embodiments of the present disclosure.
Figures 22A, 22B:
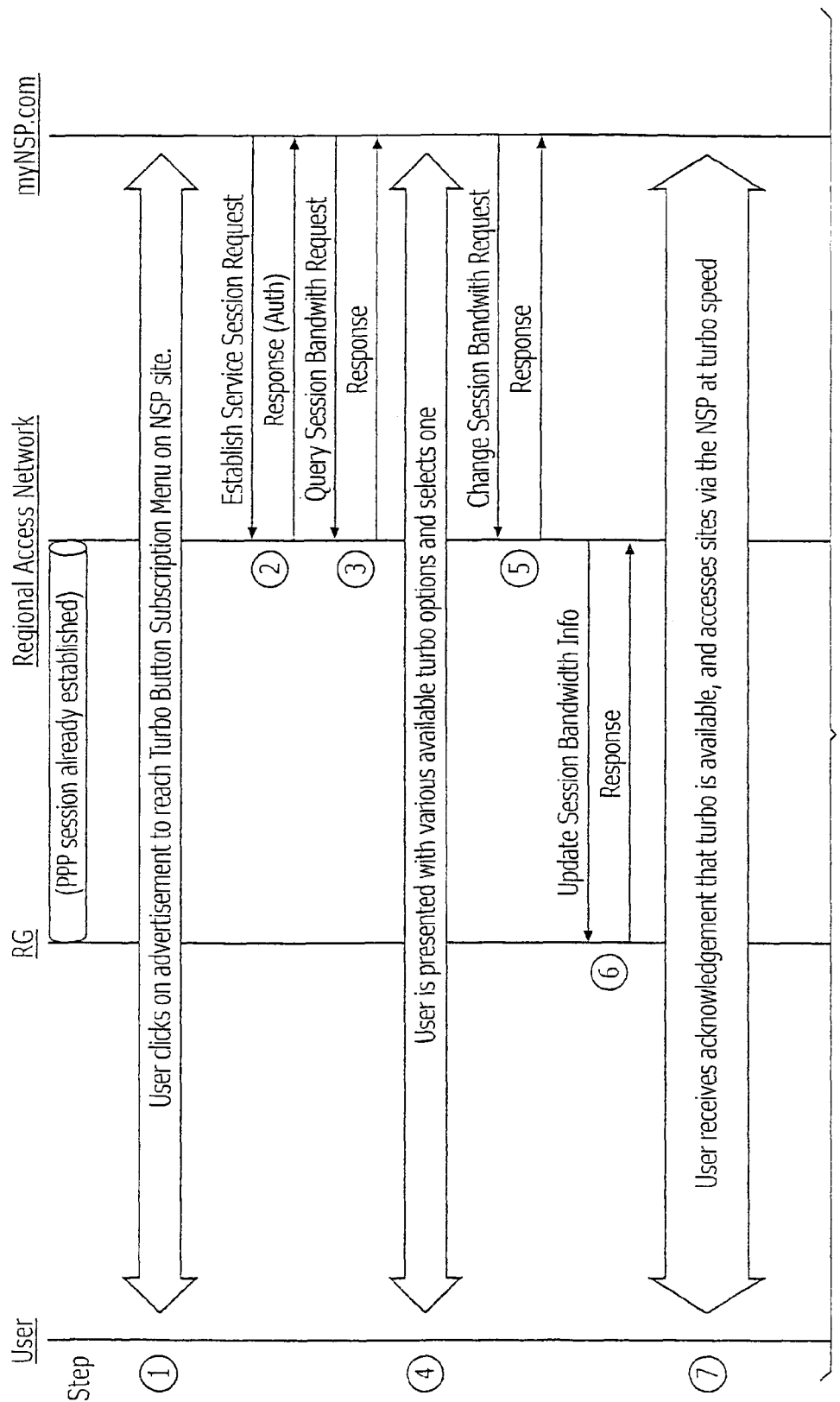
Figure 22B:
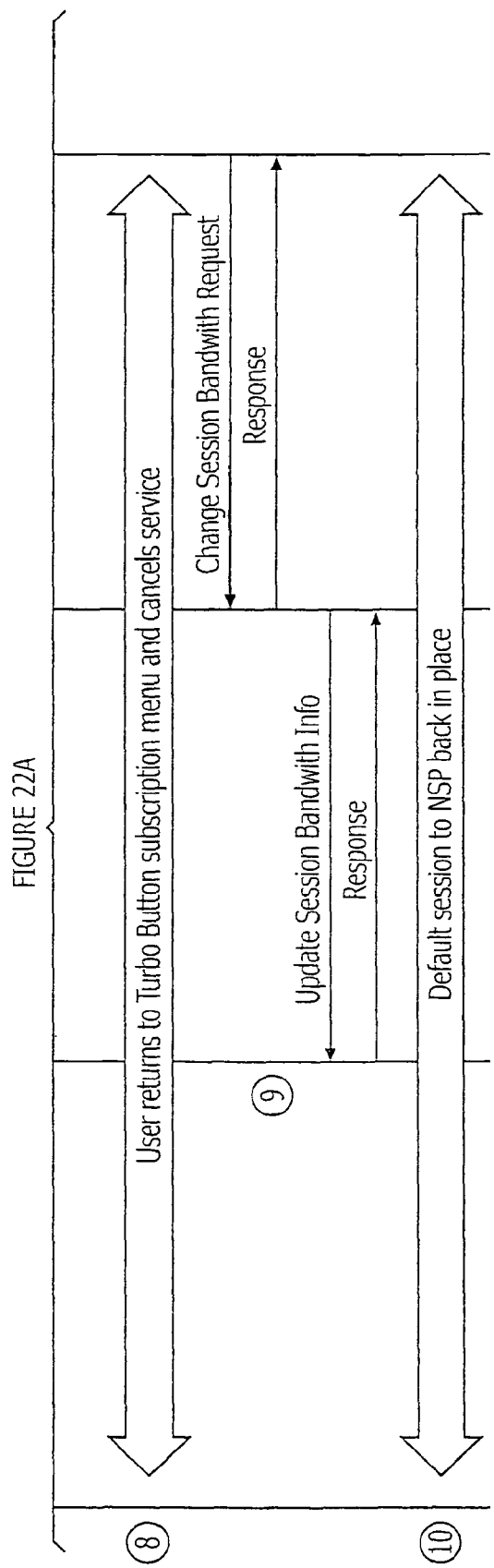

FIG. 22 illustrates an example of the sequence of events occurring with using the Turbo Button Service to access sites via a network service provider called "myNSP.com." For simplicity of illustration, the details of the Regional/Access network (DSL Service Manager, UNI and ANI protocol handlers, ACS, BRAS, etc.) are not shown—the expanded flows were shown in Section 6.4. The step numbers shown in the figure correspond with the list provided below.

1. The user clicks an advertisement to reach the NSP's Turbo Button subscription menu.

2. The NSP host authenticates itself with the Regional/Access network in order to be able to access the customer profile it wants to update.

3. Once authenticated, the NSP host then queries the Regional/Access network for available options for the users access session connection. It uses the response to this query to put together a set of options for presentation to the customer.

4. The user selects one of the options.

5. The NSP requests the Regional/Access network to change the session bandwidth associated with the access session. A notification may be sent to the user indicating that the turbo button provisioning is under way and that turbo speed will be available later that day (for example).

6. Using Update Session Bandwidth messaging, the Regional/Access network pushes new policy to the RG that will support the turbo speed.

7. Once the new policy is in place, the user is able to enjoy turbo speed access to sites served by the NSP. Note that all users connected to the access session (i.e., other PC users on the household LAN) would also enjoy the benefits of the turbo button service.

8. Later, the user decides to cancel turbo button service.

9. Steps 5 and 6 are repeated with the profile and policy put in place being those needed for default access session speeds.

10. The network has returned to its previous state and the user's PPP session is no longer turbo'd.

9. Example Use Scenario—Video Conferencing

This section illustrates how the DSL Application Framework can support a videoconference service in accordance with some embodiments of the present disclosure. The videoconferencing model used is a SIP-driven service implemented by an ASP with a centralized control/mixing conference server. This is the tightly coupled model being developed by an IETF Sipping WG design team that uses four logical entities: focus, conference state notification service, conference policy server element, and stream mixers. There are several ways that these entities can be spread over the available network segments. For example, the ASP and the Regional/Access network can each implement a subset of the entities; for example, the ASP can implement the stream mixing while the rest of the logical entities are implemented in the Regional/Access network. Such a division may be feasible from a technical perspective, but the additional exposed interfaces may require standardization or bilateral agreement. There might not be much of a business case for such a model because there is little incentive for either the ASP or Regional/Access network to give up part of the service offering.

Furthermore, all of the entities can be implemented in the regional/Access network. This option offers some simplicity from the Regional/Access network provider's perspective because no ASP is involved. This would probably balanced, however, by the network provider's need to decouple the videoconference service offering from the general DSL networking aspects.

Figure 23:
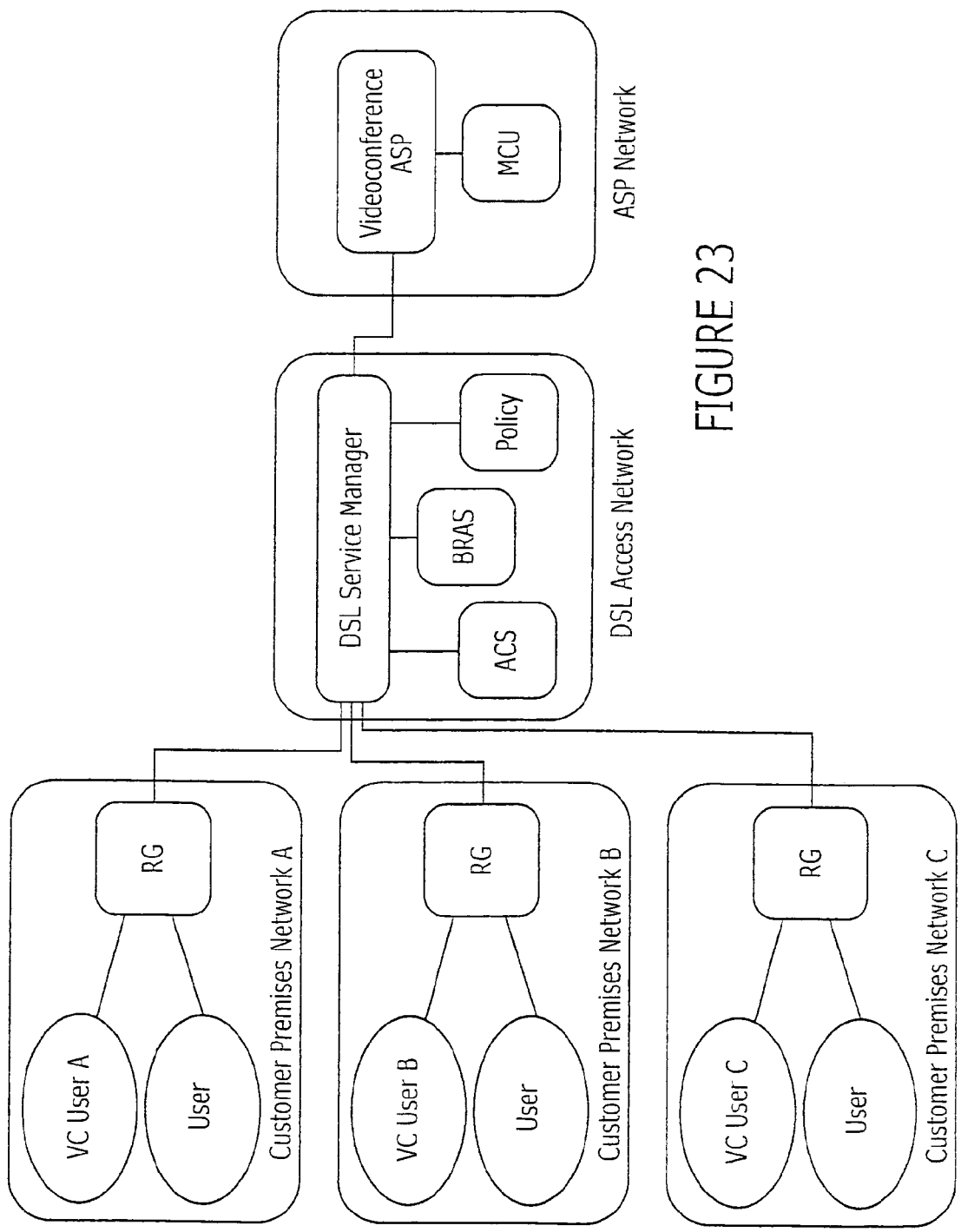
FIG. 23 is a block diagram that illustrates a video conferencing architecture using the application framework infrastructure of FIG. 13 in accordance with some embodiments of the present disclosure.

Finally, the ASP can implement all of the logical entities while the Regional/Access network provider concentrates on the transport issues. This approach is adopted for the rest of this section—the ASP handles all of the mixing as well as the application layer control. A reference diagram for the service with three users is shown in FIG. 23.

From the user's perspective, the videoconferencing service has the following capabilities in accordance with some embodiments of the present disclosure: Creation/Activation: the user can interact with the ASP and either request a reserved conference (without pre-designated participants) or activate a previously reserved conference; Termination: the conference ends at a pre-designated time; Adding Participants: All users are designated in advance; Dropping Parties: Although individual parties may stop participation in the conference, the resources in the network supporting their connections remain in place; and/or Stream Mixing: Basic audio and video mixing are provided. Each participant receives all of the other participants' audio and receives video from the participant with the loudest current audio.

Assumptions regarding the service are as follows: the ASP that offers the videoconference service will host the MCU; the ASP's MCU will support the ASP's subscribers in all ASP networks for which that ASP is participating; videoconference client software compatible with an ASP's videoconference service is resident on all participant PCs; users that are not subscribed to the ASP's videoconference service will not be supported; DHCP leases do not expire; SIP Application Level Gateway (ALG) functions for handling NAT traversal are provided in the RG; the ASP providing the videoconference service maintains a common address repository or locator for its subscribers. ASP's may be unwilling to share or store their subscriber information in a network database; mechanisms are in place to support application level communication between two ASP networks (see the dotted line shown); the ALG functions in the RG use DiffServ Code Points (DSCP) from the voice and video streams and the port information pushed to it through the ACS profile to map audio and video flows to ports that are known to the BRAS for reclassification. A simpler approach may be to classify packets coming from the videoconference client based on packet type and protocol ID but that would mean the audio and video RTP streams could not be distinguished by the classifier and would have to share the same priority; the DSCPs used by the videoconference clients are standardized; and/or by its nature RTP is a unidirectional stream, but RTCP is bidirectional. Each pair of RTP and RTCP UDP streams defines a channel. To simplify the presentation, only one direction of the RTP stream is shown for audio and data and only one control stream is shown. Typical SIP and H.323 videoconference implementations may require additional data and control streams to complete fully bi-directional data flows for all participants.

At least two workable business models can support this videoconferencing service. In the simplest model, the videoconference ASP arranges for all potential conference participants to have the necessary policies in place to support the service. Once this infrastructure is provisioned, any subset of the participants can hold a videoconference at any time. A slightly more complex model has some advantages for demonstration purposes—in this model, the videoconference ASP makes the necessary changes needed in the network to support a particular videoconference (and only the participants for that conference receive upgraded profiles to support their session). This model, which is used in this section, does not require that the policy be in place at all times, but may require a window (perhaps 24 hours) during which the provisioning changes are made.

A number of billing models are possible. In some embodiments, the ASP bills (flat rate, usage, etc.) videoconference subscribers for their service. The Regional/Access network provider bills the ASP for hosting the service on the ASP network and for the usage of the Regional/Access network. Note that additional opportunities for the business model are possible for offering centralized billing, authentication, and presence capabilities to videoconference ASPs.

The static provisioning model imposes some restrictions on videoconferencing service models. Reservations are made well in advance to allow the flow-through provisioning to occur before the start of the conference. The reservation window thus needs to close before the start of the conference, for example 24 hours prior. No real-time adjustment of the schedule (such as early teardown because the participants finished early) is possible. The only way to update the participant list is for the user to request a replacement conference before the reservation window closes.

Despite the use of the static provisioning model, the ability to map a particular conference's flows to a classifier still makes it possible to offer reasonable service features. The user may be able to set up multiple conference calls with different sets of people and with different QoS and bandwidth requirements (for example, a reduced frame rate may be desired for a conference a day after the conference in this example because several BRI users will be on the call). Without the mapping between the flows and the classifier, the user may have been able to have only one outstanding conference request. In addition, the user may be able to modify the arrangements for a particular conference (e.g., if the participant roster or start/end times change) provided that the reservation window (24 hour notice) has not closed.

A goal of this section is to demonstrate that the Framework and Interface and Data Model are sufficient to support this basic videoconference service. After discussing the individual streams needed for videoconferencing, flows for setting up and tearing down videoconferencing flows in accordance with some embodiments of the present disclosure are presented. At the end of this section, the network model is expanded to include the DSL network's entities and further exercise the data model and messages that have been defined.

Videoconferencing Scenario Descriptions

The following sequence of events may occur in the process of registering for the ASP videoconference service, reserving a particular conference, and tearing it down once the conference is over. Assume that three users A, B, and C will be involved in the videoconference and that A will be the originator. For simplicity, the details of the Regional/Access network (DSL Service Manager, UNI and ANI protocol handlers, ACS, BRAS, etc.) are not shown—the expanded flows have been shown in Section 6.4. The step numbers shown in FIGS. 24 and 25 correspond with the list provided below:

1. Assume that Users A, B, and C already have established PPP sessions between their RG's and the DSL network provider.

2. On the videoconference ASP website, User A registers to be able to set up videoconferences by setting up their user profile, billing options, etc.

3. User A decides to hold a videoconference with Users B and C on Tuesday 3:00-4:00 and arranges this with the videoconference ASP.

4. The ASP establishes a service sessions with the Regional/Access network and is authenticated.

5. The ASP sends application flow control requests to the Regional/Access network requesting changes to support the videoconference.

6. The Regional/Access network pushes new application flow policies to the BRAS, ACS, and RG's A, B, and C that are specific to the videoconference application. The videoconference stream facilities are now available.

7. The videoconference starts at 3:00 on Tuesday (note that the flow has now moved). Inside the control streams, the videoconference ASP uses SIP to establish the necessary conference legs to users A, B, and C. The streams from the users are placed appropriately in the queues by the classifiers, are mixed by the videoconference ASP, and appropriately mixed streams are distributed to the participants.

8. At 4:00 on Tuesday, the conference is scheduled to end. The videoconference ASP releases its internal resources for the mixers and conference control, sends SIP BYE messages through the control stream to clear the SIP dialogs with the users, and sends a billing record so that the appropriate charging takes place.

9. The videoconference ASP establishes a service session with the DSL network (if necessary) and is authenticated.

10. The videoconference ASP requests deletion of the application flow control records that supported the videoconference.

The Regional/Access network deletes the policy for the bandwidth and QoS at the BRAS, ACS, and RG's for users A, B, and C. The network has now been returned to its default state.

Flow Classification for Video Conferencing

The videoconference service may require three streams to carry audio, video, and signaling/control as shown in FIGS. 24-27. The flows referred to using a "+" sign in FIG. 27 may be set up dynamically at the VC client and the DSCP may be assigned for the audio and video streams. The ALG/NAT maps of the 10.X.X.X ports to the corresponding IP address and ports for audio and video specified in the ACS profile based on the DSCP set by the VC client. This may ensure that the RG, BRAS and ASP videoconference MCU maintain consistent port information with regard to the various flows. The signaling/control stream is used at the application layer for purposes, such as floor control and other needs, that are transparent to the Regional/Access network provider. Assume that audio and control packets need to travel with high priority and thus are placed into the Expedited Forwarding queue at the RG. Video packets have medium priority and hence will be placed into the Assured Forwarding queue at the RG. The videoconference service does not cause the user to emit any low priority packets that we are aware of; thus, the RG will not need to place any packets into the Best Effort queue.

A goal is to demonstrate that it is possible for the ASP to push packet classifier information into the DSL network at conference reservation time so as to configure the DSL network for proper placement of packets from the three streams into the appropriate queues as mentioned above. At the time that a videoconference is reserved (to occur in this case 3:00-4:00 the next day), the user needs to get a conference identifier/PIN from the videoconference ASP. The user will use this conference identifier to get into the correct conference the next day, and will give the conference id to the other participants for the same purpose. For the purposes of this section, assume that this conference identifier does not need to show up in the data model because it is strictly between the users and the ASP and somehow transferred transparently to the DSL network provider.

The ASP needs to set up bandwidth and priority for the three streams (control, video, and audio) that are needed between each user and the ASP using a Create Application Flow Control Request message. One benefit of looking at videoconference as a service example is to better understand how the various flows would be set up and managed through NATs and firewalls and still have those flows appropriately classified throughout. Many protocols establish connections on well known ports that spawn data flows on ephemeral ports (i.e., dynamically spawned and assigned to a given multimedia call after the initial handshakes). The problem of firewall and NAT traversal is a complex one due, in part, to the large number of different scenarios and the multitude of different solutions to solve them.

For this example, it is assumed that the RG has an ALG function for the support of SIP. Further it is assumed that there is a "trusted" relationship between the ASP and the Regional/Access network and the use of DSCP markings of packets can be used as part of the classification process.

Figure 24:
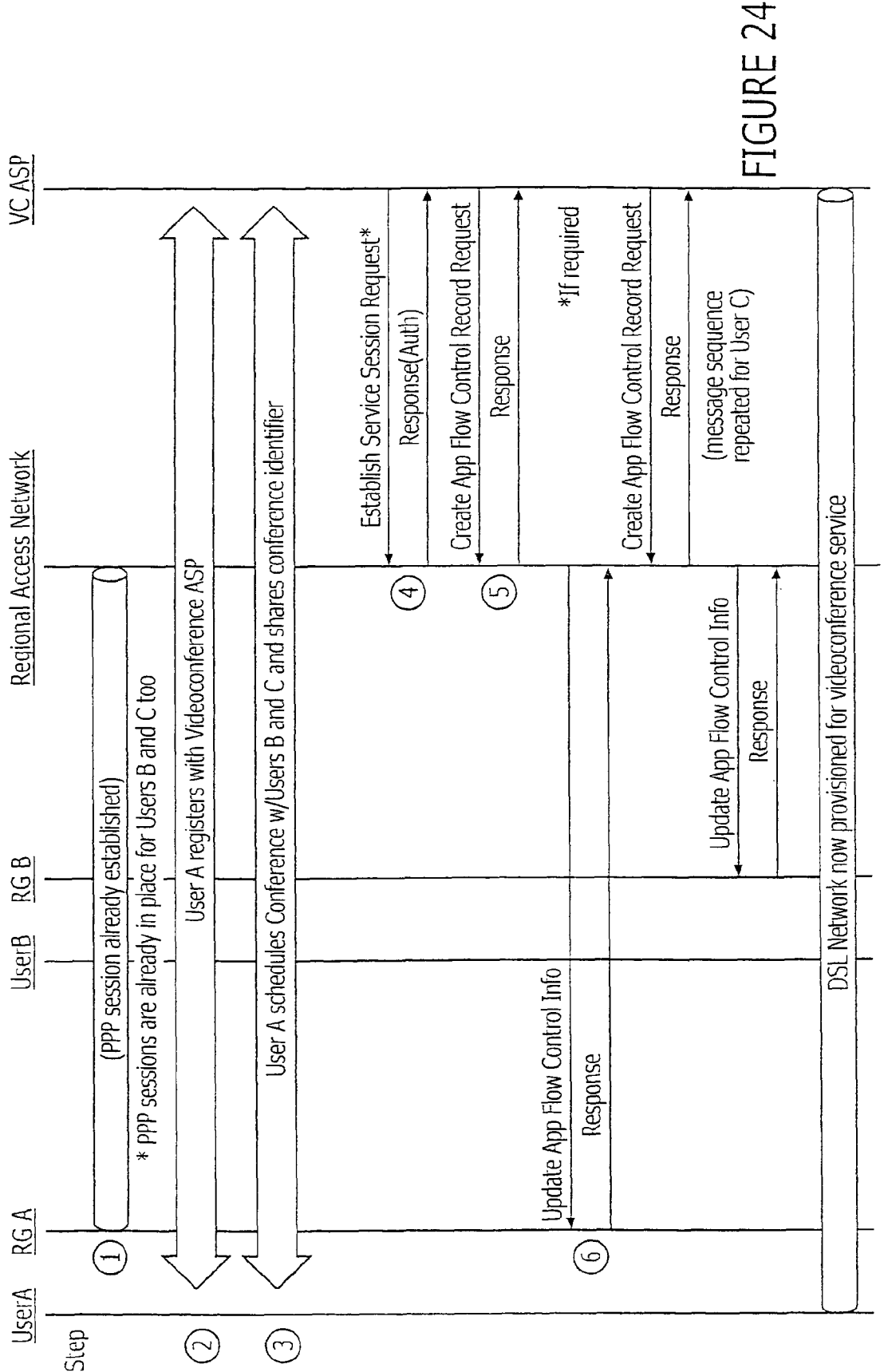
FIGS. 24 and 25 are event diagrams that illustrate operations of the video conferencing architecture of FIG. 23 in accordance with some embodiments of the present disclosure.
Figure 25:
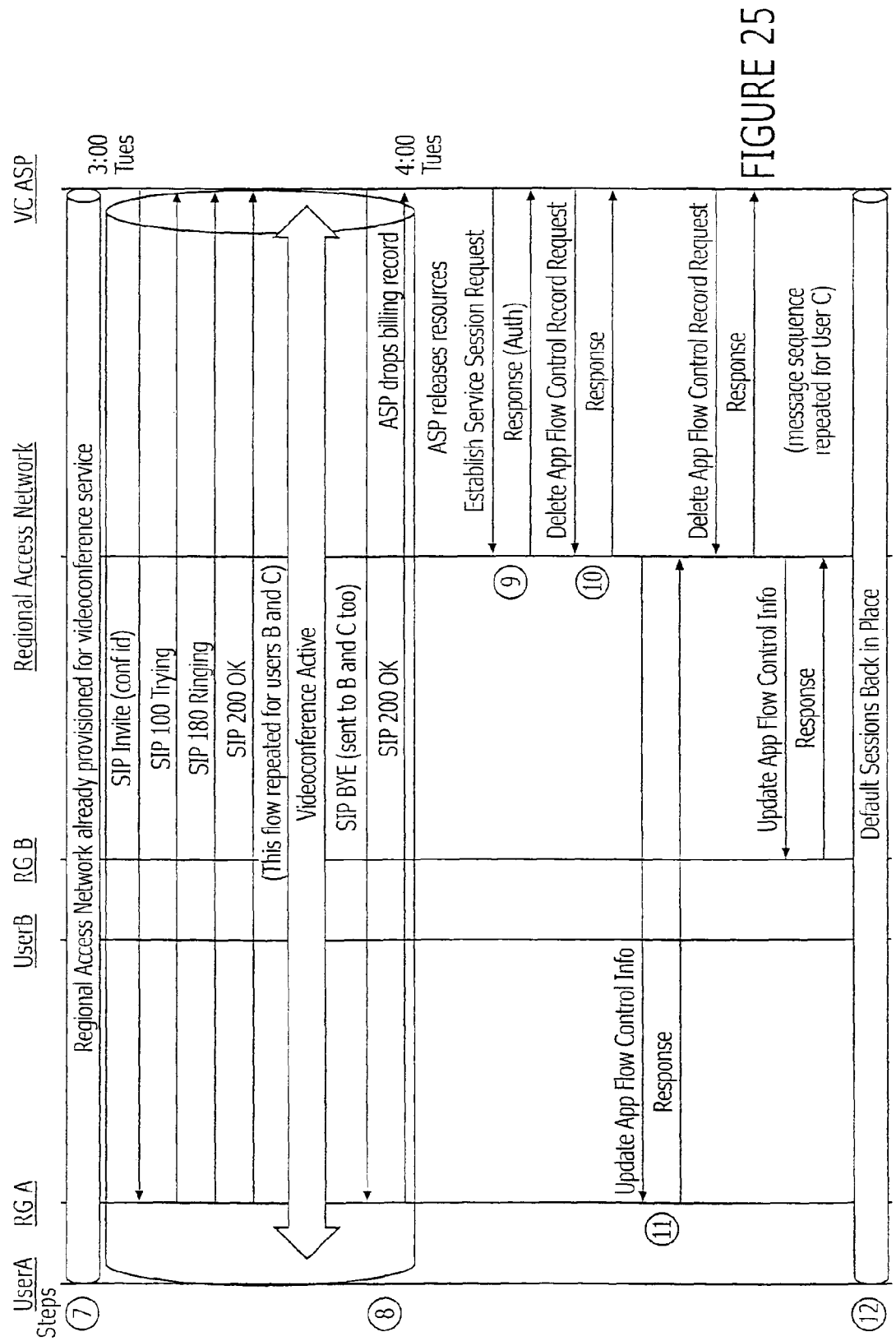
Figure 26:
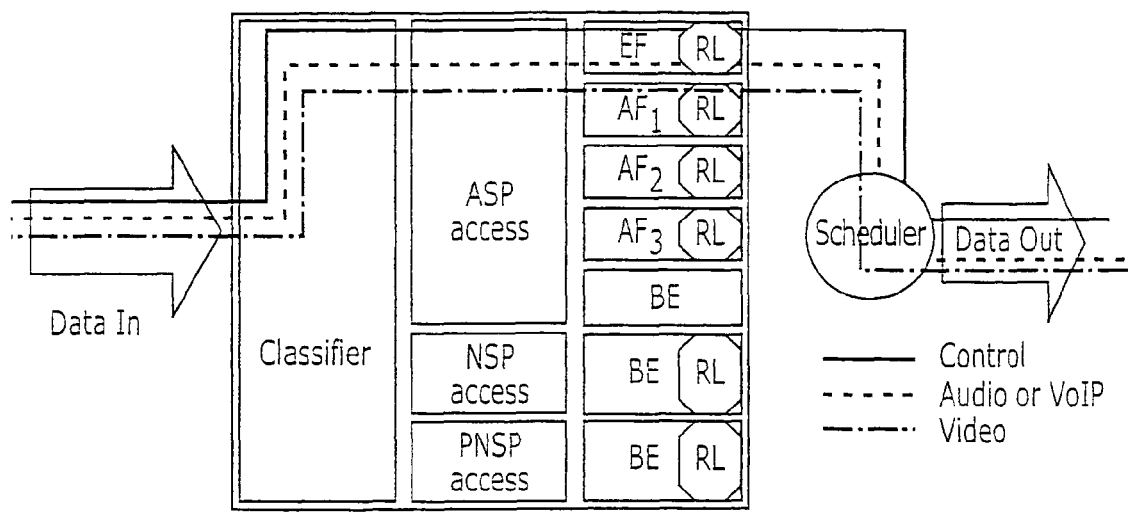
FIG. 26 is a block diagram that illustrates traffic classification and queuing treatments for the video conferencing service in accordance with some embodiments of the present disclosure.
Figure 27:
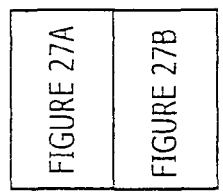
FIG. 27 is a block diagram that illustrates operations of a video conferencing architecture in accordance with some embodiments of the present disclosure.
Figure 27A:
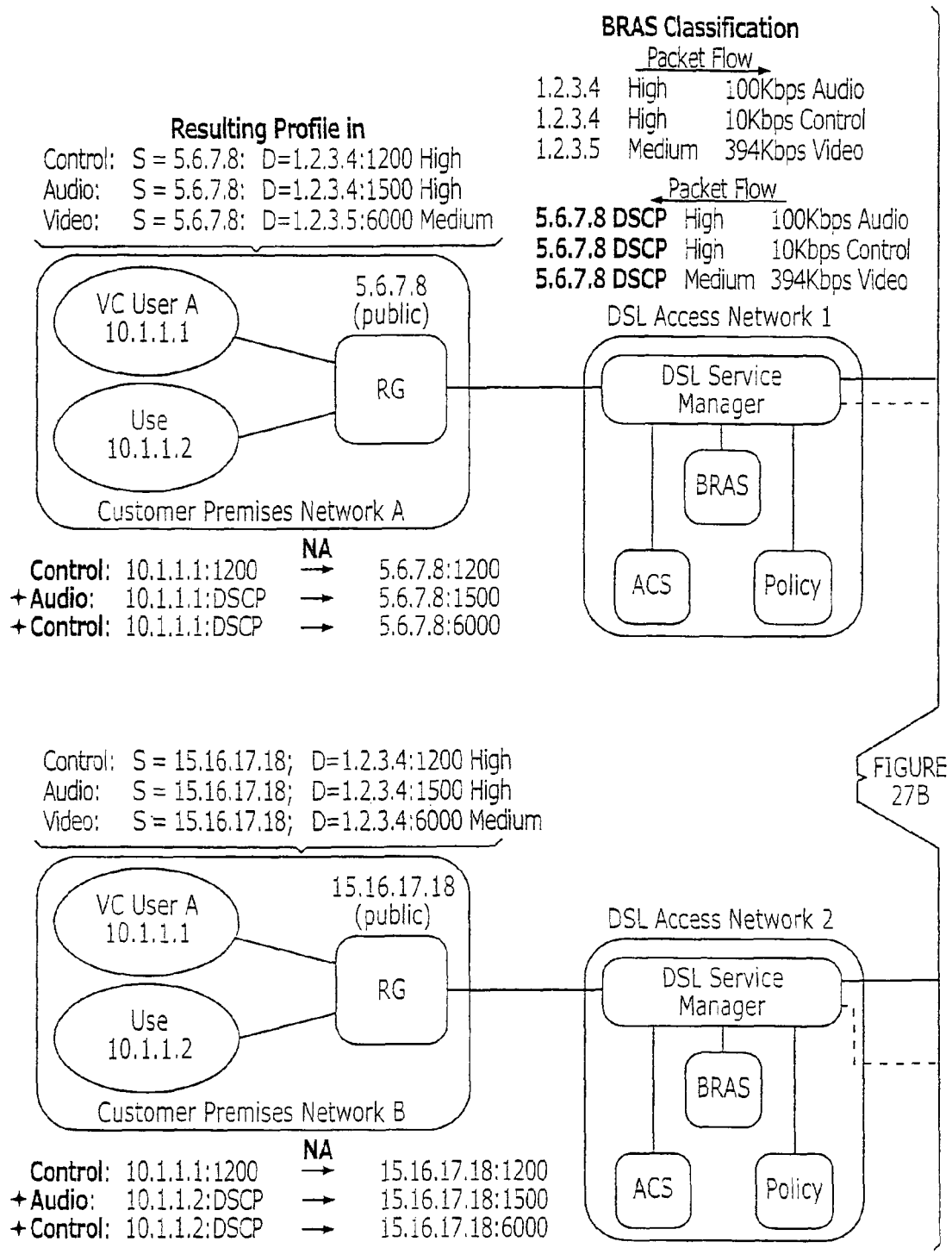
Figure 27B:
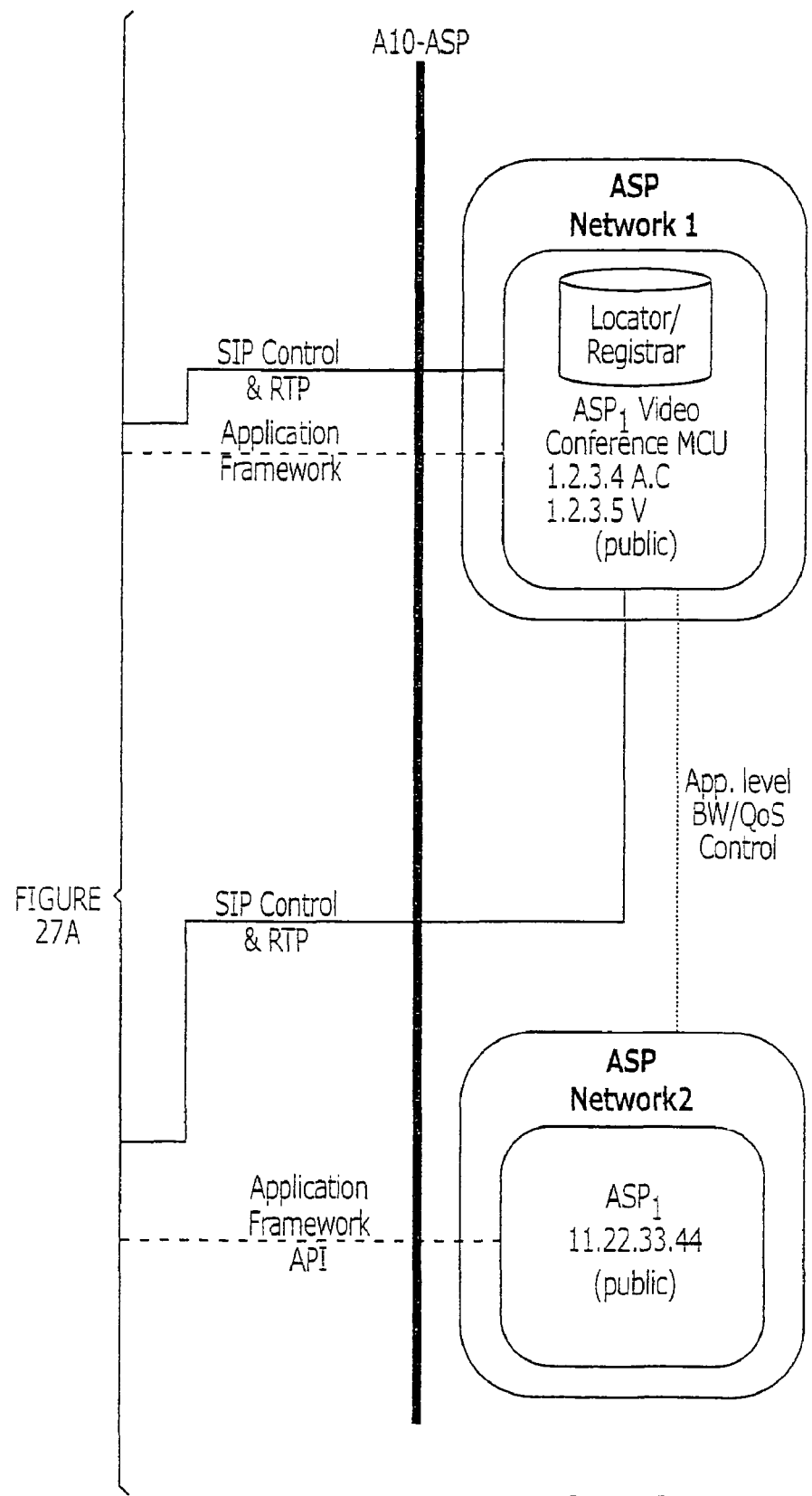

Referring to FIG. 24, information that is used for setting up and classifying the flows required for a videoconference in accordance with some embodiments of the present disclosure is illustrated. First, during the initial setup, user A registers all participants and specifies the start time and end times, etc. The ASP reserves IP addresses for the conference on its platform and updates each participant's RG by issuing a createAppFlowReq request to the Regional access network. The BRAS uses the IP addresses specified by ASP, for reclassifying traffic to ASP, and will use the IP of the RG and the DSCP for reclassifying traffic en route to the videoconference client. The profile that gets pushed to each participant will contain $ASP_1$'s IP addresses for control, audio, and video flows. When the start time for the videoconference approaches, each participant will activate their videoconference client on his or her PC and login to the reserved conference.

Once $ASP_1$ receives the control message for call setup, it can refer to its table of reserved addresses to be used for the conference. Capability set negotiation occurs at this time (e.g., could be included in SDP component). The RG's ALG/NAT engine uses the DSCP and information from the ACS profile to determine which port it should assign to the RTP flows from the videoconference client. This may ensure consistency for the port information stored in the BRAS for reclassification. $ASP_1$, the BRAS, and the RG should now know all addresses, priorities and shaping information. The videoconference client's RTP streams can begin pushing audio and video.

10. Example Use Scenario—Gaming

Figure 28:
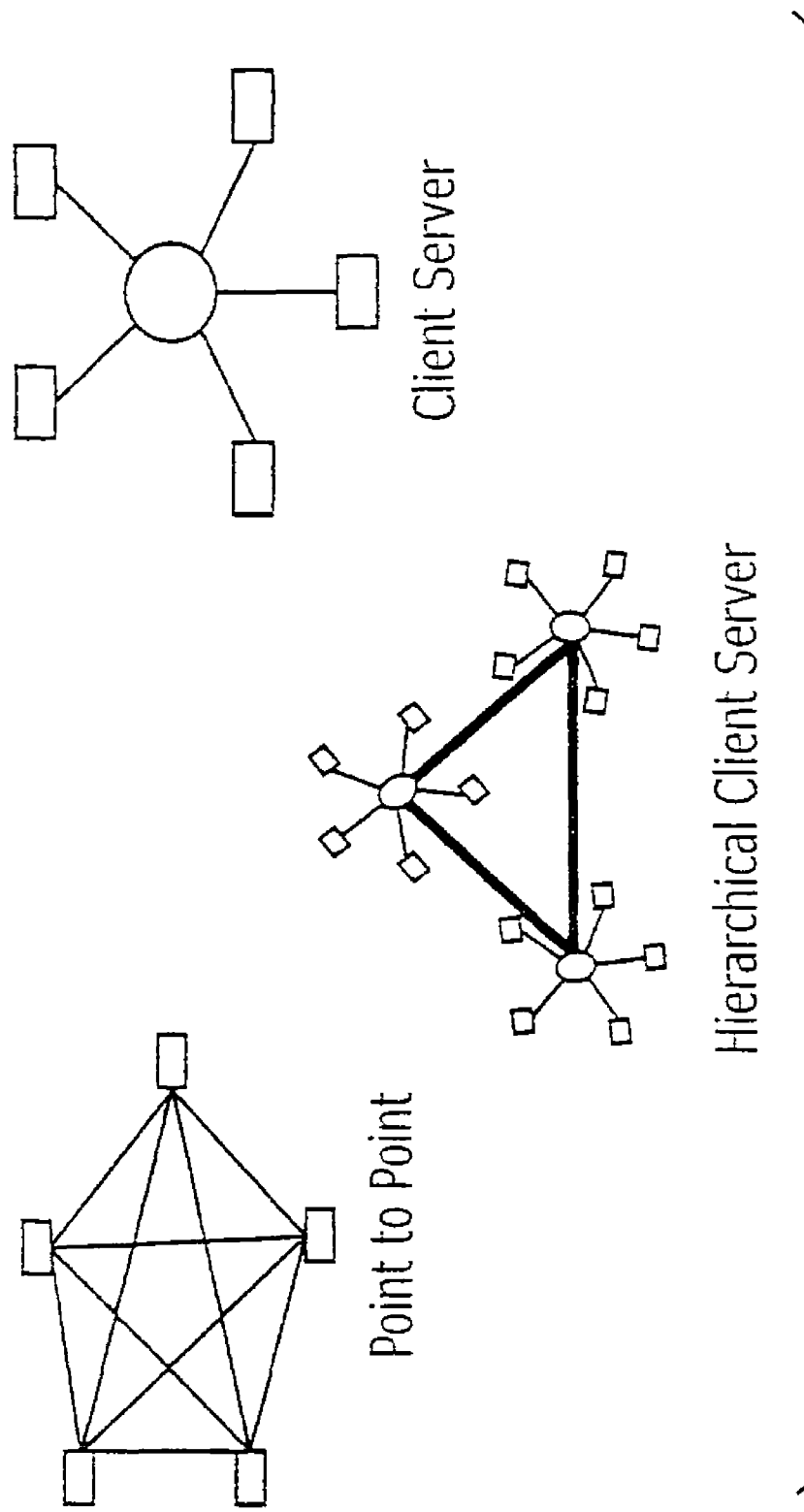
FIG. 28 is a diagram that illustrates network topologies for supporting gaming applications in accordance with some embodiments of the present disclosure.

This section illustrates how the DSL Application Framework can support a gaming service in accordance with some embodiments of the present disclosure. Though there are many different models for game play and delivery, this section discusses a particular class of games known as "massively multi-player interactive" games. Such games are characterized by substantial numbers of players (greater than 10 and up to the 1000s) and real time or near real-time interactions. Such games place significant demands on network and game server infrastructures. Other classes of games that are not discussed here include turn based games, single player (turn based or real time interactive), and head to head interactive games. Though each of these classes represents a significant number of games available to users, their network requirements are not nearly as complex as those of multi-player interactive games. Gaming Service Overview Two basic topologies are used to support network gaming: point to point or client server. In client server topology, the player's workstation communicates with a central game server to which other players are also connected. In the point to point topology, each player communicates directly with each other player. A refinement of the client server topology, the hierarchical client server topology, provides the necessary infrastructure to support true massively multi-player environments. These topologies are depicted in FIG. 28.

In the point to point topology, each gaming workstation must transmit its moves and state change information to each other gaming workstation. In addition, each workstation must maintain a consistent and synchronized image of the game universe for each player. As such the point to point topology requires significant computation power in the end user workstation and typically will not scale to supporting more than a number of users.

In both forms of the client server topology, the workstation and game server exchange information that is directly relevant only to a specific player. The client workstation is responsible for such tasks as managing user interactions, rendering, and audio feedback, while the server is responsible for maintaining a consistent view of the game universe and communicating changes to the view to player workstations. The difference between the two topologies is one of segmentation. In the hierarchical topology, a server is only responsible for maintaining the state of a portion of the universe. If a player connected to a particular server is interacting with a portion of the universe outside the scope of their immediate server, that server must coordinate with other servers in the network. This partitioning provides significantly more scalability than a simple client server topology.

In addition to maintaining game universe state at communicating state changes to players, a gaming service may provide other auxiliary functions including the following: Session Management: manages active player lists, supports ability to invite participants to join a game; presence and availability management: supports the ability of players to locate and determine if opponents are available for play; authentication: verify player identities and validate that players are using correctly licensed software on their workstation; interactive chat and bulletin board: provides a forum for discussion of gaming topics. Can also be used during game play to allow for intra-team communication; and/or content downloads: provides software update and new game delivery services.

Basic game server functionality and auxiliary functions represent a gaming service that may be offered in an ASP model in accordance with some embodiments of the present disclosure. The game server and servers for auxiliary functions are connected to the ASP network. Client workstations access a game server or auxiliary function server through their ASP network connection. From the perspective of the DSL network, whether a gaming service implements a client/server or hierarchical client/server topology is not important.

The DSL network is only involved in the transport of traffic between one or more game workstations and the game server to which they are connected. This service model is show in FIG. 29.

Traffic and Flow Characterization

In a client/server multiplayer gaming service, the game server and player workstation communicate state change and play event information in real time. The workstation informs the server of player triggered events including the following: Player moves; Player takes a shot; Player changes rooms; and/or Player picks up an object.

In a real-time game, the server reconciles these play event messages as they are received from each workstation or peer server. It then communicates state change information to each client workstation. These state change messages contain only information relevant to the particular player—only information about objects currently visible to the player is communicated. Examples of this information include: movement of other objects within the player's current view; hits made by the player; damage incurred by the player; death of the player or other players; and/or communication from the server or other players. Unfortunately, there does not appear to be a standard protocol for such communications; each gaming system seems to define its own methods of communication. The basic characteristics, however, seem to be similar.

While communication from the workstation to the server is typically event driven, server to workstation communication is often continuous. Servers often send state change messages in frames at a defined rate—10, 20, 30 frames per second. Frames tend to be significantly larger than voice or video frames. The total time required to send a user event, reconcile its impact on the game universe, and communicate state change back to the workstation may become the limiting factor in player reaction time. The longer the total time, the less reactive a player can be and the less interactive the gaming experience may become.

Reconciliation time is driven by server capacity and load. Message delivery times are driven by network limitations. For many games, a total round trip "ping" time of 200-350 ms is considered acceptable while 100 ms is considered exceptional. Anything greater than 500 ms may become very obvious to the player and is perceived as sluggishness. As latency increases it becomes more likely that players do not share a consistent view of the universe.

In summary, game play related traffic can be characterized as follows: steady frame rate; large frame size (relative to voice or video); and/or latency sensitive Auxiliary services generally do not share these characteristics. They typically are similar or identical to traditional Internet Web based services and do not suffer from significant impacts due to latency.

The bandwidth requirement for play related traffic is generally lower than for video services, but the latency sensitivity of game play traffic typically necessitates better than best-effort treatment. Flows related to game play may be placed in an assured forwarding queue at a minimum. Auxiliary services may be handled on a best effort basis. Play related traffic and auxiliary service traffic are typically carried in different flows.

Traffic within a game play flow may be further differentiated in accordance with additional embodiments of the present disclosure. For example, within the context of a particular game certain events may be treated with higher priority than others. This may be supported by allowing the application to use and set multiple diffserv code-points. Such use, however, may only be permitted if there is a trusted relationship between the ASP gaming host and the transport network.

Example Scenario Description

Figures 29, 30:
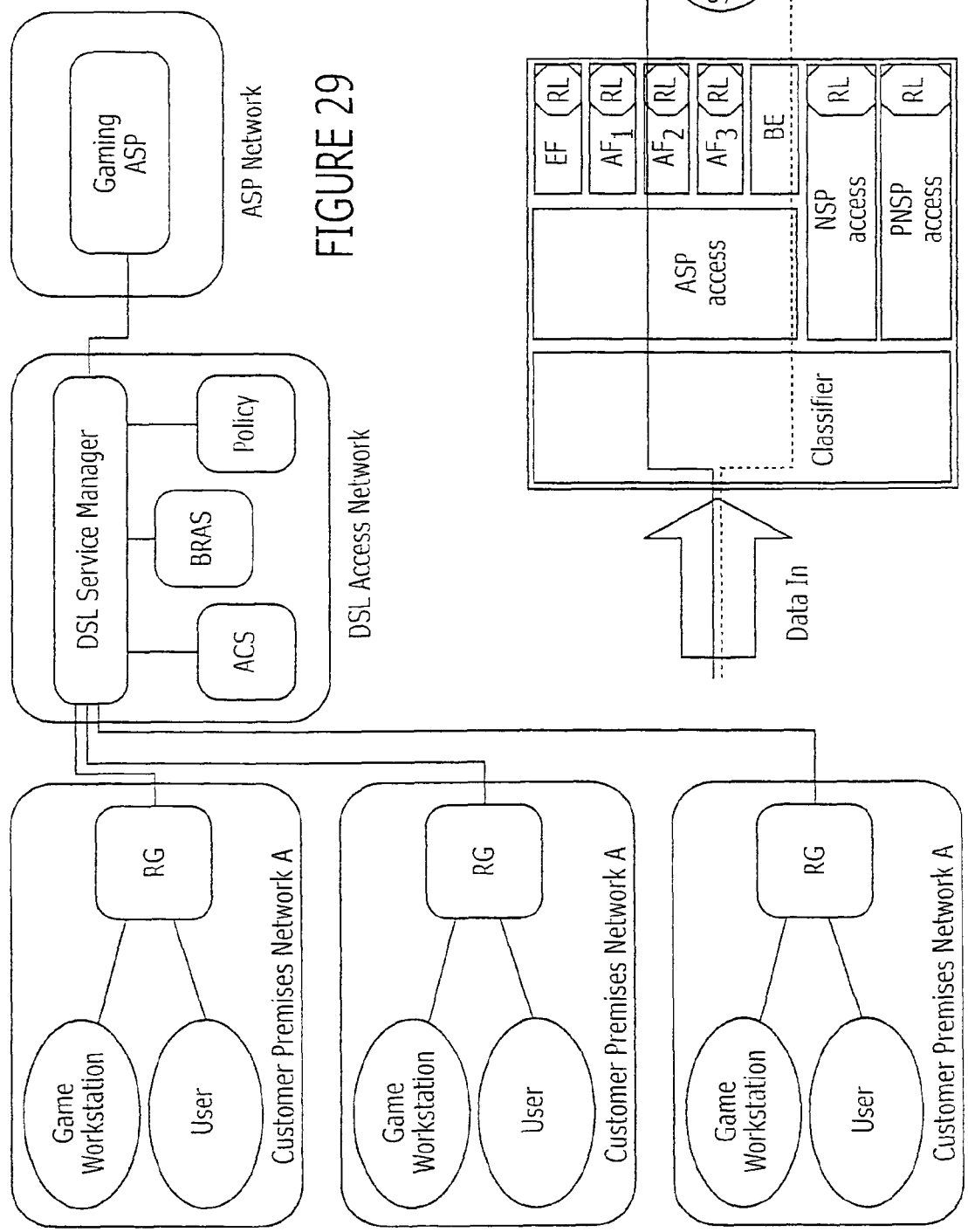
FIG. 29 is a block diagram that illustrates a gaming architecture using the application framework infrastructure of FIG. 13 in accordance with some embodiments of the present disclosure.
FIG. 30 is a block diagram that illustrates traffic classification and queuing treatments for the gaming service in accordance with some embodiments of the present disclosure.
Figure 31:
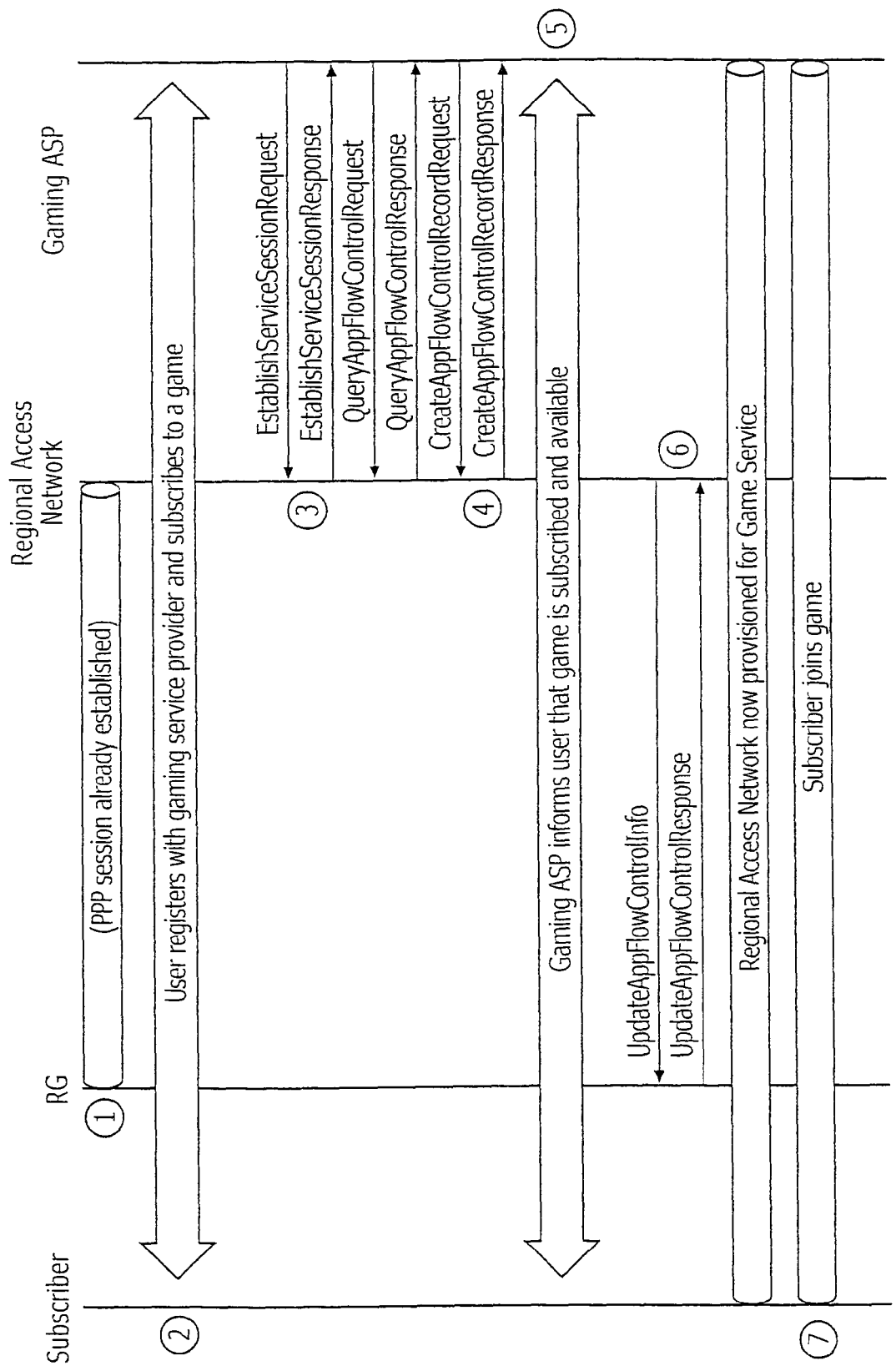
FIG. 31 is an event diagram that illustrates operations of the gaming architecture of FIG. 29 in accordance with some embodiments of the present disclosure.

The call flow for gaming is similar to Turbo button. The game provider needs to negotiate bandwidth profiles between the game server and the player workstation for the purposes of game play traffic. The steps in this scenario are illustrated in FIGS. 30 and 31, in accordance with some embodiments of the disclosure, as follows:

1. Subscriber establishes PPP session between RG and DSL network provider.
2. Subscriber accesses ASP gaming providers web site and registers for game play.
3. ASP gaming provider queries subscriber bandwidth profile and determines current profile to be insufficient for game play.
4. ASP creates application bandwidth/QOS profile at Regional Access Network.
5. ASP acknowledges subscription.
6. Regional access network pushes new flow qualifier and bandwidth info for game service to routing gateway.
7. Subscriber joins game using QOS enabled session.

11. Dynamic Provisioning

Figure 32:
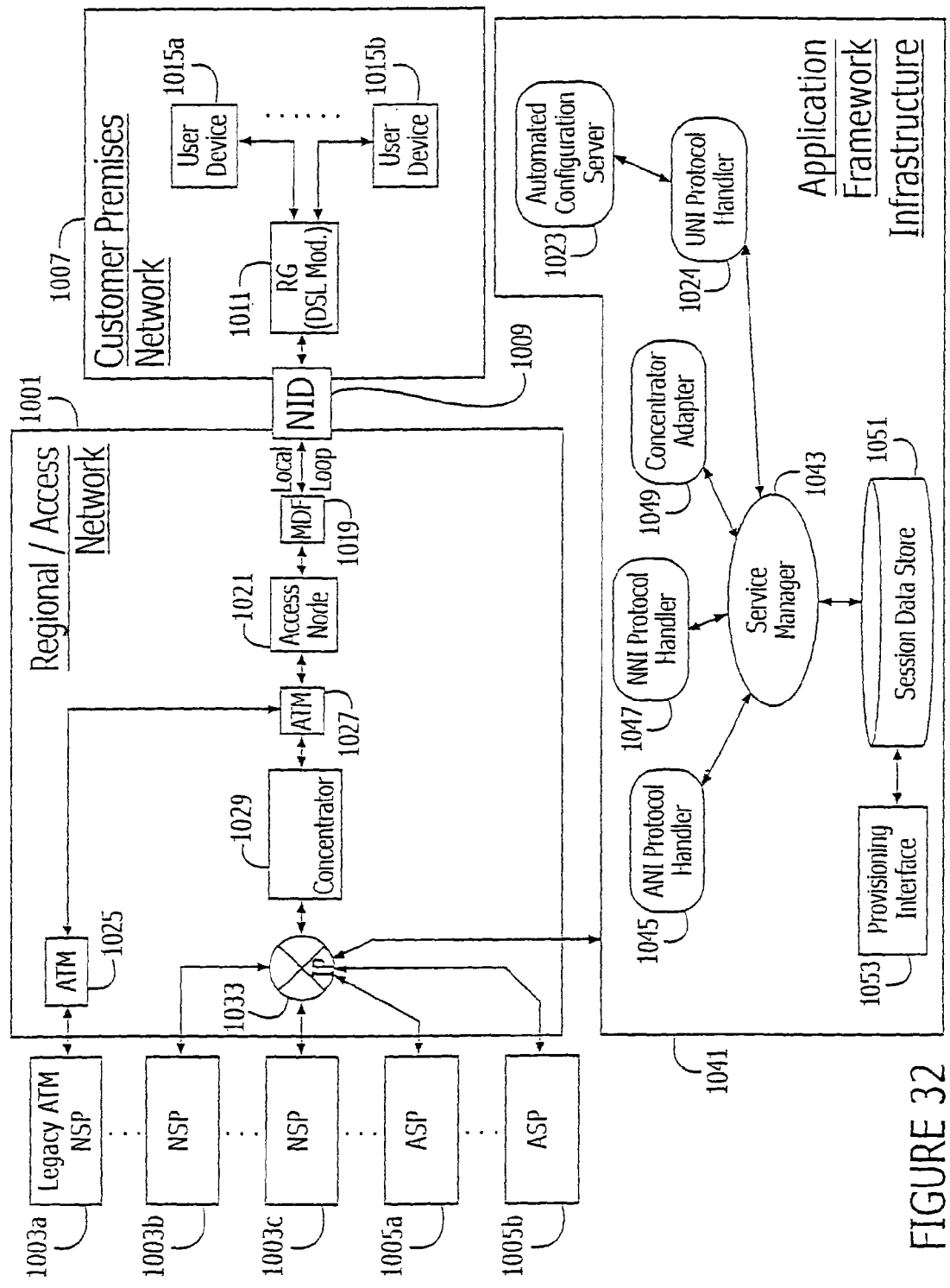
FIG. 32 is a block diagram illustrating data networks, data service providers, and customer networks according to embodiments of the present disclosure.

Some embodiments of the present disclosure will now be discussed with respect to FIG. 32. As discussed above, a regional/access network 1001, such as a digital subscriber line (DSL) network, may be used to provide broadband data connectivity between one or more network service providers 1003*b-c*, application service providers 1005*a-b*, and one or more customer premises networks 1007. While connectivity between regional/access network 1001 and a single customer premises network 1007 is illustrated in FIG. 32, it will be understood that regional/access network 1001 generally will support connectivity with many customer premises networks.

A network interface device (NID) 1009 may provide an interface between local loop wires of regional/access network (RAN) 1001 and the customer premises network 1007. On the customer side of the NID 1009, a routing gateway 1011 (such as a DSL modem remote from the regional/access network 1001) may receive data from and transmit data to regional/access network 1001. Moreover, multiple user devices 1015*a-b* (such as personal and/or laptop computers) may concurrently access regional/access network 1001 through the routing gateway 1011. More particularly, the NID 1009 may provide an interface between the routing gateway 1011 and a local loop providing voice and data connectivity to a main distribution frame (MDF) 1019 of a public switched telephone network (PSTN) so that data connectivity is provided as a digital subscriber line. It will be understood that the operator of regional/access network 1001 may also provide telephone voice and/or other data services. Telephone voice and/or other data services are not discussed herein or illustrated in FIG. 32 for the sake of clarity.

Access node 1021 may provide aggregation between an access portion of the network and a regional portion of the network, and may provide aggregation of data from multiple digital subscriber lines. Automated configuration server (ACS) 1023 may provide configuration information to routing gateways 1011 at the various customer premises networks 1007, and UNI protocol handler 1024 may provide an interface between service manager 1043 and automated configuration server 1023. Regional/access network 1001 may also support legacy asynchronous transfer mode (ATM) network service providers (NSP) 1003*a* using one or more ATM transceiver(s) 1025 and/or ATM switches 1027.

A concentrator 1029 such as a broadband remote access server (BRAS) may provide aggregation between regional/access network 1001 and network service providers 1003*b-c* and application service providers 1005*a-b*. Concentrator 1029 and routing gateway 1011 may provide control of session bandwidth and queuing priority for data transmitted by and received from the particular routing gateway 1011. Moreover, application flow control information for each session being conducted with each routing gateway 1011 coupled with regional/access network 1001 may be stored at that routing gateway 1011. Accordingly, concentrator 1029 and routing gateway 1011 may implement appropriate bandwidth restrictions and/or queuing priorities for all data sessions being conducted between the two. As further shown in FIG. 32, data from network service providers 1003b-c and application service providers 1005a-b may be transported through an IP network 1033 to the RG 1011 via the RAN 1011, and the IP network 1033 may also transport data from the RAN 1001 to the network service providers 1003b-c and the application service providers 1005a-b.

In addition, an application framework infrastructure 1041 provides data flow management for data sessions between routing gateways 1011 and network service providers 1003b-c and application service providers 1005a-b according to embodiments of the present disclosure. More particularly, a service manager 1043 (such as a DSL service manager) may coordinate implementation of data flow characteristics for particular sessions between network service providers (NSPs), application service providers (ASPs), and routing gateways. As shown in FIG. 32, communications between service manager 1043 and application service providers. 1005a-b may be provided by application-to-network interface (ANI) protocol handler 1045 and IP network 1033. Communications between service manager 1043 and network service providers 1003b-c may be provided by network-to-network interface (NNI) protocol handler 1047 and IP network 1033. Communications between service manager 1043 and concentrator 1029 may be provided through concentrator adapter 1049 and IP network 1033. Communication between service manager 1043 and routing gateway 1011 may be provided through UNI protocol handler 1024, automated configuration server 1023, IP Network 1033, concentrator 1029, ATM switch 1027, access node 1021, MDF 1019, and network interface device 1009.

As shown in FIG. 32, the application framework infrastructure 1041 may include ANI protocol handler 1045, NNI protocol handler 1047, concentrator adapter 1049, UNI protocol handler 1024, automated configuration server 1023, service manager 1043, session data store 1051, and provisioning interface 1053. As illustrated in FIG. 32, functionality of the application framework infrastructure 1041 may be implemented outside functional elements illustrated in regional/access network 1001. In an alternative, functionality of some or all of the elements of the application framework infrastructure 1041 may be implemented within one or more elements illustrated in regional/access network 1001. For example, some or all of the elements of the application framework infrastructure 1041 may be implemented within concentrator 1029. More particularly, some or all of the elements of the application framework infrastructure 1041 may be implemented as software components operating on a server providing functionality of concentrator 1029. In addition or in an alternative, elements of the application framework infrastructure 1041 may be implemented as software components operating in elements of regional/access network 1001 other than concentrator 1029, and/or operating in an additional element or elements (such as one or more additional servers) not included in regional/access network 1001 illustrated in FIG. 32.

According to embodiments of the present disclosure, regional/access network 1001 may provide a data path for a data session, such as a point-to-point protocol (PPP) data session, between one or more routing gateways 1011 and one or more of legacy ATM 1003a, NSPs 1003b-c, and/or ASPs 1005a-b. More particularly, a data path may be provided through IP Network-1033, -concentrator 1029, ATM. Switch 1027, access node 1021, and MDF 1019. Elements of regional/access network 1001 and/or the application framework infrastructure 1041 may also provide separate signaling paths. A signaling path between service manager 1043 and one or both of ASPs 1005a-b may be provided through the ANI protocol handler 1045 and IP Network 1029. A signaling path between service manager 1043 and NSP 1003b and/or NSP 1003c may be provided through NNI protocol handler 1047 and IP Network 1033. A signaling path between service manager 1043 and concentrator 1029 may be provided through concentrator adapter 1049 and IP Network 1033. A signaling path between service manager 1043 and routing gateway 1011 may be provided through UNI protocol handler 1024, automated configuration server 1023, IP Network 1033, concentrator 1029, ATM switch 1027, access node 1021, and MDF 1019.

More particularly, concentrator 1029 may be a broadband remote access server (BRAS), and a particular concentrator adapter 1049 may be used to provide an appropriate interface for a particular broadband remote access server. For example, concentrator 1029 may be provided using a broadband remote access server such as a Shasta 5000 Broadband Service Node produced by Nortel Networks or a Juniper ERX-310 BRAS/edge router produced by Juniper Networks. Accordingly, the concentrator adapter 1049 may be modified to provide compatibility with different concentrators.

While not separately illustrated in FIG. 32, each of the routing gateway 1011, application service providers 1005a-b, and network service providers 1003b-c may include a transceiver(s) to transmit data to and receive data from regional/access network 1001. In addition, concentrator 1029 may also include a transceiver to transmit data to and receive data from application service providers 1005a-b and network service providers 1003b-c. Similarly, MDF 1019 and/or access node 1021 may include a transceiver to transmit data to and/or receive data from routing gateways.

Moreover, transmitters, receivers, and/or transceivers according to embodiments of the present disclosure may be wired and/or wireless. By way of example, transmitters, receivers, and/or transceivers according to embodiments of the present disclosure may be provided using circuit-switched networks, and/or packet-based networks and/or network elements, such as Internet Protocol (IP) networks and elements. In addition or in alternatives, transmitters, receivers, and/or transceivers according to embodiments of the present disclosure may be provided wirelessly, for example, using cellular communications, personal communications systems (PCS), WiFi, Ultrawideband, Bluetooth, and/or satellite communications. In addition or in other alternatives, transmitters, receivers, and/or transceivers according to embodiments of the present disclosure may be provided in wire line environments such as in cable communications and/or power line communications.

Information relating to data flow characteristics can be stored in session data store 1051, and a provisioning interface 1053 may allow an operator of regional/access network 1001 to provision bandwidth and Quality-of-Service settings for each individual subscriber. Accordingly, application flow control information for each session conducted at each routing gateway may be stored at session data store 1051, and at routing gateway 1011. Moreover, an application flow control record may be created by service manager 1043 responsive to a request from application service providers 1005a-b when a data session with a routing gateway is established with one of the application service providers, and the application flow control record may be deleted by service manager 1043 responsive to a request from application service providers 1005a-b when the data session with routing gateway 1011 is terminated. Operations of elements illustrated in FIG. 32 are discussed above in greater detail, for example, with respect to FIGS. 1-7 and 13-21, and/or at Sections 6.4, 6.4.1, and 6.4.2, and more particularly, at Section 6.4 "Application Framework Infrastructure"; at Section 6.4.1 "Framework Infrastructure Element Functional Description"; at Section 6.4.2 "Application Flow Control Record Creation Scenario Messaging Flow"; and at Section 6.4.2 "Application Flow Control Record Deletion Scenario Messaging Flow".

According to particular embodiments of the present disclosure, a user at a user device 1015a may establish a data session using a data service provided by a service provider such as an application service provider 1005a or 1005b and/or a network service provider 1003b or 1003c over a data path established through routing gateway 1011, the network interface device 1009, and regional/access network 1001. For example, a service provider may provide one or more of application services such as gaming, video on demand, video conferencing, and/or access to virtual private networks (VPNs) via IPsec and/or another Internet Protocol tunneling technique. Applicant services are discussed in greater detail above, for example, at Section 9 "Example Use Scenario—Video Conferencing" and at Section 10 "Example Use Scenario—Gaming".

The service provider may initiate establishing a data session through regional/access network 1001 and routing gateway 1011 responsive to a request received from user device 1015a over regional/access network 1001. When the data session is complete and/or when a termination request is received from user device 1015a, application service provider 1005a or 1005b may initiate terminating the data session.

More particularly, characteristics of the data path through regional/access network 1001 between a service provider (such as an application service provider 1005a or 1005b or a network service provider 1003b or 1003c) and a routing gateway 1011 may be dynamically changed during a data session between the service provider and routing gateway 1011. According to some embodiments of the present disclosure, a bandwidth of the data path and/or a prioritization of data services being provided by the service provider over the data path may be dynamically changed during the data session. According to additional embodiments of the present disclosure, characteristics of the data path may be established responsive to a request received from the service provider. Moreover, characteristics of the data path may be established responsive to operation of a "Turbo Button" as discussed above, for example, at Section 8 "Example Use Scenario—Turbo Button".

By way of example, a data path may be established through a data network (such as regional/access network 1001) between a routing gateway 1011 for a subscriber of the data network and a service provider (such as an application service provider 1005a or 1005b and network service provider 1003b or 1003c). More particularly, the service provider may provide a data service for use at routing gateway over the data path during a data session. After establishing the data path through the data network, a first data flow characteristic for the data path may be enforced during a first interval of the data session, and a second data flow characteristic for the data path may be enforced during a second interval of the data session. More particularly, the first and second data flow characteristics are different. Moreover, both of the first and second intervals may occur after establishing the data path for the data session and before terminating the data path thereby terminating the data session. Stated in other words, data flow characteristics may be changed dynamically during a data session.

By way of example, an application flow control record may be saved for a data session between routing gateway 1011 and application service provider 1005a or 1005b as discussed in U.S. application Ser. No. 10/722,194 filed Nov. 25, 2003, and entitled "Methods Of Providing Data Services Over Data Networks And Related Data Networks, Data Service Providers, Routing gateways, And Computer Program Products." The above referenced application and the present application have common inventorship, the above referenced application and the present application are commonly assigned, and the disclosure of the above referenced application is incorporated herein in its entirety by reference.

Moreover, a first application flow control record for a data session may define a first bandwidth and/or first application priorities for a data path providing the data session during a first interval of the data session, and a second application flow control record for the data session may define a second bandwidth and/or second application priorities for the data path during a second interval of the data session. In addition, the first and second bandwidths may be different and/or the first and second application priorities may be different. More particularly, the first and/or second application flow control record may be generated responsive to request(s) from application service provider 1005a or 1005b, and the bandwidth and/or priority information may be defined by application service provider 1005a or 1005b. In addition, the first and second application flow control records (including the bandwidth and/or priority information) may be saved during the respective intervals at session data store 1051 and at routing gateway 1011.

As discussed above, a data path between a service provider (such as an application service provider 1005a or 1005b or a network service provider 1003b or 1003c) and routing gateway 1011 may be established through regional/access network 1001. More particularly, the data path may be established through IP Network 1033, concentrator 1029, ATM switch 1027, access node 1021, and MDF 1019. Moreover, data flow characteristics for a data path between a service provider and routing gateway 1011 may be enforced at concentrator 1029 and at routing gateway 1011. By way of example, service manager 1043 may determine particular data flow characteristics to be enforced with respect to a particular data path during different intervals of a data session, and separate signaling paths (other than the data path) may be used to transmit the data flow characteristics to concentrator 1029 and to the routing gateway 1011. For example, a signaling path through concentrator adapter 1049 and IP network 1033 may be used to transmit data flow characteristics from service manager 1043 to concentrator 1029. A signaling path through UNI protocol handler 1024, automated configuration server 1023, IP network 1033, concentrator 1029, ATM switch 1027, access node 1021, and MDF 1019 may be used to transmit data flow characteristics for the data path to routing gateway 1011.

The data flow characteristics enforced during the first and second intervals of a data session may represent different values of a same characteristic. For example, the first data flow characteristic may be a first allowed bandwidth for the data path between routing gateway 1011 and the service provider, and the second data flow characteristic may be a second allowed bandwidth for the data path between routing gateway 1011 and the service provider, with the first and second allowed bandwidths being different. Accordingly, a higher bandwidth (or data rate) may be allowed during a first interval of a data session, and a lower bandwidth (or data rate) may imposed during a second interval of a data session. As used herein, the terms first and second are used to distinguish different intervals of a data session without respect to an order thereof.

By way of example, a service provider may provide a plurality of services available to routing gateway 1011 during a data session. A first data service may be provided during the first interval of the data session, and a second data service may be provided during the second interval of the data session, with a higher bandwidth being allowed for the service requiring higher bandwidth, and with a lower bandwidth being imposed for the service requiring less bandwidth. In an alternative, first and second data services may be provided during a first interval of the data session, and only the second data service may be provided during a second interval of the data session. Accordingly, a higher bandwidth may be allowed during the first interval when two data services are being provided over the data path, and a lower bandwidth may be imposed during the second interval when only one data service is being provided.

The service provider may provide a plurality of data services for use at routing gateway 1011 through the data path during the data session. Moreover, the first data flow characteristic may be a prioritization of the plurality of data services during the first interval, the second data flow characteristic may be a second prioritization of the plurality of data services during the second interval, and the first and second prioritizations may be different. For example, a same bandwidth may be provided for first and second intervals of a data session with multiple data services being provided during both intervals. Moreover, a first priority of a first data service of the plurality of data services may be provided during the first interval, and a second higher priority of the first data service may be provided during the second interval of the data session. Accordingly, varying demands of different data services can be accommodated during different intervals of a same data session.

As discussed above, a data path can be established through regional/access network 1001 between routing gateway 1011 and a data service provider (such as an application service provider 1005a or 1005b or a network service provider 1003b or 1003c), and different data flow characteristics may be enforced during different intervals of the data session. In addition, a subsequent (or preceding) data path may be established through regional/access network 1001 between routing gateway 1011 and another data service provider providing another data service. Accordingly, the other data service may be provided for use at routing gateway 1011 over the second data path during a second data session.

According to additional embodiments of the present disclosure, a data path may be established through regional/access network 1001 between routing gateway 1011 for a subscriber of the data network and a service provider (such as application service provider 1005a or 1005b or network service provider 1003b or 1003c) providing a data service for use at routing gateway 1011 during a data session. More particularly, the data service provider may transmit a request to the data network, with the request defining a data flow characteristic for the data path between routing gateway 1011 and the data service provider during the data session. The request from the data service provider may be received at regional/access network 1001, and the data flow characteristic for the data path may be enforced during the data session.

More particularly, the data service provider may transmit the request over a signaling path to service manager 1043. If the data service provider is application service provider 1005a or 1005b, the request may be transmitted to service manager 1043 over a signaling path including IP Network 1033, and ANI protocol handler 1045. If the data service provider is network service provider 1003b or 1003c, the request may be transmitted to service manager 1043 over a signaling path including IP Network 1033, and NNI protocol handler 1047. Once the request is received at service manager 1043, the data flow characteristic may be transmitted by service manager 1043 to concentrator 1029 and routing gateway 1011 where the data flow characteristic for the data path can be enforced.

The data flow characteristic may be transmitted, for example, as a part of an application flow control record as discussed above. Moreover, the data flow characteristic may be transmitted as part of an application flow control record from service manager 1043 to concentrator 1029 over a signaling path through concentrator adapter 1049 and IP network 1033. In addition, the data flow characteristic may be transmitted as part of an application flow control record from service manager 1043 to routing gateway 1011 over a signaling path through UNI protocol handler 1024, automated configuration server 1023, IP Network 1033, concentrator 1029, ATM switch 1027, access node 1021, and MDF 1019. The data flow characteristic may be saved at concentrator 1029, and the data characteristic may be saved at routing gateway 1011 for enforcement of the data flow characteristic at routing gateway 1011. The data flow characteristic may also be saved at session data store 1051 for use at service manager 1043. Moreover, the data flow characteristic may be stored at routing gateway 1011, and at session data store 1051 until the data path (and corresponding data session) are terminated, or until the data flow characteristic for the data path is changed.

A second data path through regional/access network 1001 may be established between routing gateway 1011 and another data service provider providing a second data service for use at routing gateway 1011 over the second data path during a second data session. A request from the other data service provider may define a data flow characteristic for the second data path during the second data session. Accordingly, regional/access network 1001 may enforce one or a plurality of data flow characteristics for different data paths during different data sessions based on requests received from respective data service providers.

Moreover, different data flow characteristics may be enforced during different intervals of a same data session with a same data service provider. More particularly, after establishing a data path, a second data flow characteristic for the data path between routing gateway 1011 and the service provider may be enforced during a second interval of the data session, with the first and second data flow characteristics being different. After the first and second intervals, the data path may be terminated thereby terminating the data session.

The first data flow characteristic may be a first allowed bandwidth for the data path through regional/access network 1001 between routing gateway 1011 and the data service provider, and the second data flow characteristic may be a second allowed bandwidth for the data path through regional/access network 1001 between routing gateway 1011 and the data service provider, with the first and second bandwidths being different. For example, the data service provider may provide a plurality of data services with a first data service being provided over the data path during the first interval of the data session, and with a second of the data services being provided over the data path during a second interval. Accordingly, the allowed bandwidth for a data path during a data session with a data service provider may be changed to accommodate different data services provided by the data service provider.

For example, first and second data services may be provided during the first interval, but only the second data service maybe provided during the second interval so that a higher bandwidth is allowed during the first bandwidth. In an alternative, the first data service (and not the second data service) may be provided during the first interval, the second data service (and not the first data service) may be provided during the second interval, and the first data service may require a greater bandwidth than the second data service so that the first allowed bandwidth is greater than the second allowed bandwidth. Accordingly, the data service provider may request an appropriate bandwidth for the data path through regional/access network 1001 based on characteristics of data services being provided.

The service provider may also provide a plurality of data services for use at routing gateway 1011 through the data path during the data session. Moreover, the first data flow characteristic may be a first prioritization of the plurality of data services, the second data flow characteristic may be a second prioritization of the plurality of data services, and the first and second prioritizations may be different.

Figure 33:
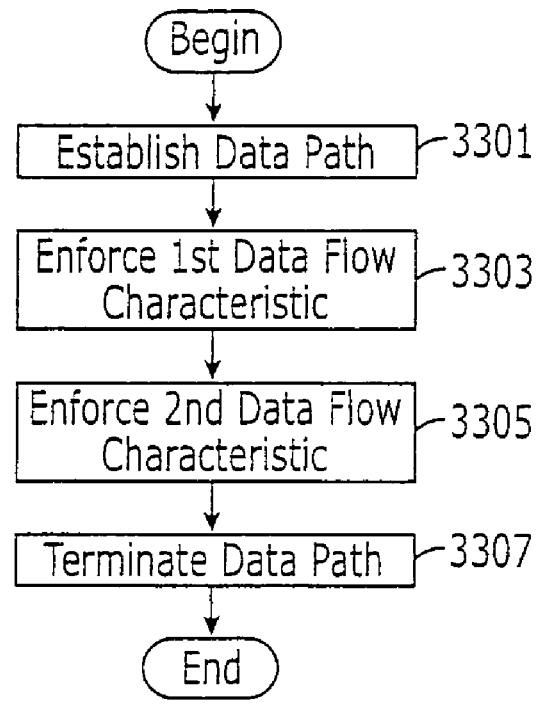
FIGS. 33-36 are flow charts illustrating operations of data networks, data service providers, and routing gateways according to embodiments of the present disclosure.
Figure 34:
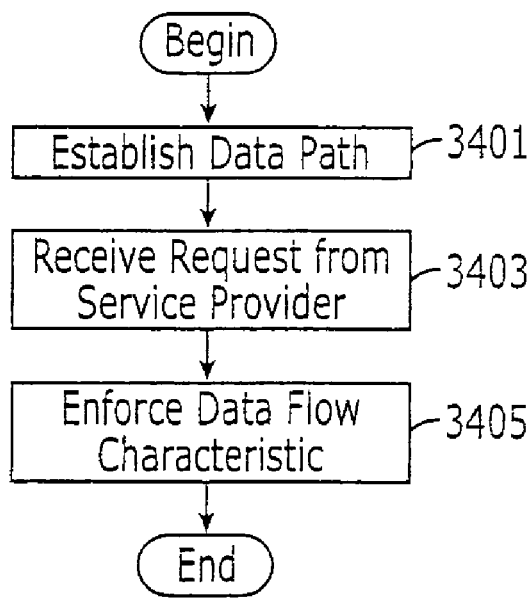

Methods of operating a data network (such as a regional/access network) according to embodiments of the present disclosure are discussed with reference to FIGS. 33 and 34. As shown in FIG. 33, a data path may be established through the data network at block 3301. More particularly, the data path may be established between a routing gateway for a subscriber of the data network and a service provider providing a data service for use at the routing gateway over the data path during a data session. At block 3303, a first data flow characteristic may be enforced for the data path between the routing gateway and the service provider during a first interval of the data session after establishing the data path. At block 3305, a second data flow characteristic may be enforced for the data path between the routing gateway and the service provider during a second interval of the data session, and the first and second data flow characteristics may be different. At block 3307, the data path between the routing gateway and the data service provider may be terminated thereby terminating the data session.

More particularly, the first data flow characteristic enforced at block 3301 may be a first allowed bandwidth for the data path between the routing gateway and the service provider. The second data flow characteristic enforced at block 3303 may be a second allowed bandwidth for the data path between the routing gateway and the service provider, and the first and second allowed bandwidths are different. In particular, the data service provider may provide a plurality of data services for use at the routing gateway through the data path during the data session, a first of the data services may be provided over the data path during the first interval of the data session, a second of the data services may provided over the data path during the second interval. Moreover, the first of the data services may not be provided over the data path during the second interval so that different bandwidths may be allowed over different intervals of a data session to accommodate different services. For example, both of the first and second of the data services are provided over the data path during the first interval so that a greater bandwidth may be needed during the first interval. In an alternative, the second of the data services may not be provided over the data path during the first interval, and one of the first or second data services may consume a greater bandwidth.

In addition or in an alternative, the data service provider may provide a plurality of data services through the data path established at block 3301 during the data session. More particularly, the first data flow characteristic enforced at block 3303 may be a first prioritization of the plurality of data services, and the second dataflow characteristic enforced at block 3305 may be a second prioritization of the plurality of data services, and the first and second prioritizations may be different. Moreover, a same bandwidth may be provided for the data path during the first and second intervals of the data session while enforcing the first and second prioritizations at blocks 3303 and 3305.

A second data path may also be established through the data network between the routing gateway and a second service provider providing a second data service for use at the routing gateway during a second data session. Accordingly, different data paths may be provided through the data network between a routing gateway and different data service providers at different times during different data sessions.

In addition, enforcing the first data flow characteristic at block 3301 may be preceded by receiving a request from the service provider, with the request defining the first data flow characteristic for the data path between the routing gateway and the service provider providing the data service during the data session. Moreover, a signaling path may be established between the service provider and the data network wherein the request from the service provider is received over the signaling path. Methods of operating a data network according to additional embodiments of the present disclosure are illustrated in the flow chart of FIG. 34. A data path may be established at block 3401 through the data network between a routing gateway for a subscriber of the data network and a service provider providing a data service for use at the routing gateway over the data path during a data session. At block 3403, a request may be received from the service provider, with the request defining a data flow characteristic for the data path between the routing gateway and the service provider during the data session. Moreover, the data flow characteristic may be enforced at block 3405 for the data path between the routing gateway and the service provider providing the data service during the data session.

According to particular embodiments of the present disclosure, a request from the routing gateway for the data service may be transmitted over the data network to the service provider providing the data service. Responsive to receiving the request from the routing gateway, the data service provider may transmit a request to the data network to establish the data path, and the request may also define a desired data flow characteristic(s) for the data path to be established. For example, a single request may be transmitted from the data service provider to the data network to both establish the data path and to define the data flow characteristic. Accordingly, the data path may be established at block 3401 responsive to a same request received at block 3403. In an alternative or in addition, the data path may be established at block 3401 prior to receiving the request at block 3403.

In addition, a signaling path may be established between the service provider and the data network, and the request from the service provider may be received over the signaling path. A second data path may also be established through the data network between the routing gateway and a second service provider providing a second data service for use at the routing gateway over the second data path during a second data session. Accordingly, different data sessions may be established to provide data service from different data service providers.

Enforcing the data flow characteristic at block 3405 may include enforcing the data flow characteristic during a first interval of the data session. A second data flow characteristic may then be enforced for the data path between the routing gateway and the service provider during a second interval of the data session, and the first and second data flow characteristics may be different. Moreover, the data path may be terminated after the first and second intervals thereby terminating the data session. As with the first data flow characteristic, the second data flow characteristic may be defined in a request received from the data service provider.

More particularly, the first data flow characteristic may be a first allowed bandwidth for the data path between the routing gateway and the service provider, and the second data flow characteristic may be a second allowed bandwidth for the data path between the routing gateway and the service provider. Moreover, the first and second allowed bandwidths may be different.

In addition or in an alternative, the data service provider may provide a plurality of data services for use at the routing gateway through the data path during the data session. A first of the data services may be provided over the data path during the first interval of the data session, a second of the data services may be provided over the data path during the second interval, and the first of the data services may not be provided over the data path during the second interval. For example, both of the first and second of the data services may be provided over the data path during the first interval so that a greater bandwidth is desired during the first interval. In an alternative, the second of the data services may not be provided over the data path during the first interval, and a greater bandwidth may be desired for one of the two data services.

The data service provider may provide a plurality of data services for use at the routing gateway through the data path during the data session, the first data flow characteristic may be a first prioritization of the plurality of data services, and the second dataflow characteristic may be a second prioritization of the plurality of data services with the first and second prioritizations being different. The data flow characteristic may thus include an allowed bandwidth for the data path and/or a prioritization of a plurality of data services provided by the service provider.

Figure 35:
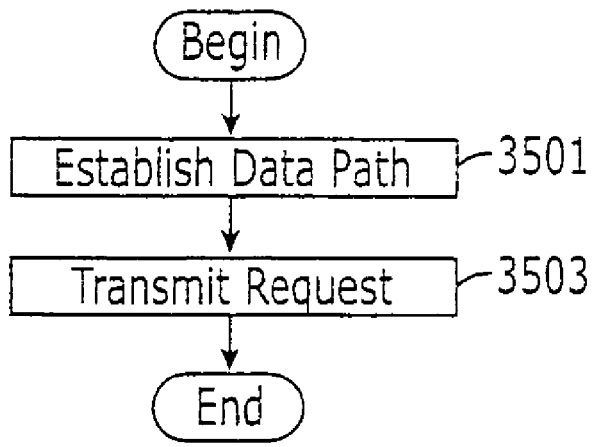

Methods of operating data service providers according to embodiments of the present disclosure are illustrated in FIG. 35. At block 3501, a data path can be established through a data network between a routing gateway for a subscriber of the data network and the service provider providing the data service for use at the routing gateway during a data session. At block 3503, a request may be transmitted to the data network, with the request defining a data flow characteristic for the data path between the routing gateway and the service provider providing the data service during the data session. In addition, a signaling path may be established between the service provider and the data network, and the request may be transmitted to the data network over the signaling path.

As discussed above, the data path may be established responsive to the request so that block 3503 actually precedes block 3501. Moreover, the data service provider may transmit a request to initiate a data path and/or to define a data flow characteristic responsive to a request from the routing gateway to which the data path is provided.

More particularly, the data flow characteristic transmitted in the request at block 3503 may include an allowed bandwidth for the data path and/or a prioritization of a plurality of data services provided by the service provider. Moreover, the request may define the data flow characteristic for a first interval of the data session. In addition, a second request may be transmitted to the data network, with the second request defining a second data flow characteristic for the data path between the routing gateway and the service provider during a second interval of the data session. More particularly, the first and second data flow characteristics may be different.

Figure 36:
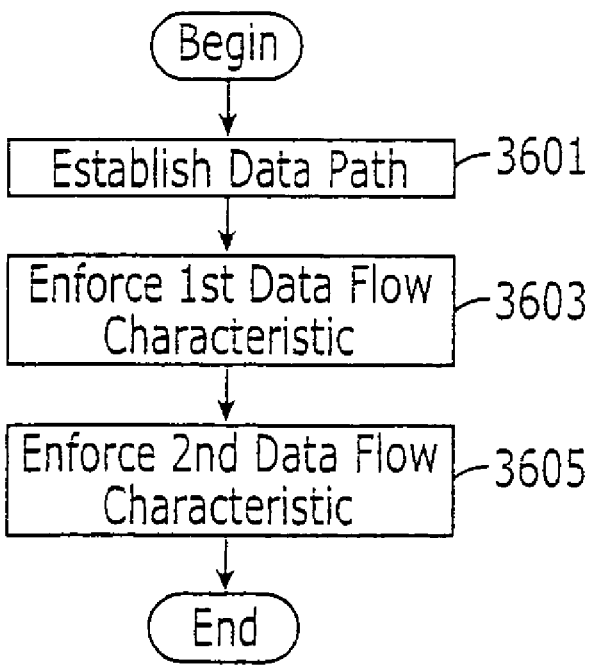

Methods of operating a routing gateway providing subscriber use of a data service according to embodiments of the present disclosure are illustrated in FIG. 36. At block 3601, a data path may be established through a data network between the routing gateway for the subscriber of the data network and the service provider providing the data service for use at the routing gateway over the data path during a data session. After establishing the data path, a first data flow characteristic may be enforced at block 3603 for the data path between the routing gateway and the service provider providing the data service during a first interval of the data session. At block 3605, a second data flow characteristic may be enforced for the data path between the routing gateway and the service provider providing the data service during a second interval of the data session. Moreover, the first and second data flow characteristics are different. After the first and second intervals, the data path may be terminated at block 3607, thereby terminating the data session.

As discussed above, the data path may be established between the data service provider and the routing gateway responsive to a request to establish the data path generated by the data service provider. Moreover, the data service provider may generate the request to establish the data path responsive to a service request from the routing gateway. Moreover, the first and second data flow characteristics may be defined in a request generated by the data service provider, and the data service provider may define the first and/or second data flow characteristics responsive to a service request(s) received from the routing gateway.

More particularly, the first data flow characteristic enforced at block 3603 may be a first allowed bandwidth for the data path between the routing gateway and the service provider, and the second data flow characteristic enforced at block 3605 may be a second allowed bandwidth for the data path between the routing gateway and the service provider, with the first and second allowed bandwidths being different. In addition or in an alternative, the data service provider may provide a plurality of data services for use at the routing gateway through the data path during the data session. The first data flow characteristic enforced at block 3603 may include a first prioritization of the plurality of data services, and the second dataflow characteristic enforced at block 3605 may include a second prioritization of the plurality of data services, with the first and second prioritizations being different.

Many variations and modifications can be made to the preferred embodiments without substantially departing from the principles of the present disclosure. All such variations and modifications are intended to be included herein within the scope of the present disclosure, as set forth in the following claims.

That which is claimed:
1. A method, comprising:
    facilitating, by a system comprising a processor, establishment of a data path through a data network between a routing gateway and service provider equipment to provide subscriber equipment a data service during a data session;

receiving, by the system, a request from the service provider equipment, the request being descriptive of a data flow characteristic for the data path between the routing gateway and the service provider equipment, wherein the data flow characteristic comprises an allowed bandwidth for the data path during the data session or a prioritization of a plurality of data services provided by the service provider equipment during the data session;

creating, by the system, a policy for enforcement of the data flow characteristic for the data path between the routing gateway and the service provider equipment responsive to receiving the request from the service provider equipment; and transmitting, by the system, information associated with the policy to a network element along the data path between the routing gateway and the service provider equipment of the data network.

2. The method of claim 1, comprising:
transmitting, by the system, the data flow characteristic to the routing gateway for enforcement of the data flow characteristic, wherein the subscriber equipment is communicatively coupled to the data network through a subscriber line.

3. The method of claim 1, comprising authenticating, by the system, the request received from the service provider equipment before transmitting the information associated with the policy, wherein the authenticating of the request comprises authenticating the request using service provider credentials.

4. The method of claim 1, wherein receiving the request from the service provider equipment includes receiving information identifying the data session, and wherein transmitting the information associated with the policy includes transmitting the data flow characteristic to the network element based on the information identifying the data session.

5. The method of claim 4, wherein the information identifying the data session includes one of a telephone number or an e-mail address of a subscriber.

6. The method of claim 4, comprising transmitting, by the system, the information associated with the policy to the routing gateway according to the information identifying the data session.

7. The method of claim 1, comprising facilitating, by the system, establishment of a signaling path to the service provider equipment via the data network, wherein the request from the service provider equipment is received over the signaling path.

8. The method of claim 1, comprising facilitating, by the system, establishment of a second data path through the data network between the routing gateway and a second service provider equipment providing a second data service, the second data service being provided for use at the routing gateway over the second data path during a second data session.

9. The method of claim 1, comprising enforcing, by the system, according to the policy the data flow characteristic for the data path at the network element located between the routing gateway and the service provider equipment providing the data service during the data session.

10. The method of claim 9, wherein enforcing according to the policy the data flow characteristic for the data path at the network element comprises utilizing a broadband remote access server.

11. The method of claim 9, wherein enforcing according to the policy the data flow characteristic comprises:
enforcing, by system, according to the policy the data flow characteristic during a first interval of the data session;

after establishing the data path, enforcing, by the system, a second data flow characteristic for the data path between the routing gateway and the service provider equipment providing the data service during a second interval of the data session, wherein the data flow characteristic and the second data flow characteristic are different; and after the first interval and the second interval, terminating, by the system, the data path thereby terminating the data session, wherein the data path and the data session are established before enforcing the data flow characteristic and second data flow characteristic, and wherein the data path and the data session are terminated after enforcing the data flow characteristic and the second data flow characteristic.

12. A non-transitory computer-readable storage medium, comprising computer instructions which when executed by a processor cause the processor to perform operations comprising:
establishing a data path through a data network between a routing gateway and service provider equipment to provide subscriber equipment a data service during a data session;
establishing a first signaling path configured to receive a request from the service provider equipment;
receiving the request from the service provider equipment, the request descriptive of a data flow characteristic for the data path between the routing gateway and the service provider equipment, wherein the data flow characteristic comprises values or data indicative of a first allowed bandwidth for the data path during the data session and a prioritization of a plurality of data services provided by the service provider equipment during the data session;
creating a policy for enforcement of the data flow characteristic for the data path between the routing gateway and the service provider equipment using the first allowed bandwidth and the prioritization; and
facilitating a second signaling path to transmit information associated with the policy to a network element along the data path between the routing gateway and the service provider equipment for enforcement of the data flow characteristic.

13. The non-transitory computer-readable storage medium of claim 12, wherein executing the computer instructions causes the processor to perform operations comprising facilitating establishment of a second data path through the data network between the routing gateway and second service provider equipment providing a second data service for use at the routing gateway over the second data path during a second data session.

14. The non-transitory computer-readable storage medium of claim 12, wherein executing the computer instructions causes the processor to perform operations comprising transmitting the information associated with the policy to the network element over the second signaling path to enforce the data flow characteristic for the data path between the routing gateway and the service provider equipment.

15. The non-transitory computer-readable storage medium of claim 14, wherein executing the computer instructions causes the processor to perform operations comprising:
causing the network element to enforce the data flow characteristic during a first interval of the data session; and
causing the network element to enforce a second data flow characteristic for the data path between the routing gateway and the service provider equipment during a second interval of the data session, wherein the data flow characteristic and the second data flow characteristic are different, and wherein the data flow characteristic and the second data flow characteristic are enforced for the data path during the first interval and the second interval before terminating the data session.

16. The non-transitory computer-readable storage medium of claim 15, wherein the second data flow characteristic comprises a second allowed bandwidth for the data path between the routing gateway and the service provider equipment, and wherein the first allowed bandwidth and the second allowed bandwidth are different.

17. The non-transitory computer-readable storage medium of claim 16, wherein the service provider equipment provides the plurality of data services for use at the routing gateway through the data path during the data session, wherein a first of the plurality of data services is provided over the data path during the first interval of the data session, wherein a second of the plurality of data services is provided over the data path during the second interval, and wherein the first of the plurality of data services is not provided over the data path during the second interval.

18. The non-transitory computer-readable storage medium of claim 17, wherein the first of the plurality of data services and the second of the plurality of data services are provided during the first interval of the data session.

19. The non-transitory computer-readable storage medium of claim 17, wherein the second of the plurality of data services is not provided during the first interval of the data session.

20. A server, comprising:
a memory to store instructions; and
a processor coupled with the memory, wherein the processor, responsive to executing the instructions, performs operations comprising:
obtaining a data path through a data network between a routing gateway and service provider equipment to provide subscriber equipment a data service during a data session;
receiving a request from the service provider equipment, the request descriptive of a data flow characteristic for the data path, wherein the data flow characteristic comprises one of an allowed bandwidth for the data path or a prioritization of a plurality of data services provided by the service provider equipment;
after receiving the request from the service provider equipment, creating a policy for enforcement of the data flow characteristic for the data path using the one of the allowed bandwidth or the prioritization; and
transmitting information associated with the policy to a network element along the data path.

* * * * *